US006115966A

United States Patent [19]

Shibata

[11] Patent Number: 6,115,966

[45] Date of Patent: Sep. 12, 2000

[54] POWER WINDOW REGULATOR AND WINDOW REGULATOR SYSTEM

[75] Inventor: Kazuma Shibata, Kosai, Japan

[73] Assignee: Asmo Co., Ltd., Japan

[21] Appl. No.: 09/210,809

[22] Filed: Dec. 15, 1998

[30] Foreign Application Priority Data

| | | | |
|---|---|---|---|
| Dec. 16, 1997 | [JP] | Japan | 9-346599 |
| Jul. 30, 1998 | [JP] | Japan | 10-215763 |
| Nov. 13, 1998 | [JP] | Japan | 10-324132 |
| Nov. 13, 1998 | [JP] | Japan | 10-324133 |
| Nov. 16, 1998 | [JP] | Japan | 10-325421 |

[51] Int. Cl.[7] ..... E05F 11/48; E05F 11/38; E05F 11/00; B60J 1/08; B60J 10/02

[52] U.S. Cl. ..... 49/352; 49/348; 49/360; 49/374; 49/349; 296/146.2

[58] Field of Search ..... 49/352, 348, 502, 49/360, 374, 349; 296/146.2

[56] References Cited

U.S. PATENT DOCUMENTS

| | | | |
|---|---|---|---|
| 4,644,695 | 2/1987 | Shiraishi et al. | 49/352 |
| 4,905,412 | 3/1990 | Srock et al. | 49/352 |
| 4,937,977 | 7/1990 | Gergoe et al. | 49/352 |
| 5,469,663 | 11/1995 | Ten Brink et al. | 49/352 X |
| 5,632,121 | 5/1997 | Handte et al. | 49/352 X |
| 5,673,515 | 10/1997 | Weber et al. | 49/352 |
| 5,685,111 | 11/1997 | Zimmerer et al. | 49/352 |
| 5,809,695 | 9/1998 | Strickland | 49/352 |

FOREIGN PATENT DOCUMENTS 6-79986 11/1994 Japan .

*Primary Examiner*—Daniel P. Stodola
*Assistant Examiner*—Hugh B. Thompson
*Attorney, Agent, or Firm*—Parkhurst & Wendel, LLP

[57] ABSTRACT

A power window regulator which comprises first regulator main body (18) of a power window regulator (12) is disposed at a front end side of a door, and is provided with a loop-shaped first tape (44) that raises and lowers a carrier plate (58). Further, a second regulator main body (20) disposed at a rear end side of the door is provided with a second tape (68) capable of pushing and pulling a carrier plate (70) and that is connected to the first tape (44). In accordance with this structure, a large space is secured between a first guide rail (22) and a second guide rail (60), so that a viewing window for securing a downward view can be disposed.

30 Claims, 35 Drawing Sheets

44
44A
44B
150
154
156
158
160
162
164
166
168
170
172
174
176
180
182
184
20

PRIOR ART

POWER WINDOW REGULATOR AND WINDOW REGULATOR SYSTEM

BACKGROUND OF THE INVENTION

1. Field of the Invention

The present invention relates to a power window regulator and a window regulator system which are provided within a side door for a vehicle and which automatically raise and lower a door glass.

2. Description of the Related Art

In a power window regulator arranged within a side door of a vehicle, for example, a power window regulator arranged within a side door of a large-sized truck, is different from a power window regulator arranged within a side door of a passenger car. Therefore, is necessary to arrange each while taking care of the following points.

That is, since the side door at the side of the passenger seat of the large-sized truck is disposed at a high position from a tire surface contact with the ground, it is necessary to arrange a comparatively large viewing window at a lower side of a center portion of a door main body of the side door at the side of the passenger seat in view of a request for securing a downward view. Accordingly, in the power window regulator arranged within the side door at the side of the passenger seat of the large-sized truck of this kind, it is necessary to arrange the power window regulator with taking care of a layout of each of the members so as not to shut a view through the viewing window.

A conventional power window regulator obtained by taking care of the points mentioned above (that is, a power window regulator of a type in which a so-called wire method is employed and two regulator main bodies arranged in both sides of a door main body are driven by a single motor) is shown in FIG. 35, and will be briefly described below.

As shown in this drawing, a power window regulator 1200 is structured such that a pair of elongate guide rails 1208 are arranged at both sides of a viewing window 1206 in parallel to each other so as not to shut a view through the viewing window 1206 placed in a door main body 1204 of a side door 1202 at the side of a passenger seat. Each of plural glass supporting bodies 1212 for supporting a door glass 1210 is supported to each guide rail 1208 so as to be ascended and descended by a pair of rollers 1214, respectively.

Further, an upper bracket 1216 and a lower bracket 1218 extended out towards a front portion of the door are respectively formed in an upper end portion and a lower end portion of each guide rail 1208. A single upper pulley 1220 is axially supported on the upper bracket 1216, and a pair of lower first pulley 1222 and lower second pulley 1224 are axially supported on the lower bracket 1218.

Still further, a wire 1226 connected to the glass supporting body 1212 is wound around the upper pulley 1220, the lower first pulley 1222 and the lower second pulley 1224. The wire 1226 is structured to move by a driving force of a motor arranged in a lower side of the viewing window 1206.

However, in the case of the power window regulator 1200 mentioned above, in order to prevent the view through the viewing window 1206 disposed in the door main body 1204 of the side door 1202 at the side of the passenger seat from being shut, a structure of complexly folding back the wire 1226 by using a multiplicity of pulleys (the upper pulley 1220, the lower first pulley 1222 and the lower second pulley 1224) is employed. Accordingly, a fatigue due to a repeated use is accumulated in the wire 1226, so that a durability of the wire 1226 and a durability of the power window regulator 1200 are reduced.

In this case, a so-called selector system has been known as an existing power window regulator system having a good durability, however, since a projection area or a space for arranging respective parts of the sector system is very large, it cannot meet a request for securing a downward view.

SUMMARY OF THE INVENTION

The present invention is made by taking the above facts into consideration, and an object of the present invention is to provide a power window regulator and a window regulator system which can meet a request for securing a downward view and have an excellent durability.

In accordance with the present invention, there is provided a power window regulator which is provided within a side door for a vehicle and which automatically raises and lowers a door glass with a driving force, comprising: a first guide rail and a second guide rail respectively disposed at a front end side of a door and a rear end side of a door within the side door for a vehicle in parallel with each other so as to set a direction of raising and lowering the door glass as the longitudinal direction; a first glass carrier and a second glass carrier which are provided in the first guide rail and the second guide rail and which support the door glass; a first glass carrier raising/lowering long member that is provided at a side of the first guide rail so as to form a loop and is connected to the first glass carrier at a predetermined portion; a driving source imparting a driving force to the first glass carrier raising/lowering long member and moving said first glass carrier raising/lowering long member so as to form a loop; and a second glass carrier raising/lowering long member having one end portion connected to one of the first glass carrier raising/lowering long member and the first glass carrier and the other end portion connected to the second glass carrier, and having a flexibility provided with a degree of rigidity capable of at least moving the second glass carrier in a direction of raising and lowering the door glass along the second guide rail.

An operation of the present invention having the structure mentioned above will be described below in view of a structural layout and an operation.

In accordance with the present invention, the first guide rail and the second guide rail in which the first glass carrier and the second glass carrier for supporting the door glass are respectively provided are arranged in the front end side of the door and the rear end side of the door within the side door for the vehicle in parallel with each other by setting the direction of ascending and descending the door glass as a longitudinal direction. Accordingly, a wide space is secured between the first guide rail and the second guide rail. Further, the first glass carrier raising/lowering long member connected to the first glass carrier at a predetermined portion is provided at the side of the first guide rail so as to form a loop. Accordingly, a space between the first guide rail and the second guide rail is not made small by the first glass carrier raising/lowering long member. Further, the first glass carrier raising/lowering long member or the first glass carrier and the second glass carrier are connected by the second glass carrier raising/lowering long member to each other, however, since the second glass carrier raising/lowering long member has flexibility, there is a freedom of a layout, so that they can be arranged not to make the space mentioned above small.

As a result, in accordance with the present invention, for example, it is possible to meet a request for placing a viewing window for securing a downward view (an auxiliary glass for securing a view) near a lower side of a center portion of the side door for the vehicle.

Further, in accordance with the present invention, when the driving force is applied to the first glass carrier raising/lowering long member from the driving source, the first glass carrier raising/lowering long member is moved so as to form a loop. For example, if a moving direction of the first glass carrier raising/lowering long member is a direction of ascending the first glass carrier, the second glass carrier raising/lowering long member lifts up the second glass carrier at the side of the second guide rail so as to ascend together with a movement of the first glass carrier raising/lowering long member.

On the contrary, if the moving direction of the first glass carrier raising/lowering long member is a direction of descending the first glass carrier, the second glass carrier raising/lowering long member pushes down the second glass carrier at the side of the second guide rail so as to ascend together with a movement of the first glass carrier raising/lowering long member. In this case, since the second glass carrier raising/lowering long member is provided with rigidity of such degree as to move at least the second glass carrier in the direction of ascending and descending the door glass along the second guide rail, there is not generated such a trouble that the second glass carrier raising/lowering long member cannot push down the second glass carrier due to bending.

As mentioned above, in accordance with the present invention, since the structure is made such that the first glass carrier is ascended and descended by the first glass carrier raising/lowering long member moving so as to form a loop and the second glass carrier is ascended and descended by the push-pull type second glass carrier raising/lowering long member, in order to ascend and descend the first glass carrier and the second glass carrier, it is not necessary to complexly fold back the wire in accordance with the conventional manner. As a result, in accordance with the present invention, when being repeatedly used, only a little fatigue is accumulated in the first glass carrier raising/lowering long member and the second glass carrier raising/lowering long member, so that a durability of the first glass carrier raising/lowering long member and the second glass carrier raising/lowering long member and a durability of the power window regulator can be improved.

In another aspect of the present invention, it is characterized in that, the second glass carrier raising/lowering long member is a tape-shaped or belt-shaped long body.

In accordance with the aspect structured in the above manner, since the second glass carrier raising/lowering long member is the tape-shaped or belt-shaped elongate member, a push-pull operation of the second glass carrier at the side of the second guide rail can be stably performed.

That is, for example, in the case of performing a push-pull operation of the second glass carrier by the wire in the same manner as that of the conventional art, since the wire is normally structured to be a stranded wire, the wire is easily bent at a time of pushing down the second glass carrier, and since a pressing area (a cross-sectional area of the wire) is small, it is hard to stably push down the second glass carrier. However, when using the tape-shaped or belt-shaped long body as in this aspect, a cross-sectional area and a rigidity useful for pressing the second glass carrier can be easily secured, so that a push-pull operation of the second glass carrier at the side of the second guide rail can be stably performed.

In the other aspect of the present invention, it is characterized in that, the first glass carrier raising/lowering long member is structured so as to include a tape-shaped or belt-shaped long body.

In accordance with the aspect structured in the above manner, in addition that the second glass carrier raising/lowering long member is the tape-shaped or belt-shaped long body, since the first glass carrier raising/lowering long member is also structured to include the tape-shaped of belt-shaped long body, both members can be structured as the same member in construction. Accordingly, an end portion of the second glass carrier raising/lowering long member can be easily connected to the first glass carrier raising/lowering long member or the first glass carrier, or a stress concentration is hard to be generated in both connecting portions at a time of moving the first glass carrier raising/lowering long member and the second glass carrier raising/lowering long member.

In the other aspect of the present invention, it is characterized in that, the second glass carrier raising/lowering long member is arranged so that a middle portion thereof moves between upper end portions of the first guide rail and the second guide rail.

In accordance with the aspect structured in the above manner, since the second glass carrier raising/lowering long member is arranged so that the middle portion of the second glass carrier raising/lowering long member moves between the upper end portions of the first guide rail and the second guide rail, the center portion of the side door for the vehicle including the lower edge side of the side door for the vehicle can be made a free space. Accordingly, it is possible to easily respond to the request for placing a viewing window for securing a downward view (an auxiliary glass for securing a view) mentioned above.

In the other aspect of the present invention, it is characterized in that, the first glass carrier raising/lowering long member and the second glass carrier raising/lowering long member are wound around a plurality of rolling bodies, and a rotating direction of a plurality of rolling bodies at a time of ascending the door glass and a rotating direction of a plurality of rolling bodies at a time of descending the door glass are respectively set to be the same rotating direction.

An operation of the aspect structured in the above manner is as follows.

When a rotating direction of any one of the rolling bodies is different from a rotating direction of the other of the rolling bodies, particularly in the case of using a tape-shaped or belt-shaped long body as the first glass carrier raising/lowering long member and the second glass carrier raising/lowering long member, the long body changes a bending direction at every rolling bodies and is folded back at many times. As a result, a fatigue is easily accumulated in the long body. However, in accordance with the structure of this aspect, even when the tape-shaped or belt-shaped long body is used as the first glass carrier raising/lowering long member and the second glass carrier raising/lowering long member, an accumulation of a fatigue can be restricted, and as a result, a durability of the first glass carrier raising/lowering long member and the second glass carrier raising/lowering long member and a durability of the power window regulator can be improved.

In the other aspect of the present invention, it is characterized in that, the upper end side of the first glass carrier raising/lowering long member which moves so as to form a loop and the middle portion of the second glass carrier raising/lowering long member are both wound around the same rolling body arranged at the upper end side of the first guide rail.

In accordance with the aspect structure in the above manner, since the upper end side of the first glass carrier raising/lowering long member and the middle portion of the second glass carrier raising/lowering long member which move to form a loop are both wound around the same rolling body arranged in the upper end side of the first guide rail, a number of the parts can be reduced and the structure can be simplified in comparison with the case that the rolling body for winding the upper end side of the first glass carrier raising/lowering long member and the rolling body around which the middle portion of the second glass carrier raising/lowering long member are wound are independently provided.

In the other aspect of the present invention, it is characterized in that, the upper end side of the first glass carrier raising/lowering long member moving to form a loop is wound around the rolling body arranged in the upper end side of the first guide rail and the middle portion of the second glass carrier raising/lowering long member moving to form a straight line is wound around another rotating member arranged near an outer side of the rolling body.

In accordance with the aspect structured in the above manner, since the middle portion of the second glass carrier raising/lowering long member is wound around the rolling body arranged to be independent from the rolling body around which the upper end side of the first glass carrier raising/lowering long member is wound around, there is a disadvantage that a number of the parts is increased, however, it is possible to prevent the upper end side of the first glass carrier raising/lowering long member and the middle portion of the second glass carrier raising/lowering long member from being brought into slidable contact with each other at the bent portion as much as possible. As a result, a durability of the first glass carrier raising/lowering long member and the second glass carrier raising/lowering long member and a durability of the power window regulator can be improved.

In the other aspect of the present invention, it is characterized in that, the driving source is arranged in an upper end side or a lower end side of the first guide rail.

In accordance with the aspect structured in the above manner, since the driving source is arranged in an upper end side or a lower end side of the first guide rail, in the case of arranging the power source at the upper end side, there is an advantage that the power source can be prevented from being damaged by a water.

On the contrary, in the case of arranging the power source at the lower end side, it is possible to easily avoid an interference with the other provisional parts such as an ashtray and the like and a functional part. Accordingly, there is an advantage that the power source can be arranged at every direction in the lower end side of the first guide rail and the other provisional parts and functional parts can be arranged in accordance with a free layout.

In the other aspect of the present invention, there is provided a power window regulator which is provided within a side door for a vehicle and which automatically raises and lowers a door glass with a driving force, comprising: a first guide rail and a second guide rail respectively disposed in a front end side of a door and a rear end side of a door within the side door for a vehicle in parallel with each other so as to set a direction of raising and lowering the door glass as the longitudinal direction; a first glass carrier and a second glass carrier which are respectively provided in the first guide rail and the second guide rail and which support the door glass; a first glass carrier raising/lowering long member that is provided at a side of the first guide rail to form a loop and is connected to the first glass carrier at a predetermined portion; a driving source imparting a driving force to the first glass carrier raising/lowering long member and moving said first glass carrier raising/lowering long member to form a loop; and a second glass carrier raising/lowering long member provided between the first guide rail and the second guide rail to form a loop and connected to the second glass carrier and one of the first glass carrier raising/lowering long member and the first glass carrier.

The aspect structured in the above manner will be described below in view of a structural layout and an operation.

In accordance with this aspect, the first guide rail and the second guide rail in which the first glass carrier and the second glass carrier for supporting the door glass are respectively provided are arranged in the front end side of the door and the rear end side of the door within the side door for the vehicle in parallel to each other by setting the direction of ascending and descending the door glass as a longitudinal direction. Accordingly, a wide space is secured between the first guide rail and the second guide rail. Further, the first glass carrier raising/lowering long member connected to the first glass carrier at a predetermined portion is provided at the side of the first guide rail so as to form a loop. Accordingly, a space between the first guide rail and the second guide rail is not made narrow by the first glass carrier raising/lowering long member. Further, since the second glass carrier raising/lowering long member connected to the second glass carrier and the first glass carrier raising/lowering long member or the first glass carrier is provided between the first guide rail and the second guide rail to form a loop, the space between the first guide rail and the second guide rail is not made narrow.

As a result, in accordance with this aspect, for example, it is possible to satisfy a request for placing a viewing window for securing a downward view (an auxiliary glass for securing a view) near a lower side of a center portion of the side door for the vehicle.

Further, in accordance with this aspect, when the driving force is applied to the first glass carrier raising/lowering long member from the driving source, the first glass carrier raising/lowering long member is moved to form a loop. Since the first glass carrier raising/lowering long member or the first glass carrier is connected to the second glass carrier raising/lowering long member, the second glass carrier raising/lowering long member is moved to form a loop in accordance that the first glass carrier raising/lowering long member moves so as to form a loop. Accordingly, the first glass carrier and the second glass carrier are ascended and descended in a linking manner.

As mentioned above, in accordance with this aspect, since the structure is made such that the first glass carrier is ascended and descended by the first glass carrier raising/lowering long member moving to form a loop and the second glass carrier is ascended and descended by the second glass carrier raising/lowering long member moving together with the first glass carrier raising/lowering long member to form a loop, in order to ascend and descend the first glass carrier and the second glass carrier, it is not necessary to complexly fold back the wire in accordance with the conventional manner. As a result, in accordance with this aspect, when being repeatedly used, only a little fatigue is accumulated in the first glass carrier raising/lowering long member and the second glass carrier raising/lowering long member, so that a durability of the first glass carrier raising/lowering long member and the second glass carrier raising/lowering long member and a durability of the power window regulator can be improved.

In the other aspect of the present invention, it is characterized in that, an end portion of the first glass carrier raising/lowering long member is fixed to the first glass carrier, an extension absorbing body for absorbing an extension of the first glass carrier raising/lowering long member is provided at the side of the other end portion of the first glass carrier raising/lowering long member, and the extension absorbing body is arranged so as to offset to the one end portion in a longitudinal direction of the door.

In accordance with the aspect structured in the above manner, in the case that an extension is generated in the first glass carrier raising/lowering long member moving so as to form a loop due to a change in a temperature of an environment, a long time use and the like, the extension can be absorbed by the extension absorbing body provided at the side of the other end portion of the first glass carrier raising/lowering long member. Accordingly, it is possible to prevent a slackness from generating in the first glass carrier raising/lowering long member.

Further, in accordance with this aspect, since the extension absorbing body provided at the side of the other end portion of the first glass carrier raising/lowering long member is arranged to offset to the one end portion of the first glass carrier raising/lowering long member in a front/rear direction of the door, the extension can be securely absorbed even in the case that an amount of extension of the first glass carrier raising/lowering long member is great. That is, it is possible to arrange the one end portion and the other end portion of the first glass carrier raising/lowering long member to oppose to a vertical direction of the door and connect the one end portion to the other end portion through the extension absorbing body, however, in this case, since a distance between both end portions is significantly short, an amount of extension to be absorbed becomes small. However, when arranging the extension absorbing body to offset to the one end portion in a front/rear direction of the door as in the same manner of this aspect, an amount to be absorbed becomes great. As a result, in accordance with this aspect, it is possible to securely prevent a slackness from generating in the first glass carrier raising/lowering long member, and it is possible to secure a suitable operation of the power window regulator.

In the other aspect of the present invention, it is characterized in that, the extension absorbing body is structured to include a slider to which the other end portion of the first glass carrier raising/lowering long member is fixed and which is arranged to slide within the first glass carrier, an elastic body urging the slider in a direction of extending the first glass carrier raising/lowering long member and an adjusting body for adjusting an urging force of the elastic body.

In accordance with the aspect structured in the above manner, since the side of the one end portion of the first glass carrier raising/lowering long member becomes a fixed end in the case that an extension is generated in the first glass carrier raising/lowering long member, the extension can be absorbed by the side of the other end portion. In particular, when the extension is generated in the first glass carrier raising/lowering long member, the slides is slide in a direction of extension within the first glass carrier due to the urging force of the elastic body. Since the other end portion of the first glass carrier raising/lowering long member is fixed to the slider, the first glass carrier raising/lowering long member is pulled when the slider slides in a direction of extension of the first glass carrier raising/lowering long member. Accordingly, the extension of the first glass carrier raising/lowering long member can be absorbed.

In this case, in accordance with this aspect, since the urging force urging the slider in a direction of extension of the first glass carrier raising/lowering long member can be adjusted by the adjusting body, the urging force to be applied to the first glass carrier raising/lowering long member can be set to be an optimum value.

In the other aspect of the present invention, it is characterized in that, a fitting groove is provided in the slider and a bent portion inserted to the fitting groove is provided in the first glass carrier.

In accordance with the aspect structured in the above manner, the slider can slide while maintaining a state that the bent portion provided in the first glass carrier is fitted into the fitting groove provided in the slider. Accordingly, a bending length of the bent portion and a width of the fitting groove to which the bent portion is fitted can be secured to be comparatively large. As a result, in accordance with this aspect, a movement of the slider within the first glass carrier can be stably performed, and a reliability of an extension absorbing performance of the first glass carrier raising/lowering long member can be increased.

In accordance with the other aspect of the present invention, there is provided a power window regulator which is provided within a side door for a vehicle and which automatically raises and lowers a door glass with a driving force, comprising: a guide rail disposed at one of a front end side of a door and a rear end side of a door within the side door for a vehicle by setting a direction of raising and lowering the door glass as a longitudinal direction; a first glass carrier which is provided to be slidable along the guide rail and which supports a guide rail disposal side of the door glass; a first glass carrier raising/lowering long member that is provided at a side of the first guide rail to form a loop and is connected to the first glass carrier at a predetermined portion; a driving source imparting a driving force to the first glass carrier raising/lowering long member and moving said first glass carrier raising/lowering long member to form a loop; a second glass carrier for supporting a side opposite to the guide rail disposal side of the door glass; and a second glass carrier raising/lowering long member connecting the second glass carrier with one of the first glass carrier raising/lowering long member and the first glass carrier and moving in accordance with movements of the first glass carrier raising/lowering long member to raise and lower the second glass carrier in the same direction as that of the first glass carrier.

An operation of the present invention having the structure mentioned above will be described below in view of a structural layout and a motion.

In accordance with this aspect, the guide rail having the direction of ascending and descending the door glass as a longitudinal direction is arranged in any one of the front end side of the door and the rear end side of the door within the side door for the vehicle. Accordingly, a wide space is secured in comparison with the structure in which the guide rail is arranged in both of the front end side of the door and the rear end side of the door. Further, the first glass carrier raising/lowering long member connected to the first glass carrier is provided at the side of the guide rail to form a loop. Accordingly, the space is not made narrow by the first glass carrier raising/lowering long member. Further, the first glass carrier raising/lowering long member or the first glass carrier and the second glass carrier are connected by the second glass carrier raising/lowering long member to each other, however, since it is sufficient that the second glass carrier raising/lowering long member has a function of ascending and descending the second glass carrier in the same direction as that of the first glass carrier due to a movement of the first glass carrier raising/lowering long member, there is a freedom on a layout, so that they can be arranged not to make the space mentioned above narrow.

As a result, in accordance with this aspect, for example, it is possible to reply to a request for placing a viewing window for securing a downward view (an auxiliary glass for securing a view) near a lower side of a center portion of the side door for the vehicle.

Further, in accordance with this aspect, when the driving force is applied to the first glass carrier raising/lowering long member from the driving source, the first glass carrier raising/lowering long member is moved to form a loop. For example, if a moving direction of the first glass carrier raising/lowering long member is a direction of ascending the first glass carrier, the second glass carrier raising/lowering long member moves to ascend the second glass carrier arranged at the side opposite to the guide rail together with a movement of the first glass carrier raising/lowering long member. On the contrary, if the moving direction of the first glass carrier raising/lowering long member is a direction of descending the first glass carrier, the second glass carrier raising/lowering long member moves to descend the second glass carrier together with a movement of the first glass carrier raising/lowering long member.

As mentioned above, in accordance with this aspect, since the structure is made such that the first glass carrier is ascended and descended by the first glass carrier raising/lowering long member moving to form a loop and the second glass carrier is ascended and descended by the second glass carrier raising/lowering long member moved by a movement of the first glass carrier raising/lowering long member, in order to ascend and descend the first glass carrier and the second glass carrier, it is not necessary to complexly fold back the wire in accordance with the conventional manner. As a result, in accordance with this aspect, when being repeatedly used, only a little fatigue is accumulated in the first glass carrier raising/lowering long member and the second glass carrier raising/lowering long member, so that a durability of the first glass carrier raising/lowering long member and the second glass carrier raising/lowering long member and a durability of the power window regulator can be improved.

Further, in accordance with this aspect, as mentioned above, since the structure is made such that the guide rail is arranged in only one of the front end side of the door and the rear end side of the door within the side door for the vehicle, the structure can be simplified in comparison with the structure in which the guide rail is arranged in both of the front end side of the door and the rear end side of the door.

In the other aspect of the present invention, it is characterized in that, the guide rail is arranged in the rear end side of the door and the second glass carrier is arranged in the front end side of the door glass.

An operation of the aspect structured in the above manner is as follows.

In general, in the large-sized truck, in view of securing a downward view to be greater so as to improve a safety, the viewing window mentioned above tends to be arranged near the front end portion of the side door at the side of the passenger seat as much as possible. Accordingly, when the guide rail is arranged in the front end side of the door and the first glass carrier is ascended and descended along the guide rail, a part of the glass carrier easily comes in view through the viewing window.

However, in accordance with this aspect, since the second glass carrier is arranged in the front end side of the door glass as well as the guide rail is arranged at the rear end side of the door, it is possible to completely secure a downward view.

In the other aspect of the present invention, it is characterized in that, the first glass carrier raising/lowering long member is supported by winding portions set at three or more portions.

In accordance with the aspect structure in the above manner, since the first glass carrier raising/lowering long member moving along the guide rail to form a loop is supported by the winding portions set at three or more portions, a bending radius of the first glass carrier raising/lowering long member can be enlarged in comparison with the case that the first glass carrier raising/lowering long member is supported by the winding portions set at the two upper and lower points in the guide rail. Accordingly, a load acting on the first glass carrier raising/lowering long member can be reduced. As a result, in accordance with this aspect, a durability of the first glass carrier raising/lowering long member and a durability of the power window regulator can be improved.

In the other aspect of the present invention, it is characterized in that, the power source is arranged in the upper end side of the guide rail and near the guide rail.

In accordance with the aspect structured in the above manner, since the driving source is arranged in the upper end side of the guide rail, in addition to the matters described as the operations and effects of the other aspects mentioned above, an advantage that a downward space for the side door for the vehicle can be easily secured in comparison with the case that the power source is arranged in the lower end side of the guide rail can be obtained. Accordingly, it is easy to respond to a request for securing a downward view.

Further, in accordance with this aspect, since the power source is arranged near the guide rail, the power source can be easily integrated with the guide rail. Accordingly, the structure can be simplified.

In the other aspect of the present invention, it is characterized in that, the driving source is arranged in the upper end side of the guide rail and in an offset position to the guide rail in a front/rear direction of the door.

In accordance with the aspect structured in the above manner, since the driving source is arranged in the upper end side of the guide rail, in the same manner as that of the other aspects mentioned above, a downward space for the side door for the vehicle can be easily secured and it is easy to meet a request for securing a downward view.

Further, in accordance with this aspect, since the power source is arranged in the offset position to the guide rail in a front/rear direction of the door, a bending radius of a moving track of the second glass carrier raising/lowering long member can be enlarged. Accordingly, a load acting on the second glass carrier raising/lowering long member can be reduced. As a result, in accordance with this aspect, a durability of the second glass carrier raising/lowering long member and a durability of the power window regulator can be improved.

In the other aspect of the present invention, there is provided a window regulator system comprising: a guide rail disposed to set a direction of raising and lowering a door glass as a longitudinal direction; a first glass carrier which is provided to be slidable along the guide rail and which supports an end portion in a front/rear direction of the glass in the door glass; a rolling body disposed in a substantially intermediate portion within a side door for a vehicle to be rotatable around an axis, said rolling body rotated by a driving force of a driving source or by an operating force of a manual operating handle; a first glass carrier raising/lowering long member structured to have a tape having flexibility as a main portion, said member forming a loop of a substantially triangular shape by being wound around a rolling body and moving along a track in accordance with rotations of the rolling body to raise and lower the first glass carrier along the guide rail; a second glass carrier for supporting another end portion in the front/rear direction of the glass in the door glass; and a second glass carrier raising/lowering long member structured to have a tape having flexibility as a main portion, said carrier connecting the second glass carrier with one of the first glass carrier and the first glass carrier raising/lowering long member and moving along a track in accordance with movements of the first glass carrier raising/lowering long member to raise and lower the second glass carrier in the same direction as that of the first glass carrier.

In accordance with the aspect structured in the above manner, in the case of using the window regulator system in accordance with this aspect as a power window regulator, the driving source is mounted to the substantially center portion within the side door for the vehicle, and the rolling body is in a state of being rotated by the driving force of the driving source.

In this state, when the driving force is applied to the rolling body from the driving source, the rolling body is rotated around the axis thereof. Accordingly, the first glass carrier raising/lowering long member having the tape wound around the rolling body as the main portion is moved along the substantially triangular loop. Accordingly, the first glass carrier is ascended and descended along the guide rail. Further, when the first glass carrier raising/lowering long member moves, the second glass carrier raising/lowering long member connected to the first glass carrier raising/lowering long member or the first glass carrier is moved along a predetermined track. Accordingly, the second glass carrier is ascended and descended in the same direction as that of the first glass carrier. As a result, the door glass is ascended and descended.

On the contrary, in the case that the window regulator system in accordance with this aspect is used as a manual window regulator, a manual operation handle is attached to the substantially center portion in a side of a vehicle chamber at the side door for the vehicle and the rolling body is in a state of being rotated by an operating force of the manual operation handle.

In this state, when the manual operation handle is rotated, the rolling body is rotated around the axis thereof. Accordingly, the first glass carrier raising/lowering long member having the tape wound around the rolling body as the main portion is moved along the substantially triangular loop. Accordingly, the first glass carrier is ascended and descended along the guide rail. Further, when the first glass carrier raising/lowering long member moves, the second glass carrier raising/lowering long member connected to the first glass carrier raising/lowering long member or the first glass carrier is moved along a predetermined track. Accordingly, the second glass carrier is ascended and descended in the same direction as that of the first glass carrier. As a result, the door glass is ascended and descended.

As mentioned above, in accordance with this aspect, since the structure is made such that the rolling body rotated by the driving force of the driving source or the operating force of the manual operation handle is arranged in the substantially center portion within the side door for the vehicle, it is possible to use as a power window regulator and a manual window regulator by selectively attaching any one of the driving source and the manual operation handle, so that an interchangeability can be achieved.

In the other aspect of the present invention, it is characterized in that, the second glass carrier raising/lowering long member has a track in a direction of connecting the lower end portion of the guide rail to the rolling body.

In accordance with the aspect structure in the above manner, since the second glass carrier raising/lowering long member has the track in a direction of connecting the lower end portion of the guide rail to the rolling body, the structure can be made such that in the case of ascending the door glass, the second glass carrier is pulled by the second glass carrier raising/lowering long member, and in the case of descending the door glass, the second glass carrier can be pushed by the second glass carrier raising/lowering long member. That is, the second glass carrier raising/lowering long member becomes a push-pull type. Accordingly, in comparison with the case that the second glass carrier raising/lowering long member is constituted as the pull-pull type, a tape length of the second glass carrier raising/lowering long member can be shortened.

In the other aspect of the present invention, it is characterized in that, the second glass carrier raising/lowering long member is wound around the rolling body in a crossing state.

In accordance with the aspect structured in the above manner, since the second glass carrier raising/lowering long member is wound around the rolling body in a crossing state, a rotational force of the rolling body can be directly transmitted not only to the first glass carrier raising/lowering long member but also to the second glass carrier raising/lowering long member. Accordingly, in any cases of ascending and descending the door glass, the structure can be made such that the second glass carrier can be pulled by the second glass carrier raising/lowering long member. That is, the second glass carrier raising/lowering long member is constituted as the pull-pull type. Accordingly, in comparison with the case that the second glass carrier raising/lowering long member is constituted as the push-pull type, the second glass carrier raising/lowering long member can be stably ascended and descended at a degree that no push operation exists.

DESCRIPTION OF THE PREFERRED EMBODIMENTS

An embodiment in accordance with the present invention will be described below with reference to FIGS. 1 to 10.

Figure 4:
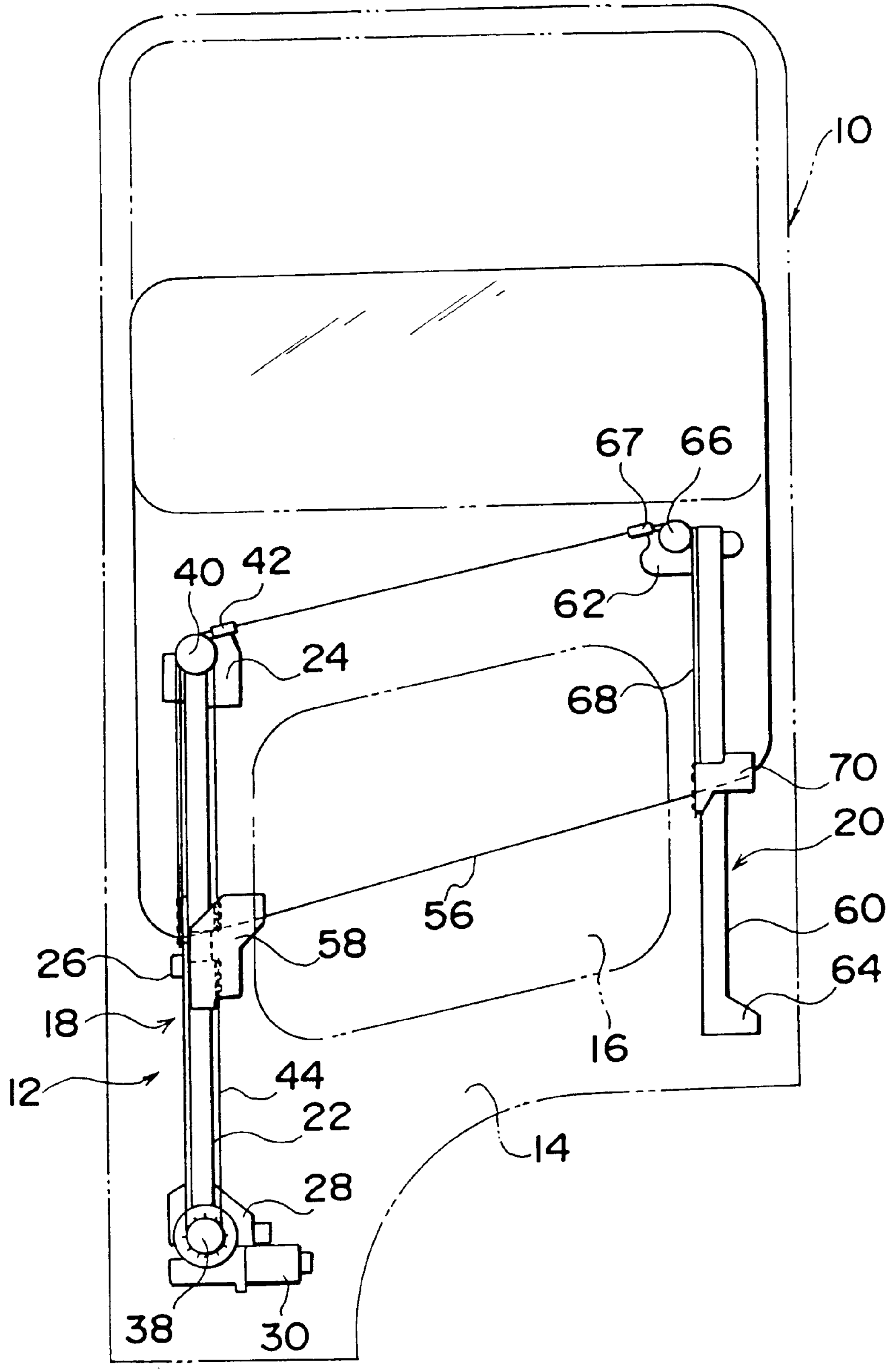
FIG. 4 is a schematically front elevational view which shows a side door in a side of an passenger seat of a large-sized truck having a power window regulator provided by taking an existence of a viewing window in accordance with an embodiment into consideration.

A schematic structure of a power window regulator 12 arranged within a side door 10 in a large-sized truck is shown in FIG. 4. As shown in this drawing, a viewing window 16 (illustrated by a two dot chain line) for securing a downward view is provided in a lower side of a center portion of a door main body 14 at the side door 10 at the side of the passenger seat corresponding to "a side door for a vehicle". On the contrary, the power window regulator 12 is arranged to avoid the viewing window 16, and in particular, is structured to include a first regulator main body 18 arranged at a side of a door front end within the side door 10 and a second regulator main body 20 arranged at a side of a door rear end.

Figure 1:
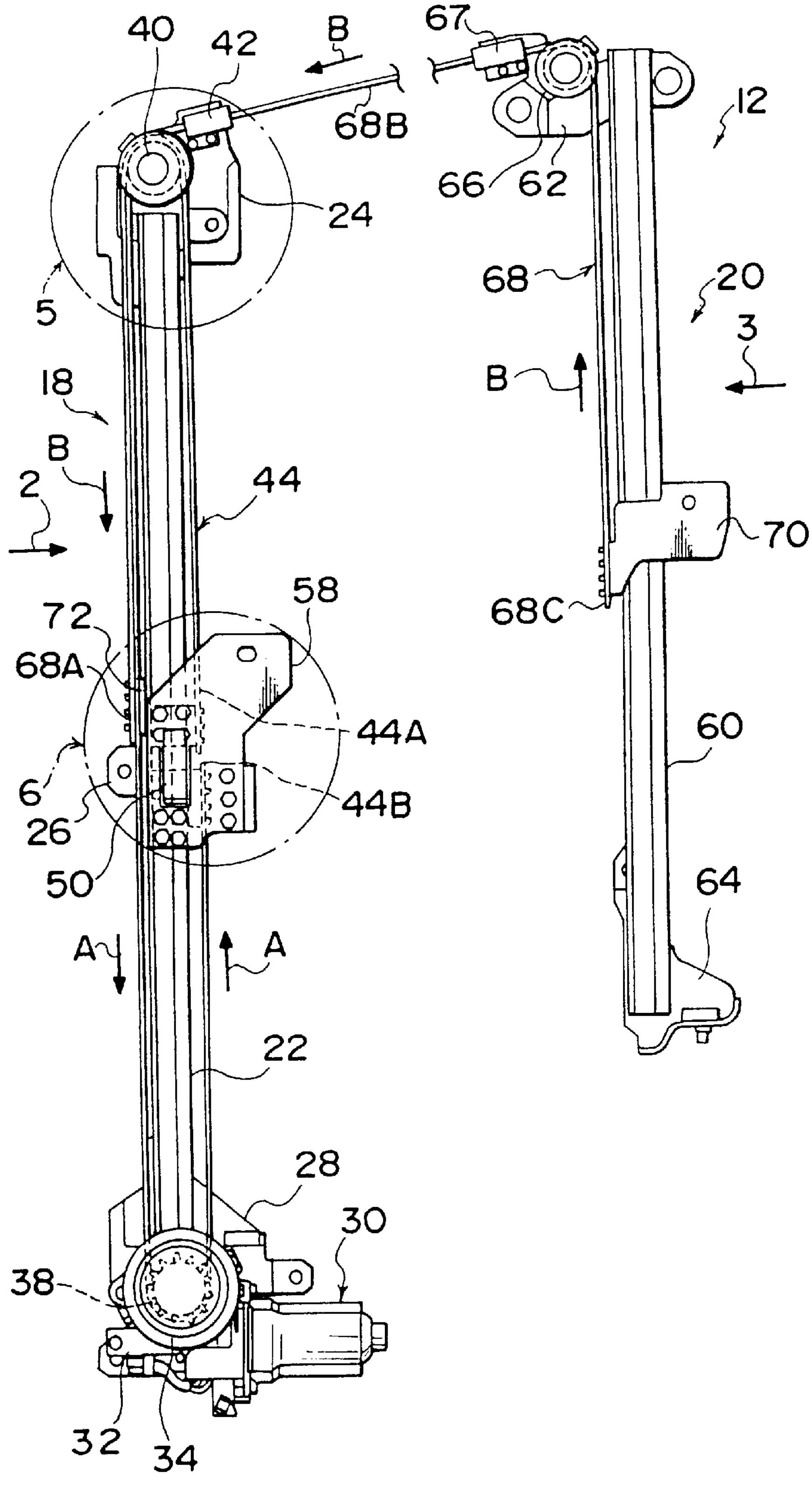
FIG. 1 is a front elevational view which shows a total structure of a power window regulator in accordance with an embodiment of the present invention.
Figure 2:
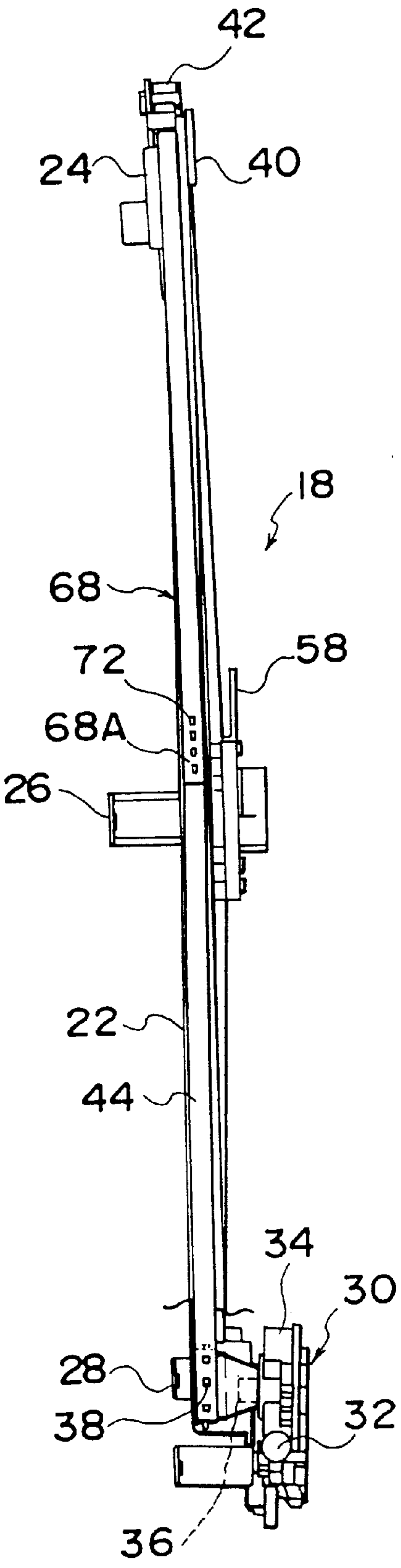
FIG. 2 is a side elevational view as seen from a direction of an arrow 2 in FIG. 1, which shows a first regulator main body of the power window regulator shown in FIG. 1.
Figure 3:
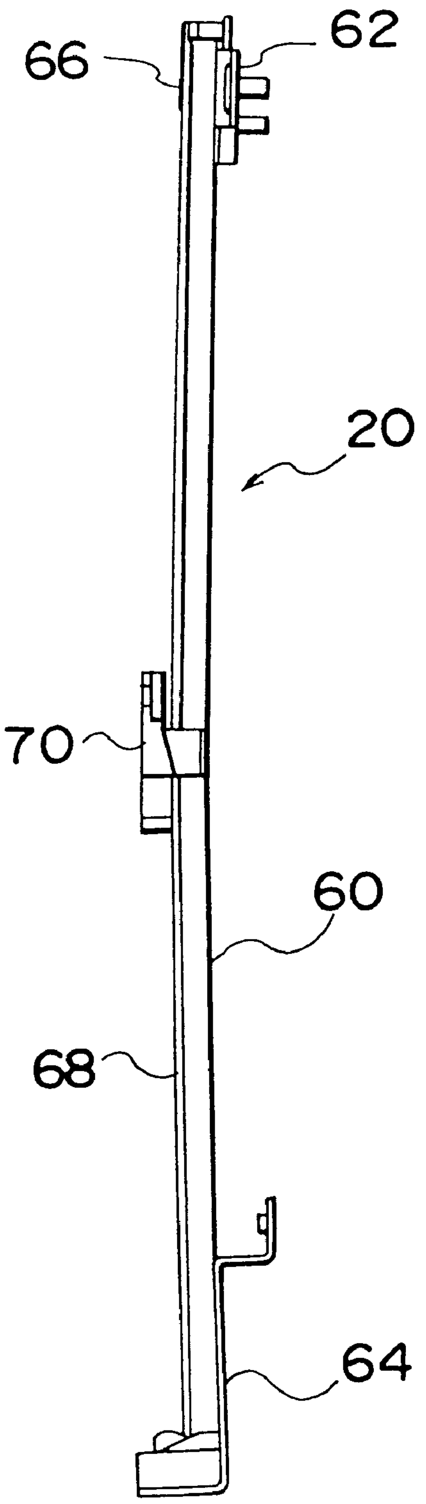
FIG. 3 is a side elevational view as seen from a direction of an arrow 3 in FIG. 1, which shows a second regulator main body of the power window regulator shown in FIG. 1.
Figure 5:
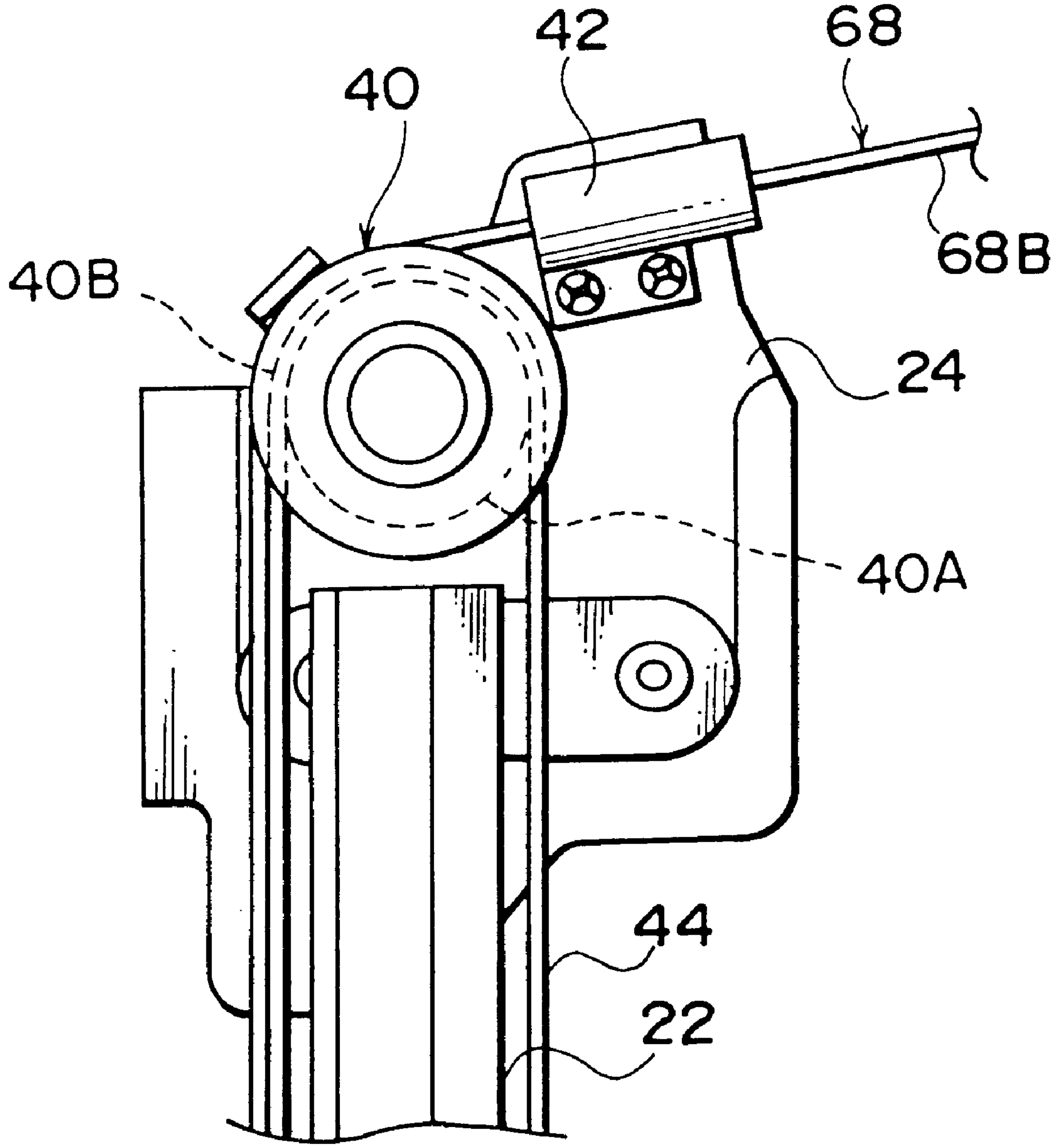
FIG. 5 is an enlarged front elevational view of a portion shown by an arrow 5 in FIG. 1, which mainly shows a structure near an upper pulley of the first regulator main body shown in FIG. 1.

A whole structure of the power window regulator 12 is shown in FIG. 1, structures of side surfaces of the first regulator main body 18 and the second regulator main body 20 are respectively shown in FIGS. 2 and 3, and a front elevational view enlarging a main portion of the first regulator main body 18 is shown in FIGS. 4 and 5. The structure of the first regulator main body 18 and the second regulator main body 20 will be described below with reference to the above drawings.

In particular, as shown in FIGS. 1 and 2, the first regulator main body 18 is provided with a first guide rail 22 arranged in a longitudinal direction corresponding to a direction in which a door glass vertically runs. A cross-sectional configuration of the first guide rail 22 is formed in a channel shape in which both end portions in an open side are respectively a predetermined length bent in a direction of moving in close to each other (refer to FIGS. 5 and 6). The first guide rail 22 is mounted to the side of the door main body 14 through an upper bracket 24 arranged at an upper end portion thereof, a middle bracket 26 arranged at a middle portion and a lower bracket 28 arranged at a lower end portion.

A motor 30 corresponding to "a driving source" normally and inversely rotated by operating a power window regulator switch (not shown) is arranged in the lower bracket 28. The motor 30 is structured so as to include a worm gear received within a worm receiving portion 32 and rotating around an axis, a worm wheel received within a worm wheel receiving portion 34 and rotating at a reduced speed by a rotation of the worm gear and an output shaft 36 (refer to FIG. 2) fitted to an axial core portion of the worm wheel and coaxially rotating together with the worm wheel. Further, a sprocket 38 corresponding to "a rolling body" is connected to the output shaft 36 of the motor through a power transmitting member (not shown), and it is structured such that when the output shaft 36 rotates around the axis thereof, the sprocket 38 also rotates in the same direction.

As shown in FIG. 5, an upper pulley 40 corresponding to "a rolling body" is mounted to the upper bracket 24 at a position opposing to the sprocket 38 in a vertical direction in such a manner as to freely rotate around the axis. Further, a guide member 42 for restricting a moving direction of a second tape 68 mentioned below is mounted to the upper bracket 24 at a position adjacent to the upper pulley 40. A tape winding portion is doubly provided in the upper pulley 40 in a shape of a concentric circle as a result, and a first tape 44 corresponding to a long body giving a predetermined rigidity to an inner tape winding portion 40A (corresponding to a tape winding portion inherently formed in an axial core portion of the upper pulley 40) and the sprocket 38 and having a flexibility is wound in a shape of a loop. A multiplicity of openings (not shown) formed in a rectangular shape or the like are formed in the first tape 44 at a predetermined interval, and it is structured such that a rotational force of the sprocket 38 is transmitted to the first tape 44 in accordance that a part of the openings is engaged with a tooth of the sprocket 38.

Figure 6:
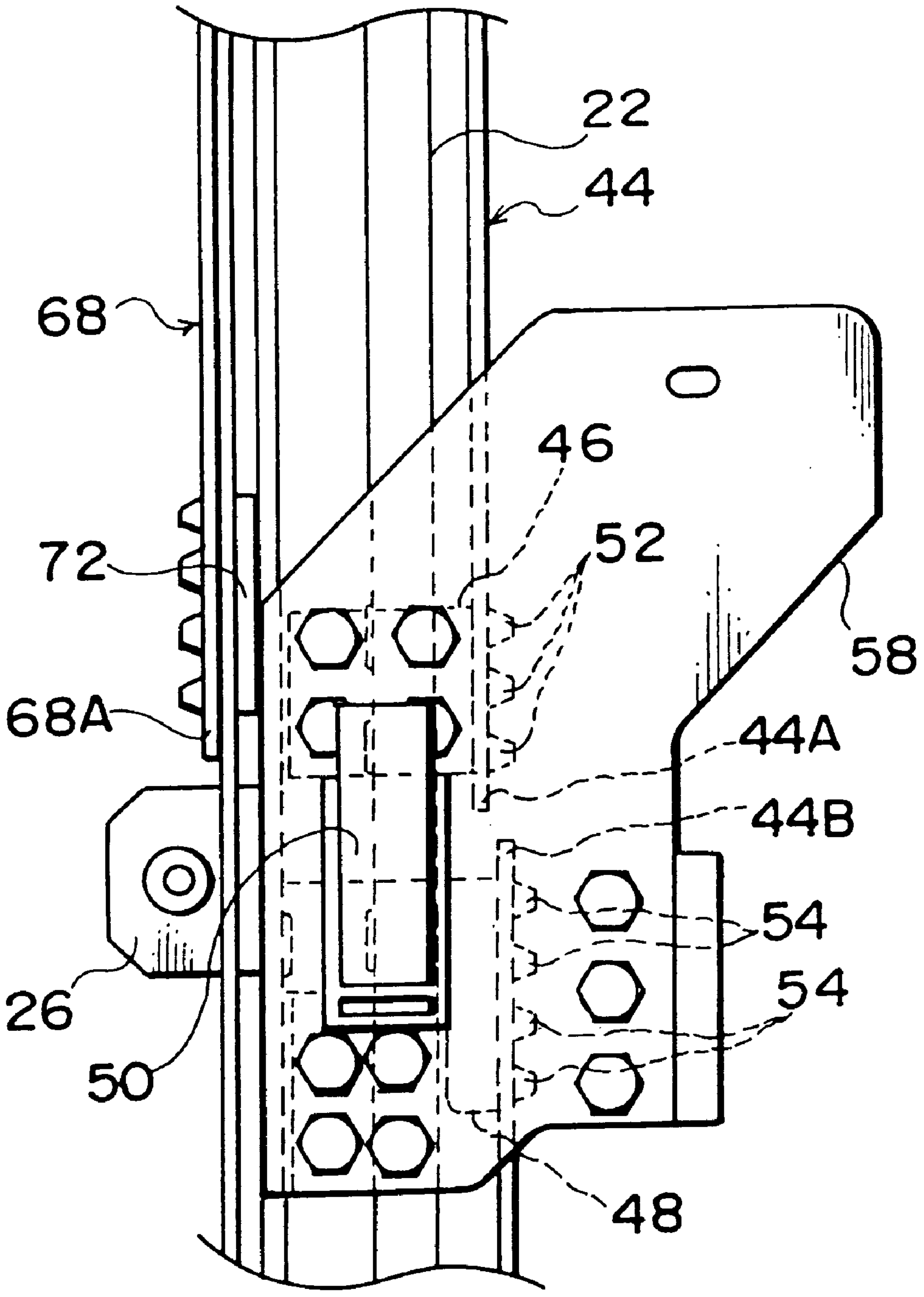
FIG. 6 is an enlarged front elevational view of a portion shown by an arrow 6 in FIG. 1, which mainly shows a structure near a carrier plate of the first regulator main body shown in FIG. 1.

As shown in FIG. 6, the first tape 44 does not constitute a closed loop only by itself, but constitutes a closed loop as a whole by a pair of upper and lower slides, upper slider 46 and lower slider 48 and a tension mechanism 50 connecting both and absorbing an extension of the first tape 44.

That is, the upper slider 46 and the lower slider 48 are slidably arranged in the first guide rail 22 apart from each other in a vertical direction, and an end portion 44A of the first tape 44 is fitted and locked to a plurality of projections 52 formed on a right side surface in the drawing of the upper slider 46. Further, the other end portion 44B of the first tape 44 is fitted and locked to a plurality of projections 54 formed on a right side surface in the drawing of the lower slider 48. Still further, the upper slider 46 and the lower slider 48 are connected to each other by the tension mechanism 50 tensioning and urging both in a direction of moving in close to each other. Accordingly, the first tape 44 is formed in a long and narrow loop shape along a longitudinal direction of the first guide rail 22 in a state that a predetermined tension is applied.

A carrier plate 58 corresponding to "a first glass carrier" for supporting a lower, edge side of a front end of a door glass 56 is fixed to the upper slider 46 mentioned above, and is structured to be ascended and descended along the first guide rail 22 integrally together with the upper slider 46.

In this case, in the structure mentioned above, the first tape 44, the upper slider 46, the lower slider 48 and the tension mechanism 50 correspond to "a first glass carrier raising/lowering long member" in accordance with the present invention.

On the contrary, as shown in FIGS. 1 and 3, the second regulator main body 20 is provided with a second guide rail 60 arranged in parallel to the first guide rail 22 and having a longitudinal direction corresponding to a direction in which the door glass vertically runs. An upper bracket 62 and a lower bracket 64 having a predetermined shape are respectively arranged in the upper end portion and the lower end portion of the second regulator main body 20 and are mounted to the side of the door main body 14 through the upper bracket 62 and the lower bracket 64. In this case, a cross-sectional shape of the second guide rail 60 is also formed in a channel shape in which both end portions in an open side are respectively a predetermined length bent in a direction of moving in close to each other.

Further, an upper pulley 66 corresponding to "a rolling body" in which a tape winding portion is a single structure is mounted to the upper bracket 62 in such a manner as to freely rotate around an axis, and a guide member 67 for restricting a moving direction of the second tape 68 mentioned below is mounted at a position adjacent to the upper pulley 66. Still further, a carrier plate 70 corresponding to "a second glass carrier" for supporting the lower edge side of the rear end of the door glass 56 is supported to a middle portion in a longitudinal direction of the second guide rail 60 in such a manner as to freely move in a vertical direction.

The second tape 68 corresponding to "a second glass carrier raising/lowering long member" having a predetermined rigidity and formed in a flexible long body is wound around the outer tape winding portion 40B (corresponding to a tape winding portion formed as a result that the first tape 44 is wound around the inner tape winding portion 40A inherently formed in the axial core portion of the upper pulley 40, and corresponding to an outer peripheral surface of the first tape 44) of the upper pulley 40 in the first regulator main body 18 and the upper pulley 66 in the second regulator main body 20. Here, the predetermined rigidity in this case means a rigidity required for ascending and descending the carrier plate 70 by a push-pull method.

More particularly, as shown in FIG. 1, an end portion 68A of the second tape 68 is fixed to a predetermined portion in a front end line of the loop-shaped first tape 44 of the first regulator main body 18 by a clip 72. Further, a middle portion 68B of the second tape 68 is drawn out to the side of the second regulator main body 20 after being wound around the outer tape winding portion 40B of the upper pulley 40 at the side of the first regulator main body 18. Still further, the middle portion 68B of the second tape 68 is wound around the upper pulley 66 at the side of the second regulator main body 20 and suspended down after being substantially horizontally arranged between the upper end portions of the first guide rail 22 and the second guide rail 60 by being passed a pair of guide members 42 and 67. Further, the other end portion 68C of the second tape 68 is locked to a side portion of the carrier plate 70 at the side of the second regulator main body 20. Accordingly, the second tape 68 is as a whole arranged in a substantially C shape in which a lower portion is open.

Next, an operation and an effect of this embodiment will be described below.

An operation and an effect on the basis of a structural layout of this embodiment are as follows.

In accordance with the power window regulator 12 of this embodiment, since the first regulator main body 18 including the first guide rail 22 and the first tape formed in a long and narrow loop shape along the first guide rail 22 is arranged in the front end side of the door within the side door 10 at the side of the passenger seat of the large-sized truck, the second regulator main body 20 including the second guide rail 60 arranged in parallel to the first guide rail 22 is arranged in the rear end side of the door, and the front end side line of the first tape 44 and the carrier plate 70 arranged at the side of the second regulator main body 20 are connected by the second tape 68 to form a substantially C shape; a wide space can be secured between the first guide rail 22 and the second guide rail 60.

As a result, in accordance with this embodiment, the structure can reply to a request that the viewing window 16 (an auxiliary glass for securing a view) for securing a downward view should be provided near the lower side of the center portion of the side door 10 at the side of the passenger seat.

An operation and an effect on the basis of a motion of the power window regulator 12 in accordance with the present invention are as follows.

When a power window regulator switch (not shown) is operated to ascend the door glass 56, the motor 30 is normally driven. When the motor 30 is normally driven, the sprocket 38 rotates in a counterclockwise direction in FIG. 1 through the worm gear, the worm gear wheel, the output shaft 36 and the like so as to move the first tape 44 in a direction of an arrow A. Here, at this time, the upper pulley 40 also rotates in a counterclockwise direction in the same manner as that of the sprocket 38. When the first tape 44 moves in a direction of the arrow A, the carrier plate 58 connected to the rear end side line of the first tape 44 ascends and an end portion 68A of the second tape 68 connected to the front end side line of the first tape 44 is drawn to the lower side of the door. Accordingly, the second tape 68 moves in a direction of an arrow B in FIG. 1 and the carrier plate 70 is ascended (pulled) along the second guide rail 60 by the second tape 68. As a result, the door glass 56 ascends while being supported by a pair of carrier plates 58 and 70.

On the contrary, when the power window regulator switch (not shown) is operated to descend the door glass 56, the motor 30 is inversely driven. When the motor 30 is inversely driven, the sprocket 38 rotates in a clockwise direction in FIG. 1 to move the first tape 44 in a direction opposite to the direction of the arrow A. When the first tape 44 moves in a direction opposite to the direction of the arrow A, the carrier plate 58 descends and an end portion 68A of the second tape 68 is drawn up to the upper side of the door. Accordingly, the second tape 68 moves in a direction opposite to the direction of the arrow B in FIG. 1 and the carrier plate 70 is descended (pushed) along the second guide rail 60 by the second tape 68. As a result, the door glass 56 descends while being supported by a pair of carrier plates 58 and 70. In this case, since the second tape 68 has a predetermined rigidity which can push down the carrier plate 70, there is not a problem such that the carrier plate 70 cannot be pushed down due to bending at a time of pushing down the carrier plate 70.

As mentioned above, in accordance with this embodiment, since the structure is made such that the carrier plate 58 at the side of the first regulator main body 18 is ascended and descended by the first tape 44 moving to form a loop and the carrier plate 70 at the side of the second regulator main body 20 is ascended and descended by the push-pull type second tape 68, it is not necessary to complexly fold back a wire to ascend and descend a pair of carrier plates 58 and 70 in a conventional manner. As a result, in accordance with this embodiment, even when repeatedly used, a fatigue accumulated in the first tape 44 and the second tape 68 is a small, so that a durability of the first tape 44 and the second tape 68 and a durability of the power window regulator 12 can be improved.

The above is a basic operation and effect of this embodiment, however, in accordance with this embodiment, the following operation and effect can be further obtained.

Firstly, in accordance with this embodiment, since the structure is made such that the carrier plate 70 is ascended and descended by using the second tape 68 corresponding to the tape-shaped long body having a predetermined rigidity, the push-pull operation of the carrier plate 70 can be stably performed.

That is, for example, in the case of performing the push-pull operation of the carrier plate 70 by the wire in the conventional manner, since the wire is generally structured to be a stranded wire, the wire is easily bent at a time of pushing down the carrier plate 70 and a pressing area (a cross-sectional area of the wire) is small, so that it is hard to stably push down the carrier plate 70. However, when using the second tape 68 corresponding to the tape-shaped long body having a predetermined rigidity as in this embodiment, a cross-sectional area and a rigidity useful for pressing the carrier plate 70 can be easily secured, so that the push-pull operation of the carrier plate 70 can be stably performed.

Secondly, in accordance with this embodiment, since the loop-shaped first tape 44 corresponding to the tape-shaped long body is used as the structure for ascending and descending the carrier plate 58, the first tape 44 and the second tape 68 can be structured as the same member in a construction. Accordingly, an end portion 68A of the second tape 68 can be simply connected (fixed) to the first tape 44 by the clip 72, and a stress concentration is hard to be generated in the connection portion between the both.

Thirdly, in accordance with this embodiment, since the middle portion 68B of the second tape 68 is arranged to move between the upper end portions of the first guide rail 22 and the second guide rail 60, not only the center portion of the door main body 14 of the side door 10 but also the lower edge side can be made a free space. Accordingly, the structure can easily respond to a request that the viewing window 16 for securing the downward view mentioned above should be provided and the like.

Further, the weight of the door glass 56 can be utilized at a time of pushing down the carrier plate 70 at the side of the second guide rail 60 when the door glass 56 descends by arranging the middle portion 68B of the second tape 68 so as to move between the upper end portions of the first guide rail 22 and the second guide rail 60. Accordingly, a rigidity required for the second tape 68 can be restricted to a minimum limit.

Fourthly, in accordance with this embodiment, when the door glass 56 is ascended, the sprocket 38, the upper pulley 40 at the side of the first regulator main body 18 and the upper pulley 66 at the side of the second regulator main body 20 rotate in a counterclockwise direction in FIG. 1. On the contrary, when the door glass 56 is descended, all of the sprocket 38, the upper pulley 40 at the side of the first regulator main body 18 and the upper pulley 66 at the side of the second regulator main body 20 rotate in a clockwise direction in FIG. 1. That is, since direction of rotation of the sprocket 38 and a pair of upper pulleys 40 and 66 at a time when the door glass 56 ascends and descends are set to be the same rotational direction, the total length of the first tape 44 and the second tape 68 can be made short in comparison with a structure in which a rotational direction of any one of the rolling bodies such as the pulley and the like is different from a rotational direction of the other rolling bodies. Accordingly, a cost reduction can be realized.

Further, when the rotational direction of any one of the rolling bodies is different from the rotational direction of the other rolling bodies, a bending direction of the first tape 44 and the second tape 68 changes at every rolling body and a multiplicity of folded portions are passed, so that a fatigue is easily accumulated, however, in accordance with this embodiment, the fatigue can be prevented from being accumulated. Accordingly, a durability of the first tape 44 and the second tape 68 and a durability of the power window regulator 12 can be improved.

Fifthly, in accordance with this embodiment, since the structure is made such that the upper pulley 40 arranged in the upper end side of the guide rail 22 is structured in a double construction provided with the inner tape winding portion 40A inherently formed and the outer tape winding portion 40B formed as a result, the upper end side of the first tape 44 moving to form a loop is wound around the inner tape winding portion 40A, and the middle portion 68B of the second tape 68 is wound around the outer tape winding portion 40B, a number of the parts can be reduced and a structure can be simplified in comparison with the case that a pulley around which the upper end side of the first tape 44 is wound and a pulley around which the middle portion of the second tape 68 is wound are independently provided.

Figure 7:
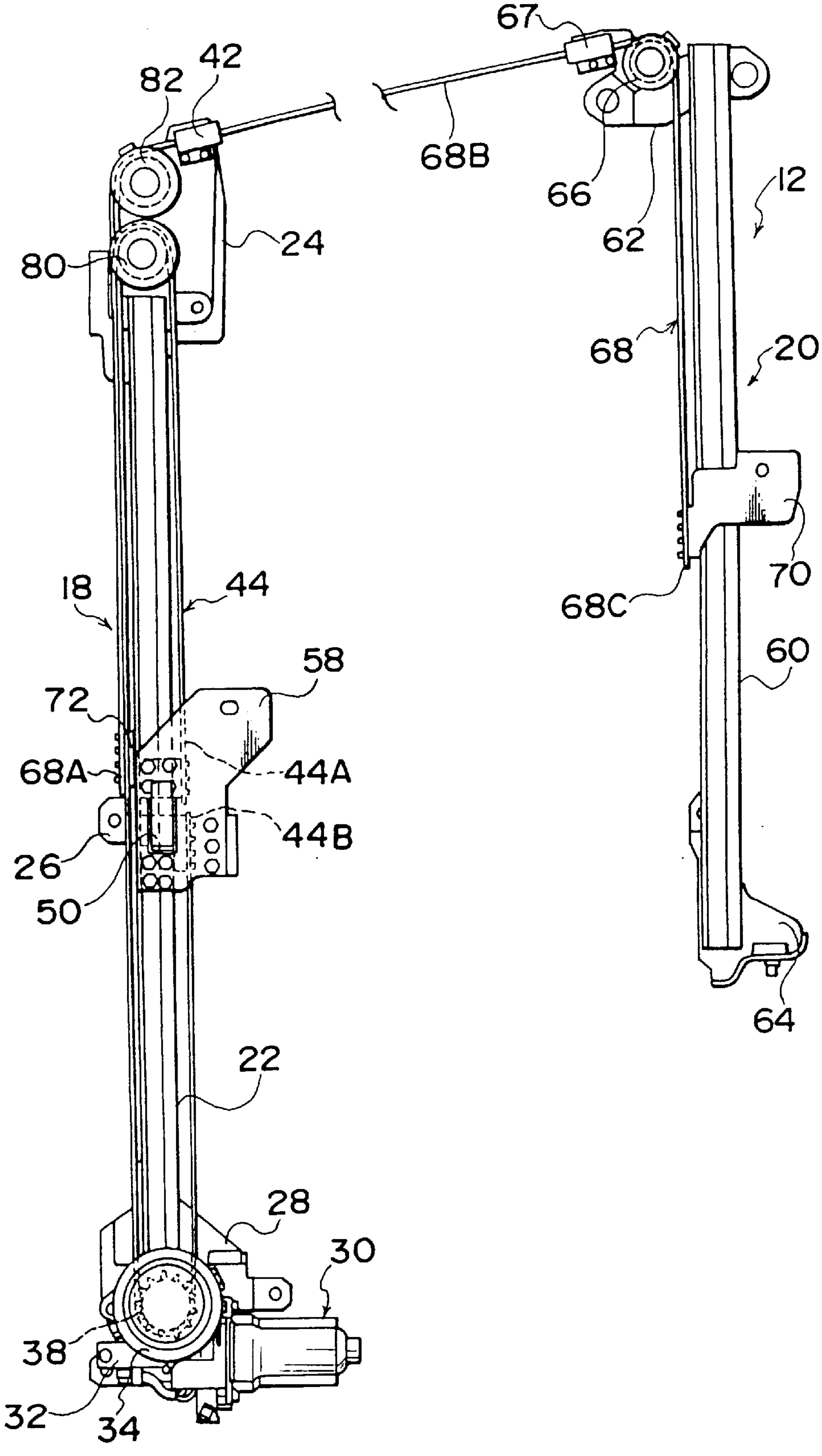
FIG. 7 is a front elevational view corresponding to FIG. 1, showing an embodiment in which upper pulleys at the side of the first regulator main body are independently provided.

In accordance with this embodiment, as mentioned above, the structure is made such that the first tape 44 and the second tape 68 are doubly wound around the upper pulley 40, however, the structure is not always made in the above manner, and as shown in FIG. 7, the structure may be made such that the upper first pulley 80 corresponding to "a rolling body" for winding the first tape 44 and the upper second pulley 82 corresponding to "a rolling body" for winding the second tape 68 are independently provided.

In this case, there is a disadvantage that a number of parts is increased in comparison with the structure in which the first tape 44 and the second tape 68 are doubly wound around the upper pulley 40. However, there is an advantage that the upper end side of the first tape 44 and the middle portion 68B of the second tape 68 are prevented from being slidably in contact with each other at the bending portion as much as possible. As a result, a durability of the first tape 44 and the second tape 68 and a durability of the power window regulator 12 can be improved.

Further, in accordance with this embodiment, the structure is made such that the other end portion 68B of the second tape 68 is only engaged with the side surface of the carrier plate 70, however, as described below, slackness prevention means of the second tape 68 may be additionally provided at the side of the second guide rail 60.

Figure 8:
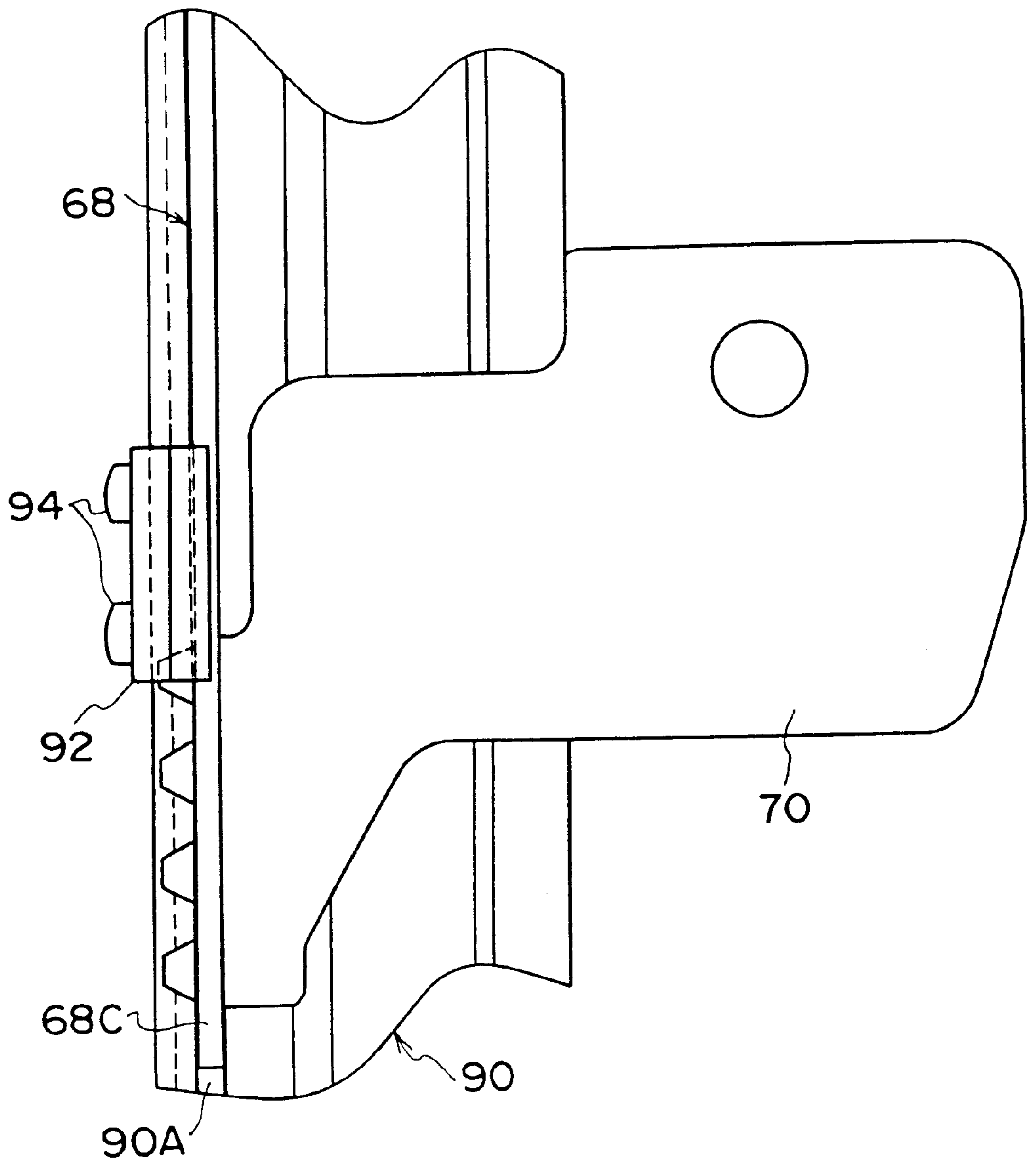
FIG. 8 is an enlarged front elevational view of a main portion showing an embodiment in which a slackness prevention means for a second tape is added.
Figure 9:
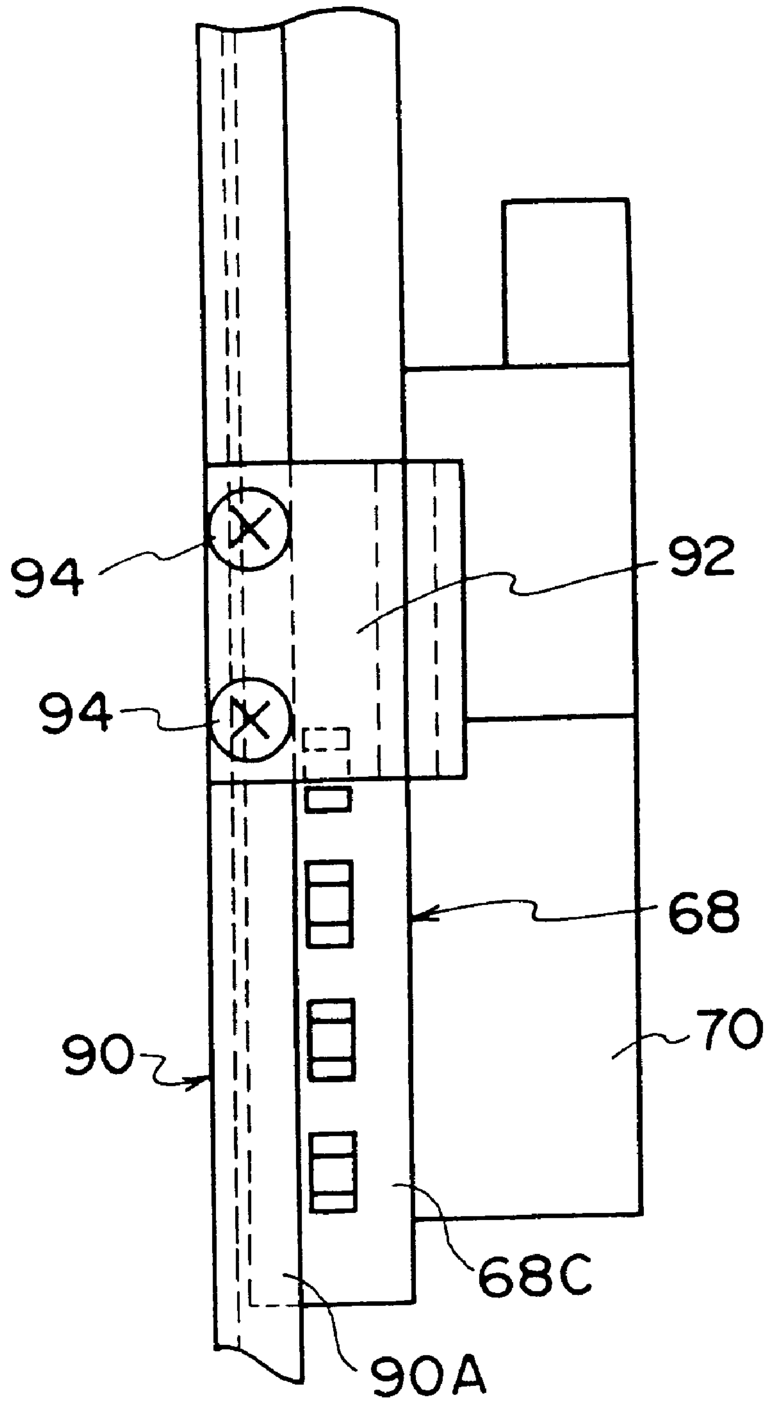
FIG. 9 is a side elevational view which shows a state of viewing the slackness prevention means shown in FIG. 8 from a side portion.
Figure 10:
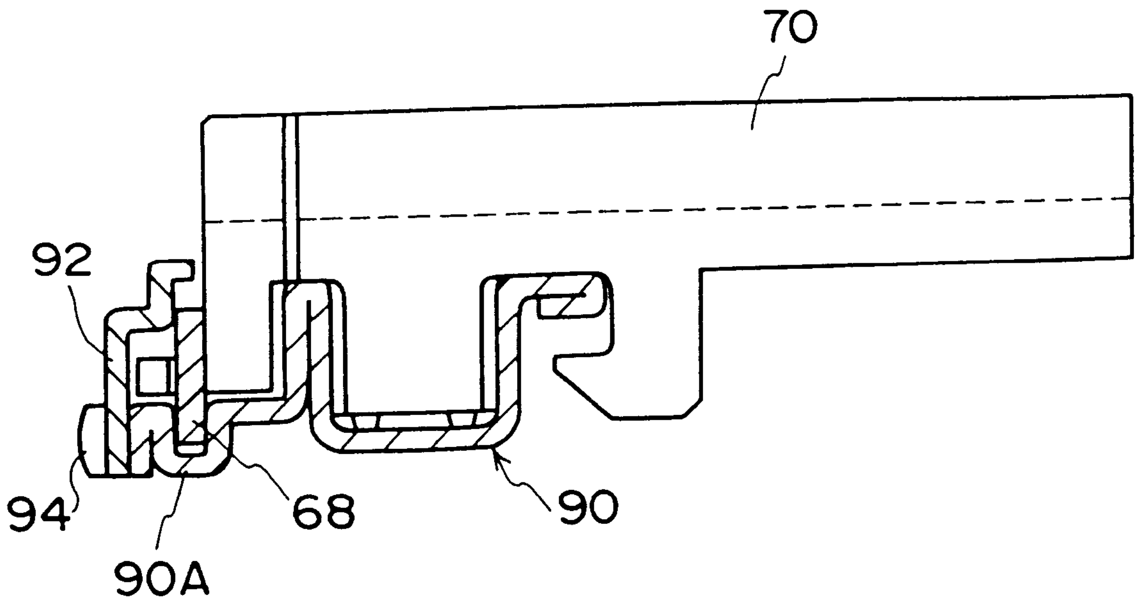
FIG. 10 is a cross sectional view which shows a horizontal cross-sectional structure of the slackness prevention means shown in FIG. 8 as seen from a bottom surface side.

In particular, as shown in FIG. 8 to 10, in accordance with this embodiment, a first guide portion 90A having a portion bent in a C shape to surround an end portion in a widthwise direction of the second tape 68 is integrally formed in a side portion of a second guide rail 90. Further, a plurality of second guide portions 92 each having an end portion bent in a step shape are fixed to a predetermined position in a longitudinal direction of the first guide portion 90A at a predetermined interval by a screw 94. Then, a movement of both end portions in a widthwise direction of the second tape 68 is guided by the C-shaped portion of the first guide portion 90A and the step-shaped end portion of the second guide portion 92 which are understood as the slackness prevention means, whereby a slackness of the second tape 68 can be prevented.

Next, another embodiment in accordance with the present invention will be described below with reference to FIGS. 11 to 17. In this case, the same reference numerals are attached to the same elements as those of the embodiment shown in FIG. 1 mentioned above, and an explanation thereof will be omitted.

Figure 11:
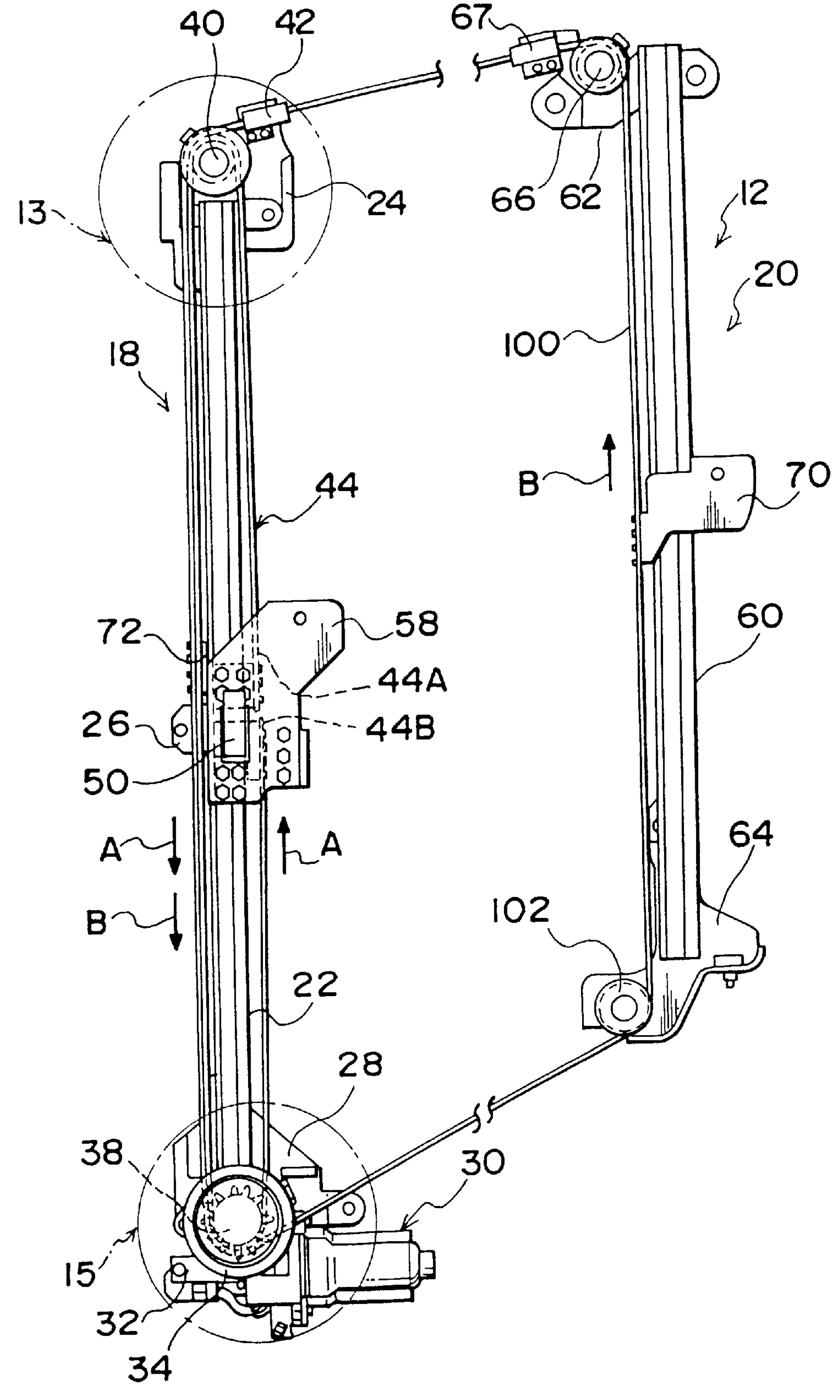
FIG. 11 is a front elevational view which shows a total structure of a power window regulator in accordance with another embodiment of the present invention.
Figure 12:
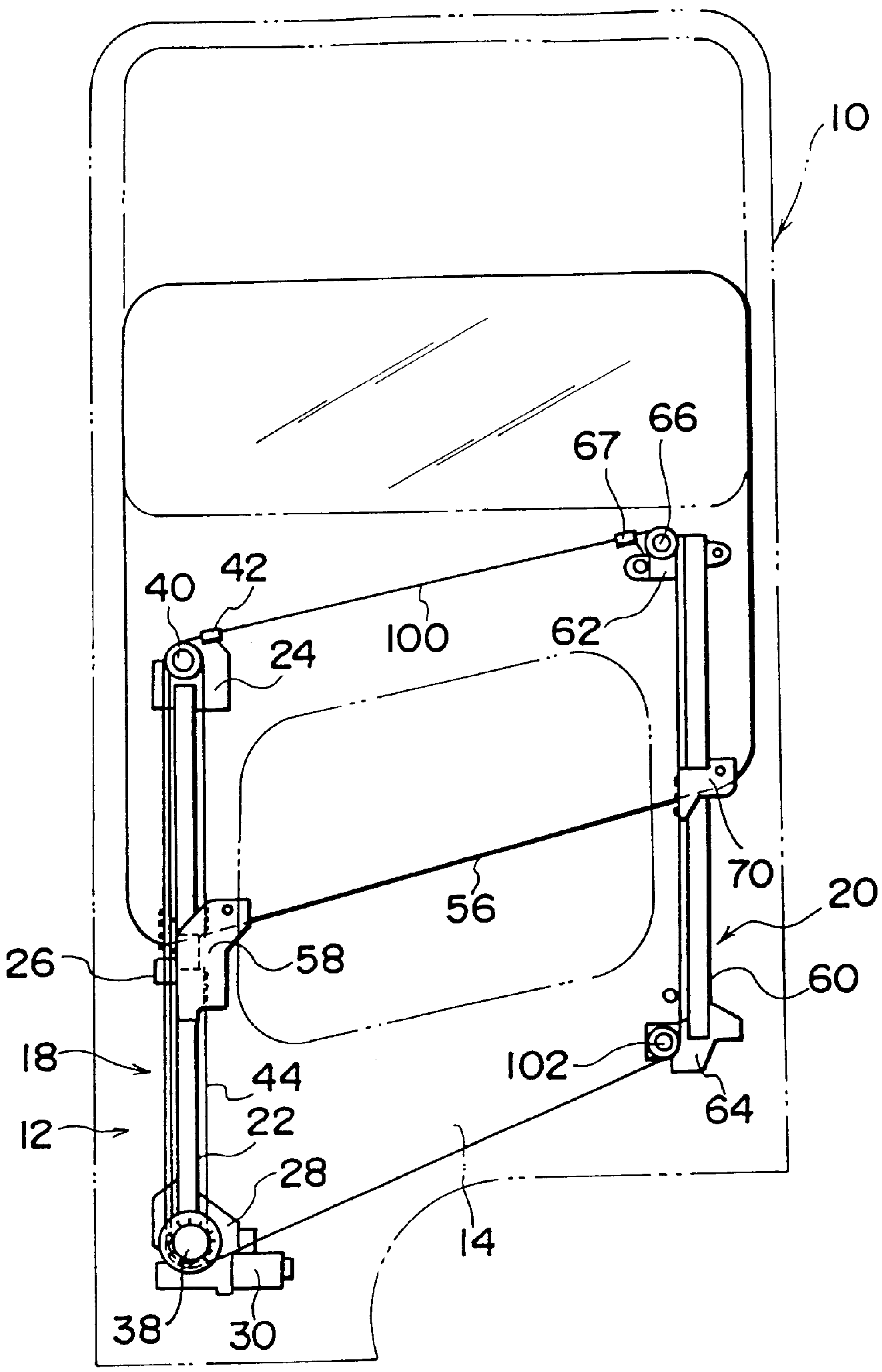
FIG. 12 is a schematically front elevational view which shows a side door in a side of an passenger seat of a large-sized truck having a power window regulator provided by taking an existence of a viewing window in accordance with the embodiment shown in FIG. 11 into consideration.
Figure 13:
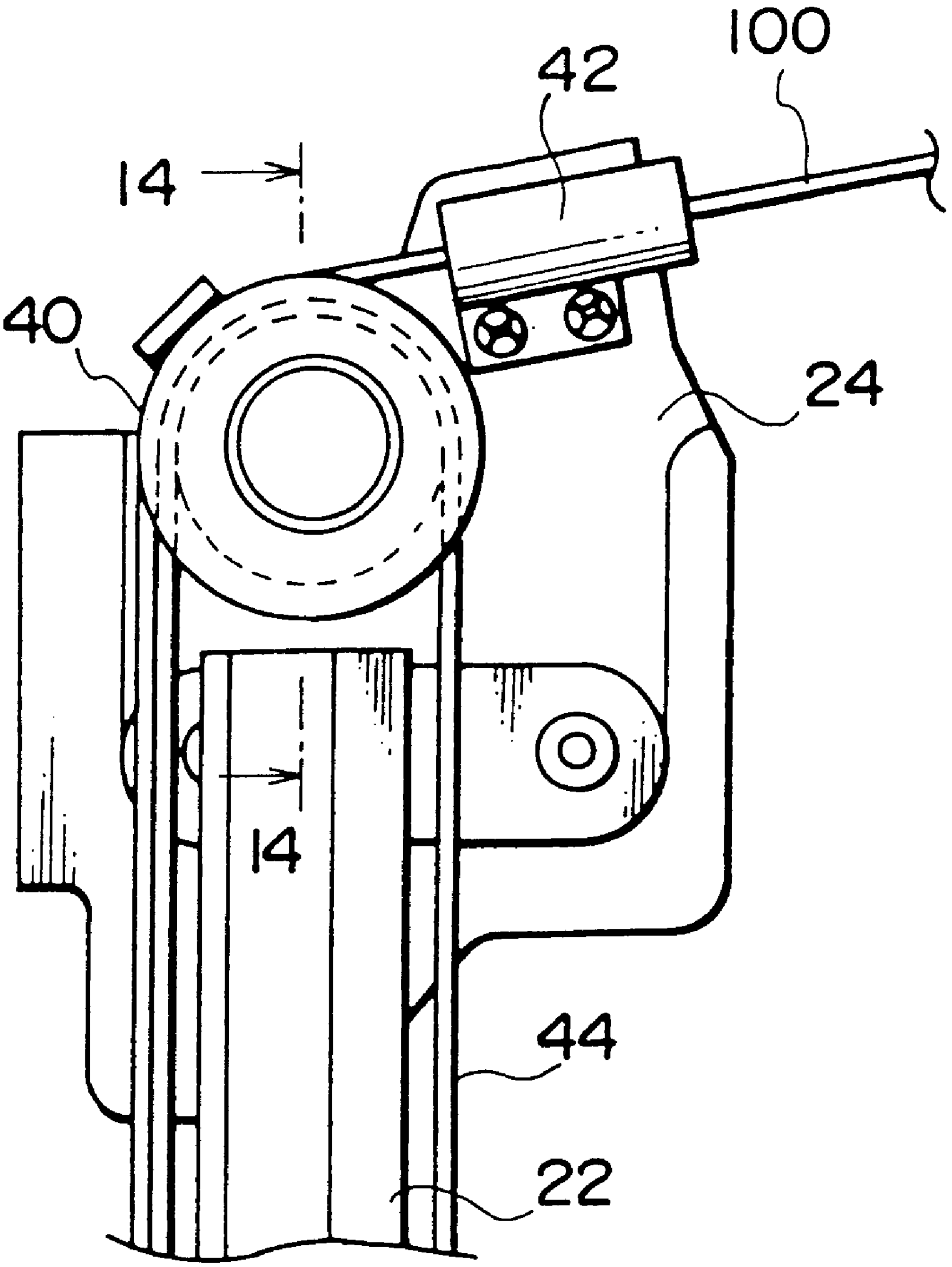
FIG. 13 is an enlarged front elevational view of a portion shown by an arrow 13 in FIG. 11, which mainly shows a structure near an upper pulley of a first regulator main body shown in FIG. 11.
Figure 14:
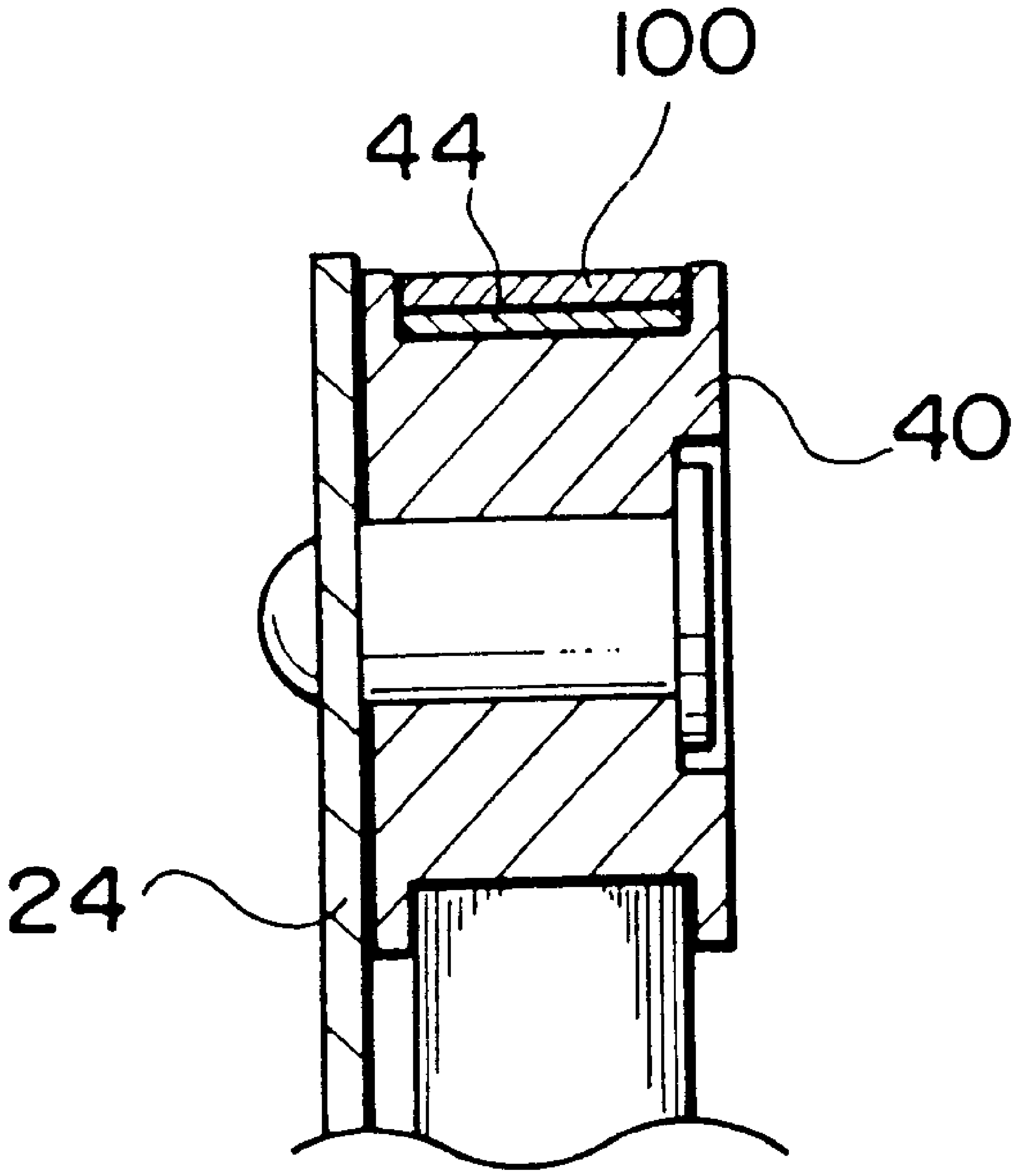
FIG. 14 is a vertical cross-sectional view along a line 14—14 in FIG. 13, showing a state in which a first tape and a second tape are wound around the upper pulley.
Figure 15:
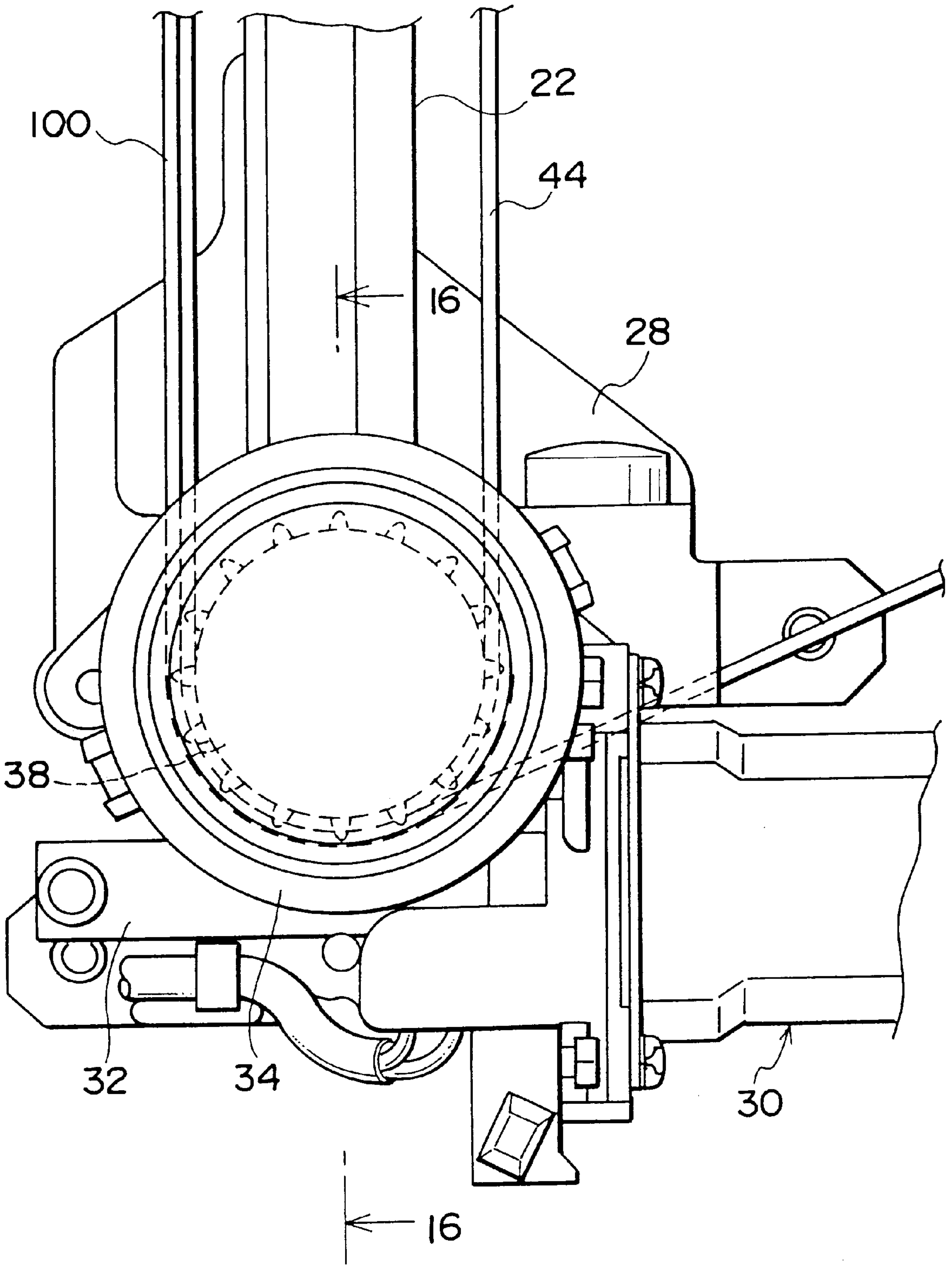
FIG. 15 is an enlarged front elevational view of a portion shown by an arrow 15 in FIG. 11, which mainly shows a structure near a sprocket of the first regulator main body shown in FIG. 11.

Representatively, as shown in FIG. 11, in accordance with this embodiment, there is characterized in that a system of the power window regulator 12 is established by connecting two loop-shaped first tapes 44 and a second tape 100 by the clip 72.

In particular, the first tape 44 having the same structure as that of the embodiment mentioned above is wound around the upper pulley 40 arranged in the upper end side of the first guide rail 22 and the sprocket 38 arranged in the lower end side thereof so as to form a loop. The carrier plate 58 arranged at the side of the first guide rail 22 is connected to the first tape 44.

Further, the second tape 100 corresponding to "a second glass carrier raising/lowering long member" previously formed in a loop shape is wound around the upper pulley 40 arranged in the upper end side of the first guide rail 22, the sprocket 38 arranged in the lower end side, the upper pulley 66 arranged in the upper end side of the second guide rail 60 and a lower pulley 102 arranged in the lower end side. In this case, a leftward upper end side of the second tape 100 is wound around the outer peripheral surface of the first tape 44 already wound around the upper pulley 40 in an overlapping manner (refer to FIGS. 13 and 14). Further, a leftward lower end side of the second tape 100 is wound around the outer peripheral surface of the first tape 44 already wound around the sprocket 38 in an overlapping manner (refer to FIGS. 15 and 16).

In this case, the lower bracket 64 arranged in the lower end side is tensioned toward the side of the first guide rail 22 to arrange the lower pulley 102 corresponding to "a rolling body" in the lower end side of the second guide rail 60.

The second tape 100 mentioned above is connected to the other carrier plate 70 arranged at the side of the second guide rail 60 and also connected to the first tape 44 by the clip 72.

The structure mentioned above is the main portion of this embodiment. The structure described below corresponds to a structure which is also employed in the embodiment shown in FIGS. 1 to 6 mentioned above in the same manner, however, since a detail is omitted, a supplementary explanation will be given here.

Figure 16:
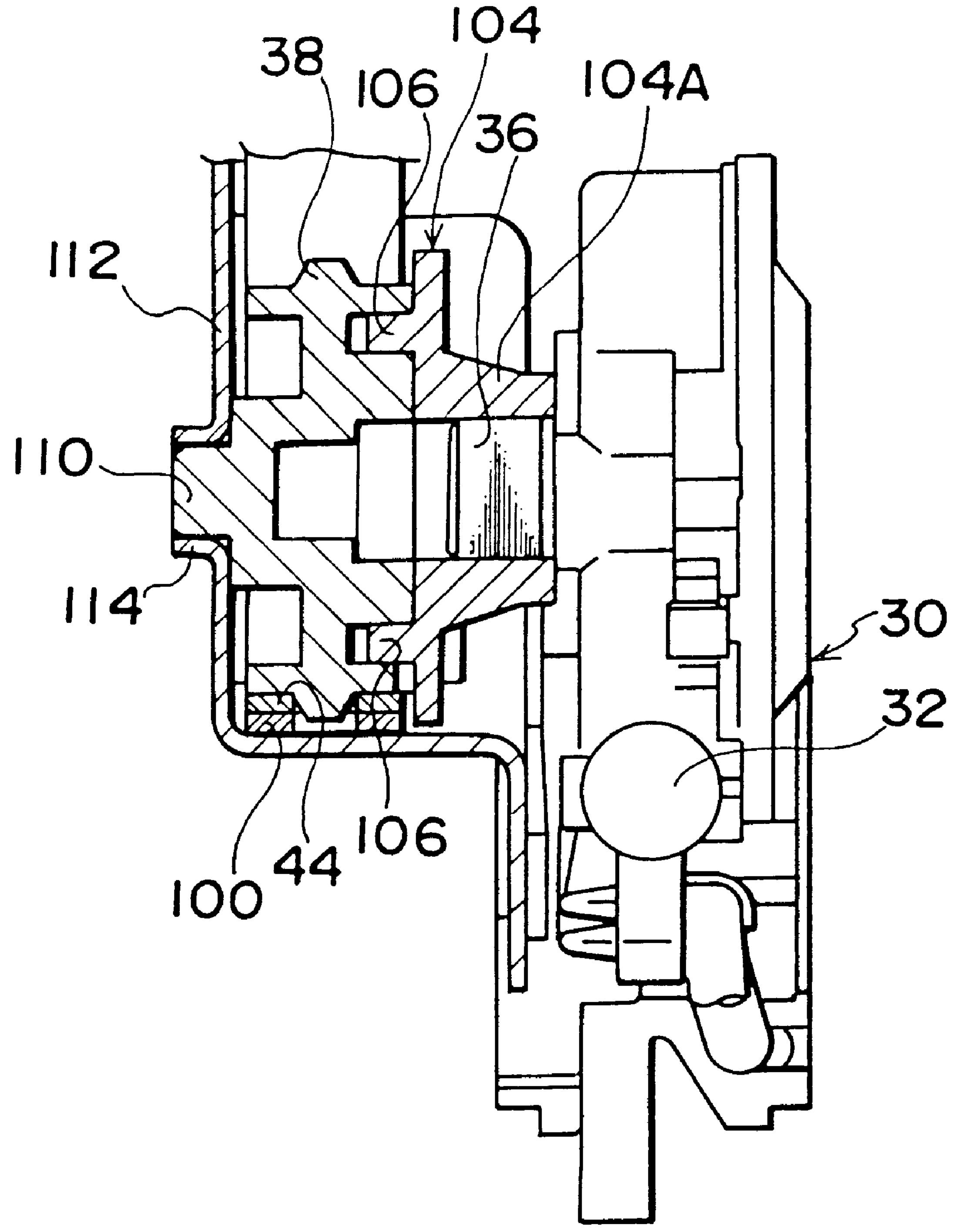
FIG. 16 is a vertical cross sectional view along a line 16—16 in FIG. 15, showing a state in which the first tape and the second tape are wound around the sprocket.

A vertical cross-sectional structure of the motor 30 corresponding to a driving source for driving the power window regulator 12 is shown in FIG. 16 in an enlarged manner. As is understood from a hatching line attached to the drawing, the output shaft 36 of the motor 30 is formed in a shape of a square pole. The output shaft 36 is fitted to an axial core boss portion 104A of a power transmitting member 104 formed substantially in a disc shape. Further, cylindrical small projections 106 are provided in an outer periphery side of a back surface in the power transmitting member 104 at an interval of 90 degrees in a standing manner, and four small projections 106 are fitted to the sprocket 38. A cylindrical support shaft portion 110 is integrally formed in the axial core portion of the sprocket 38, and the support shaft portion 110 is axially supported to a bearing portion 114 formed in a housing 112.

The same operation and effect as those of the embodiment shown in FIG. 1 and the like mentioned above can be obtained by the structure mentioned above.

That is, an operation and an effect on the basis of a structural layout in accordance with this embodiment are as follows.

In accordance with the power window regulator 12 of this embodiment, the first guide rail 22 and the second guide rail are arranged in the front end side of the door and the rear end side of the door within the side door 10 at the side of the passenger seat of the large-sized truck in parallel to each other with setting the direction of ascending and descending the door glass as a longitudinal direction. Accordingly, a wide space can be secured between the first guide rail 22 and the second guide rail 60. Further, the first tape 44 connected to one carrier plate 58 and ascending and descending it is provided at the side of the first guide rail 22 to form a long and narrow loop. Accordingly, the space is not made narrow by the first tape 44. Still further, since the loop-shaped second tape 100 is arranged between the first guide rail 22 and the second guide rail 60, the other carrier plate 58 is connected to the second tape 100 and the first tape 44 is connected by the clip 72, the space is not made narrow by the second tape 100.

As a result, also in accordance with this embodiment, the structure can reply to a request that the viewing window (an auxiliary glass for securing a view) for securing a downward view should be provided near the lower side of the center portion of the side door 10 at the side of the passenger seat.

An operation and an effect on the basis of a motion of the power window regulator 12 in accordance with the present invention are as follows.

When a power window regulator switch (not shown) is operated to ascend the door glass 56, the motor 30 is normally driven. When the motor 30 is normally driven, the sprocket 38 rotates in a counterclockwise direction in FIG. 11 through the worm gear, the worm gear wheel, the output shaft 36, the power transmitting member 104 and the like so as to move the first tape 44 in a direction of an arrow A. Here, at this time, the upper pulley 40 also rotates in a counterclockwise direction in the same manner as that of the sprocket 38. When the first tape 44 moves in a direction of the arrow A, the carrier plate 58 connected to the rear end side line of the first tape 44 ascends and the second tape 100 connected to the front end side line of the first tape 44 also moves in a direction of an arrow B to form a loop. Accordingly, the carrier plate 70 connected to the second tape 100 is ascended (pulled) along the second guide rail 60. As a result, the door glass 56 ascends while being supported by a pair of carrier plates 58 and 70.

On the contrary, when the power window regulator switch (not shown) is operated to descend the door glass 56, the motor 30 is inversely driven. When the motor 30 is inversely driven, the sprocket 38 rotates in a clockwise direction in FIG. 11 to move the first tape 44 in a direction opposite to the direction of the arrow A. When the first tape 44 moves in a direction opposite to the direction of the arrow A, the carrier plate 58 descends and the second tape 100 is also moved in a direction opposite to the direction of the arrow B so as to form a loop. Accordingly, the carrier plate 70 is descended (pushed) along the second guide rail 60 by the second tape 100. As a result, the door glass 56 descends while being supported by a pair of carrier plates 58 and 70.

As mentioned above, in accordance with this embodiment, since the structure is made such that the carrier plate 58 at the side of the first regulator main body 18 is ascended and descended by the first tape 44 moving to form a long and narrow loop and the carrier plate 70 at the side of the second regulator main body 20 is ascended and descended by the second tape 100 moving to form a wide loop, it is not necessary to complexly fold back a wire to ascend and descend a pair of carrier plates 58 and 70 in a conventional manner. As a result, in accordance with this embodiment, even when repeatedly using, a fatigue accumulated in the first tape 44 and the second tape 100 is a little, so that a durability of the first tape 44 and the second tape 100 and a durability of the power window regulator 12 can be improved.

Further, in accordance with this embodiment, since both of the first tape 44 for ascending and descending the carrier plate 58 at the side of the first guide rail 22 and the second tape 100 for ascending and descending the carrier plate 70 at the side of the second guide rail 60 are structured in a loop shape, both of the ascending motion and the descending motion of the carrier plate 70 can be performed by a pull operation (a drawing operation) of the second tape 100. Accordingly, a required rigidity of the second tape 100 can be reduced at a degree that it is unnecessary to consider the push operation.

The above is a basic operation and effect of this embodiment, however, in accordance with this embodiment, the following operation and effect can be further obtained.

Firstly, in accordance with this embodiment, since the structure is made such that the carrier plate 70 is ascended and descended by using the second tape 100 corresponding to the tape-shaped long body having a predetermined rigidity, the ascending and descending operation of the carrier plate 70 can be stably performed.

Secondly, in accordance with this embodiment, since the loop-shaped first tape 44 corresponding to the tape-shaped long body is used as the structure for ascending and descending the carrier plate 58, the first tape 44 and the second tape 100 can be structured as the same member in a construction. Accordingly, the second tape 100 can be simply connected (fixed) to the first tape 44 by the clip 72, and a stress concentration is hard to be generated in the connection portion between the both.

Thirdly, in accordance with this embodiment, since the second tape 100 is arranged to move between the upper end portions of the first guide rail 22 and between the lower end portions and the second guide rail 60, the center portion of the door main body 14 of the side door 10 can be made a free space. Accordingly, the structure can easily respond to a request that the viewing window 16 for securing the downward view mentioned above should be provided and the like.

Fourthly, in accordance with this embodiment, when the door glass 56 is ascended, the sprocket 38, the upper pulley 40 at the side of the first regulator main body 18 and the upper pulley 66 and the lower pulley 102 at the side of the second regulator main body 20 rotate in a counterclockwise direction in FIG. 11. On the contrary, when the door glass 56 is descended, the sprocket 38, the upper pulley 40 at the side of the first regulator main body 18 and the upper pulley 66 and the lower pulley 102 at the side of the second regulator main body 20 rotate in a clockwise direction in FIG. 11. That is, since direction of rotation of the sprocket 38, a pair of upper pulleys 40 and 66 and the lower pulley 102 at a time when the door glass 56 ascends and descends are set to be the same rotational direction, the total length of the first tape 44 and the second tape 100 can be made short in comparison with a structure in which a rotational direction of any one of the rolling bodies such as the pulley and the like is different from a rotational direction of the other rolling bodies. Accordingly, a cost reduction can be realized.

Further, when the rotational direction of any one of the rolling bodies is different from the rotational direction of the other rolling bodies, a bending direction of the first tape 44 and the second tape 100 changes at every rolling bodies and a multiplicity of folded portions are passed, so that a fatigue is easily accumulated, however, in accordance with this embodiment, the fatigue can be prevented from being accumulated. Accordingly, a durability of the first tape 44 and the second tape 100 and a durability of the power window regulator 12 can be improved.

Fifthly, in accordance with this embodiment, since the structure is made such that both of the first tape 44 and the second tape 100 are wound around the upper pulley 40 corresponding to "an upper rolling body" arranged in the upper end side of the guide rail 22 and the sprocket 38 corresponding to "a lower rolling body", a number of the parts can be reduced and a structure can be simplified in comparison with the case that a pulley around which the first tape 44 is wound and a pulley around which the second tape 100 is wound are independently provided.

Figure 17:
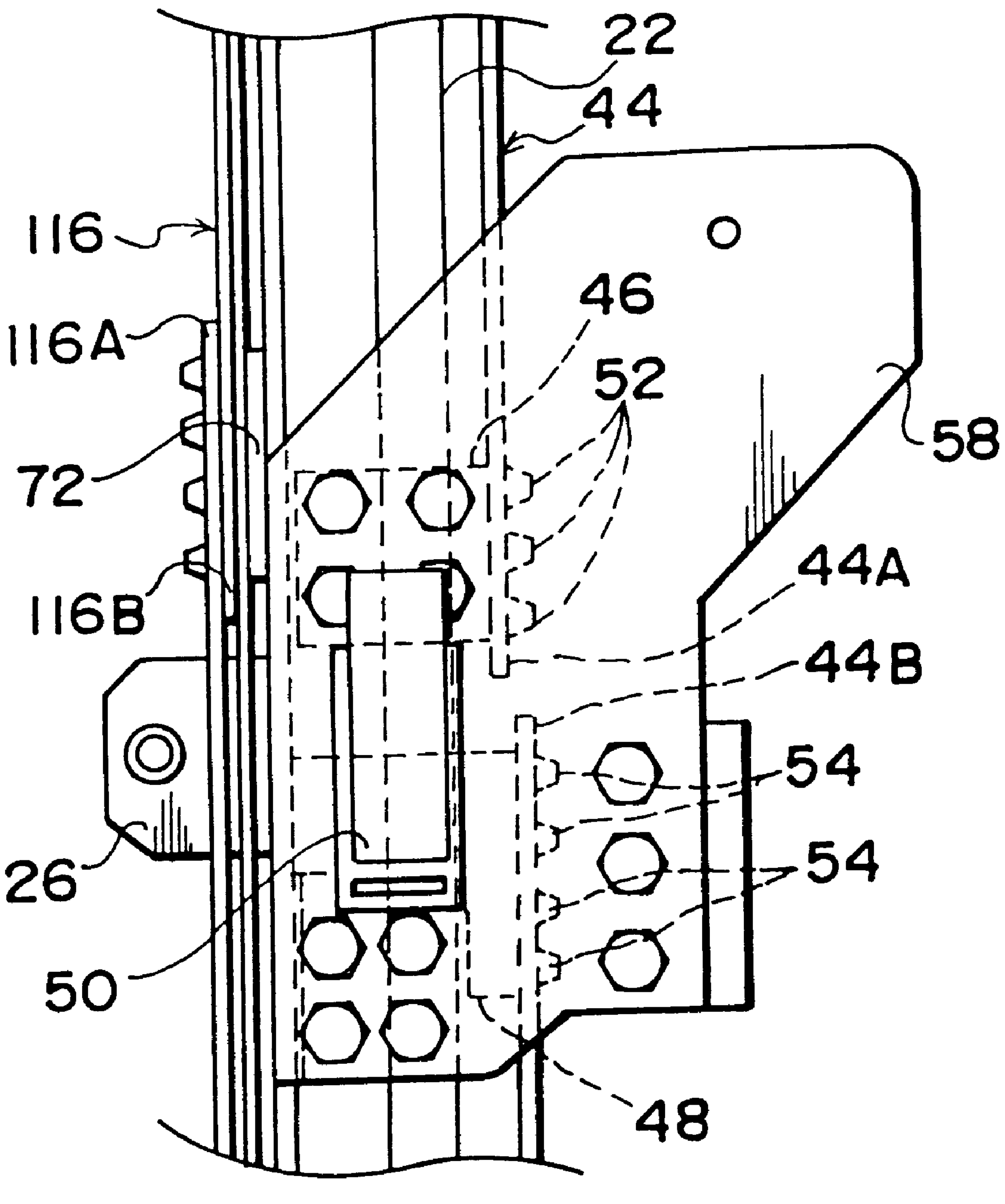
FIG. 17 is an enlarged front elevational view corresponding to FIG. 6, which shows another embodiment of the second tape.

In this case, in accordance with the embodiment shown in FIG. 11, the second tape 100 previously formed in a loop shape is used, however, the structure is not limited to this, and as shown in FIG. 17, a second tape 116 forming a loop as a result may be used. As is briefly described, the second tape 116 corresponding to "a second glass carrier raising/lowering long member" is structured in the same manner as that of the first tape 44 and is formed in a loop shape by overlapping both end portions 116A and 116B and clipping to the first tape 44 by the clip 72.

In this case, in accordance with the embodiment shown in FIG. 11, as mentioned above, the structure is made such that the first tape 44 and the second tape 100 are doubly wound around the upper pulley 40. However, the structure is not always made in the above manner. The structure may be made such that the upper pulley for winding the first tape 44 and the upper pulley for winding the second tape 100 are independently provided.

In this case, as described in the embodiment shown in FIG. 7 mentioned above, there is a disadvantage that a number of the parts is increased in comparison with the structure in which the first tape 44 and the second tape 100 are doubly wound around the upper pulley 40. However, there is an advantage that the upper end side of the first tape 44 and the left side of the upper end of the second tape 100 are prevented from being slidably in contact with each other at the bending portion as much as possible. As a result, a durability of the first tape 44 and the second tape 100 and a durability of the power window regulator 12 can be improved.

Next, the other embodiment in accordance with the present invention will be described below with reference to FIGS. 18 to 23. In this case, the same reference numerals are attached to the same elements as those of the embodiment shown in FIGS. 1 and 11 mentioned above, and an explanation thereof will be omitted.

Figure 18:
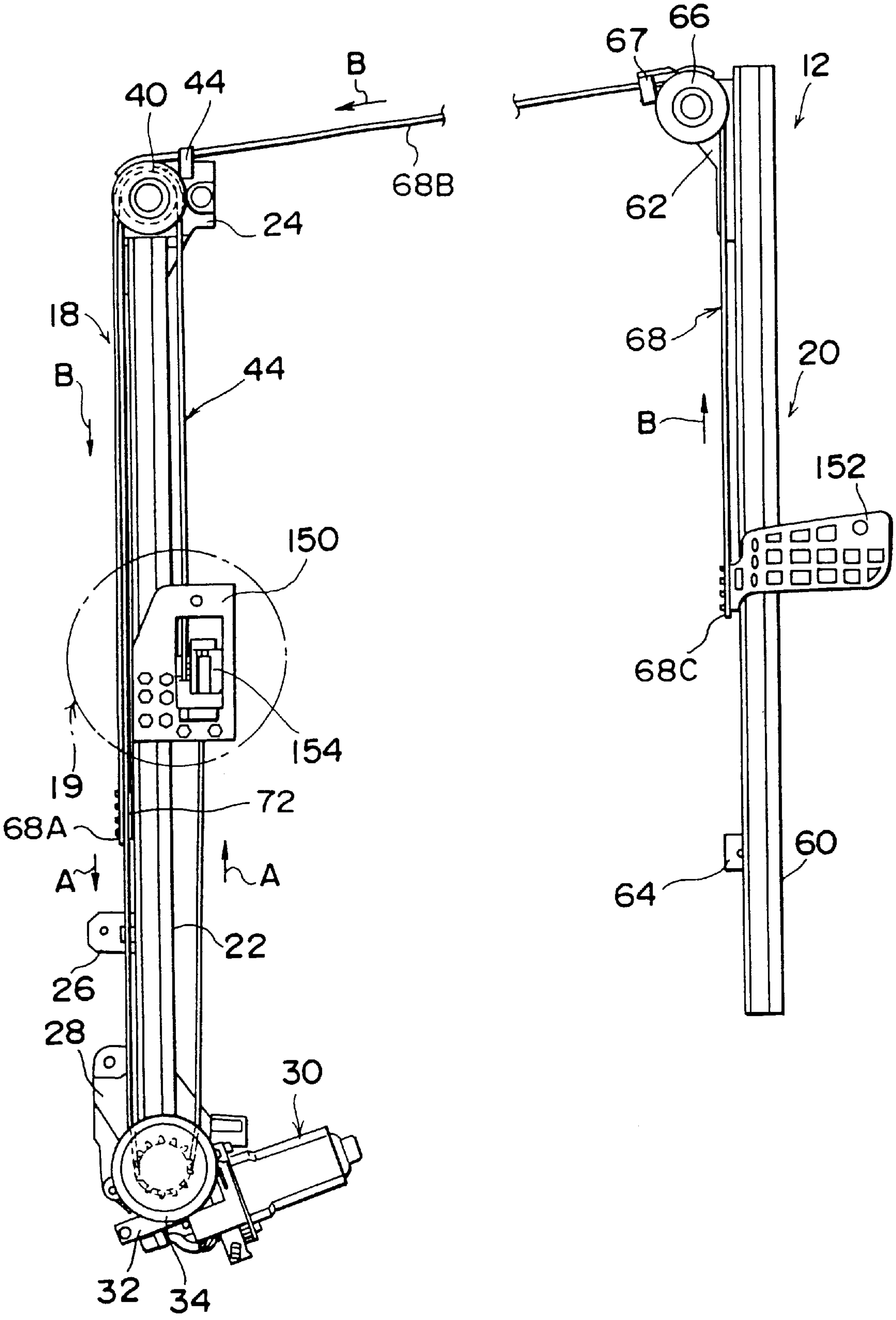
FIG. 18 is a front elevational view which shows a total structure of a power window regulator in accordance with the other embodiment of the present invention.

As shown in FIG. 18, this embodiment is common to the embodiment shown in FIG. 1 in view of the structure for ascending and descending a carrier plate 150 corresponding to "a first glass carrier" arranged at the side of the first guide rail 22 by using the first tape 44 moving to form a loop and ascending and descending a carrier plate 152 corresponding to "a second glass carrier" arranged at the side of the second guide rail 60 by using the push-pull type second tape 68 linearly moving.

In this embodiment, there is characterized by a structure of an extension absorbing mechanism (a tension mechanism) 154 for absorbing an extension of the first tape 44 moving to form a loop, and the structure will be in detail described below.

Figures 19A, 19B, 19C:
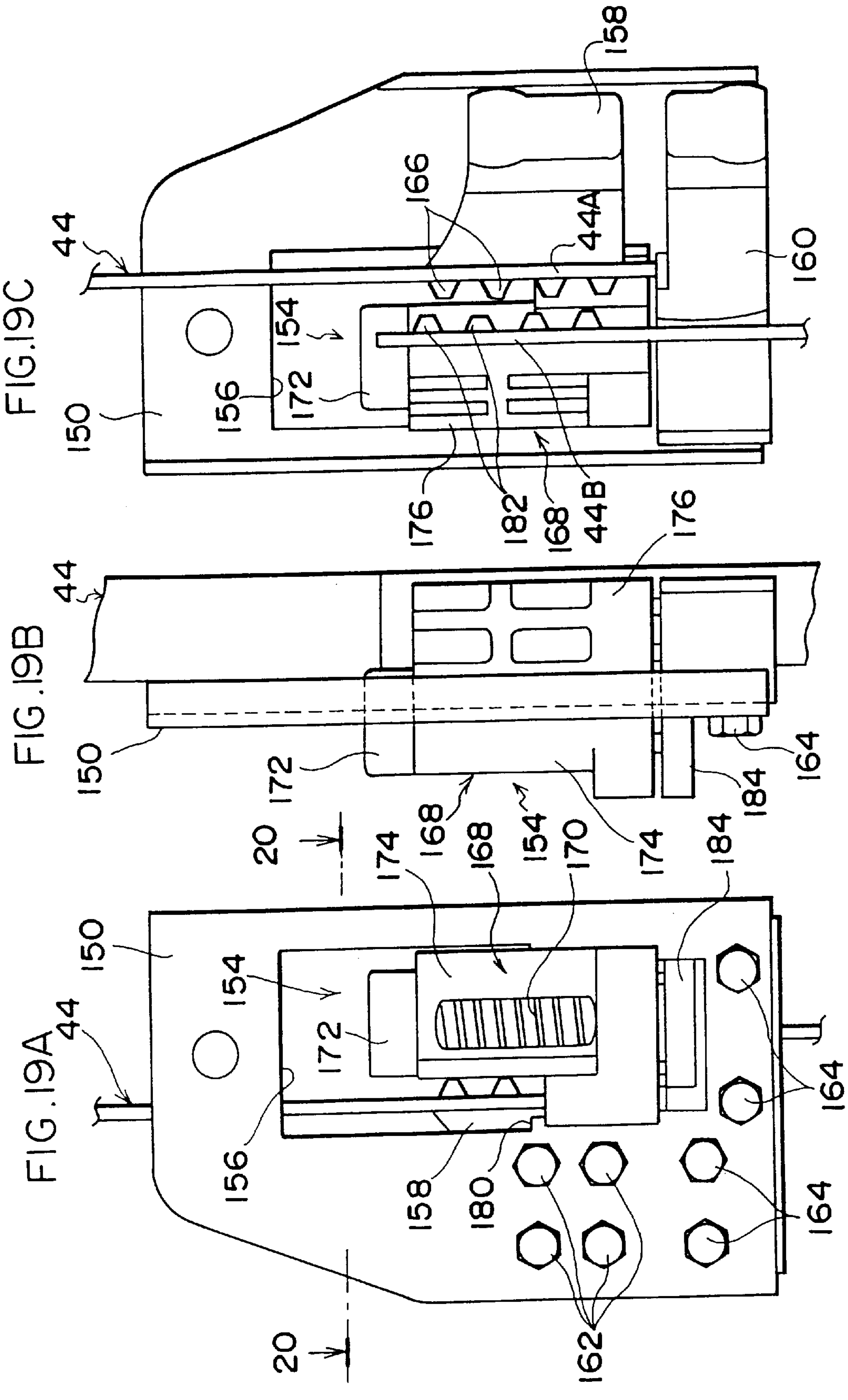
FIG. 19A is an enlarged front elevational view of a carrier plate (corresponding to a portion shown by an arrow 19 in FIG. 18) in which an extension absorbing mechanism is arranged.
FIG. 19B is an enlarged side elevational view of the same.
FIG. 19C is an enlarged back surface view of the same.
Figure 20:
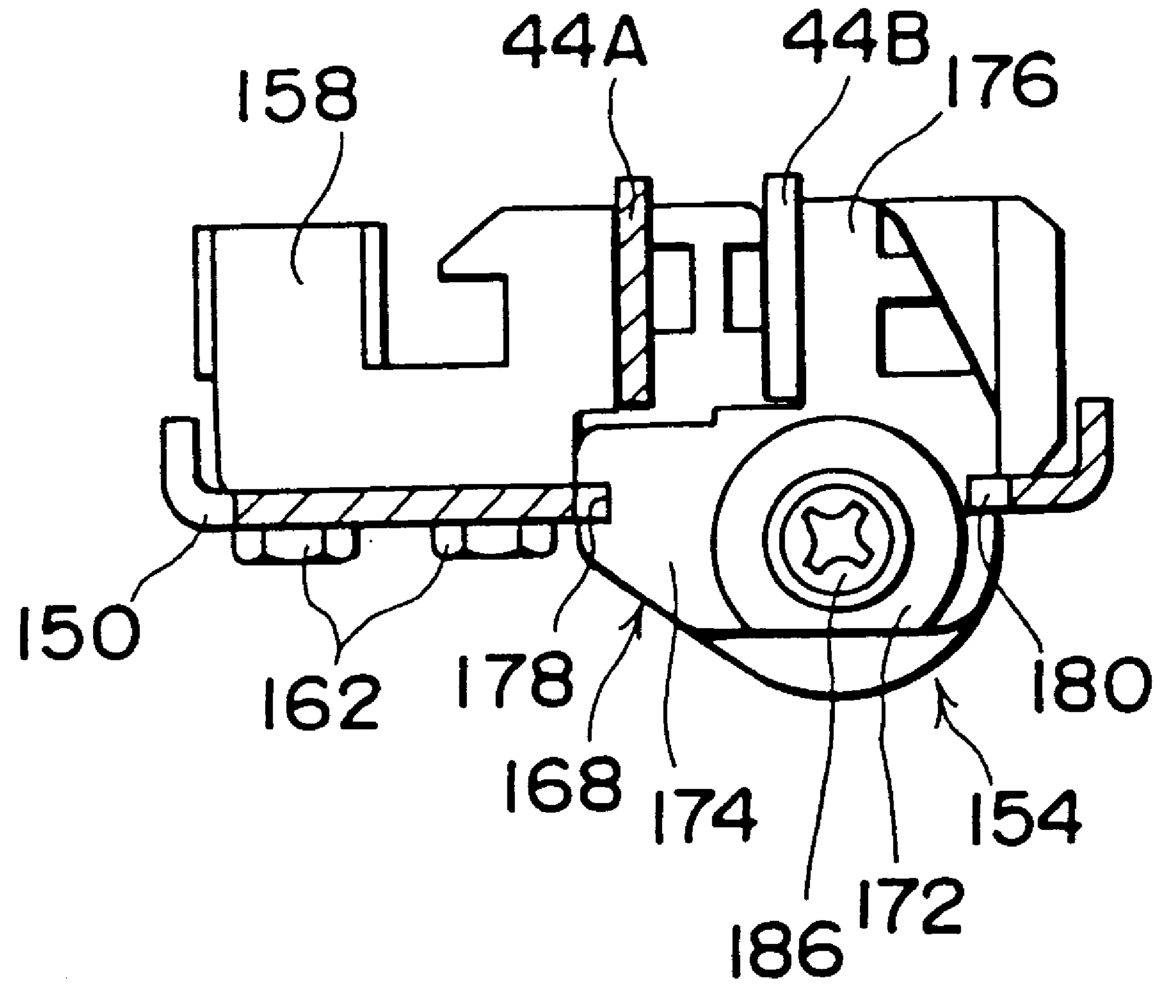
FIG. 20 is a horizontal cross-sectional view of the extension absorbing mechanism shown in FIG. 19 (corresponding to a cross-sectional view along a line 20—20 in FIG. 19A).

A front elevational view of the carrier plate 150 arranged at the side of the first guide rail 22 is shown in FIG. 19A, a side surface view of the carrier plate 150 is shown in FIG. 19B and a back surface view of the carrier plate 150 is shown in FIG. 19C. Further, a horizontal cross-sectional view of the carrier plate 150 is shown in FIG. 20.

As shown in these drawings, an opening portion 156 formed in a substantially rectangular shape is formed substantially in a center portion of the carrier plate 150. Further, two kinds of guides 158 and 160 for guiding a vertical motion of the carrier plate 150 along the first guide rail 22 are respectively fixed to a back surface side of the carrier plate 150 by bolts 162 and 164.

Both of the guides 158 and 160 are made of resin and formed in a block shape. However, a plurality of projections 166 are formed on a side surface of the guide 158 arranged in a side portion of the opening portion 156. One end portion 44A of the first tape 44 is fitted (pressure inserted) to each of the projections 166, whereby one end portion 44A is fixed to the carrier plate 150 through the guide 158.

Further, the extension absorbing mechanism 154 corresponding to "an extension absorbing body" is arranged within the opening portion 156 of the carrier plate 150. The extension absorbing mechanism 154 is mainly constituted by a slider 168, a compression spring 170 corresponding to "an elastic body" and a stopper 172 corresponding to "an adjusting body".

In particular, the slider 168 is arranged to extend through the opening portion 156 of the carrier plate 150, and is provided with a cylindrical spring receiving portion 174 constituting an upper side and a block-shaped tape mounting portion 176 constituting a lower side. A slide groove 178 (refer to FIG. 20) is formed in each of both side portions of the spring receiving portion 174, and a pair of rail portions 180 extended out in a direction of coming near to each other from the both side portions of the opening portion 156 in the carrier plate 150 are fitted to the slide grooves 178. Accordingly, the slider 168 can slide in a vertical direction along a pair of rail portions 180 within the opening portion 156.

Further, a plurality of projections 182 are formed on a side surface of the tape mounting portion 176 of the slider 168 to oppose to the projection 166 of the guide 158. The other end portion 44B of the first tape 44 is fitted (pressure inserted) to the projection 182, whereby the other end portion 44B is fixed to the slider 168. Accordingly, one end portion 44A and the other end portion 44B of the first tape 44 are arranged in a state of opposing to each other (in an overlapping state), and the slider 168 is also arranged to offset to one end portion 44A in a longitudinal direction of the door.

Still further, a compression coil spring 170 is received within the spring receiving portion 174 of the slider 168. A lower end portion of the compression coil spring 170 is brought into contact with and locked with a spring locking plate 184 formed at the side of the lower end portion of the opening portion 156 in the carrier plate 150. Further, an upper end portion of the compression coil spring 170 is brought into contact with and locked with a stopper 172 fixed to the spring receiving portion 174 by a screw 186. Accordingly, the compression coil spring 170 always presses and urges the slider 168 to an upper portion.

In this case, an urging force of the compression coil spring 170 (that is, a spring length) is structured to be adjusted by adjusting a fastening position of the stopper 172 by the screw 186.

In accordance with the structure mentioned above, there is a case that an extension is generated in the first tape 44 moving to form a loop due to a change of a temperature in an environment, a long time use and the like. In this case, the slider 168 to which the other end portion 44B of the first tape 44 is fixed is slid upward by an urging force of the compression coil spring 170. Accordingly, the extension generated in the first tape 44 is absorbed, and the a slackness can be prevented from being generated in the first tape 44.

In this case, in accordance with this embodiment, since the slider 168 for absorbing the extension of the first tape 44 is disposed to offset in a longitudinal direction of the door with respect to one end portion 44A, a slide stroke of the slider 168 can be greatly secured. Accordingly, even in the case that an extension generated in the first tape 44 is great, the extension can be securely absorbed by the slider 168.

That is, one end portion 44A and the other end portion 44B of the first tape 44 are arranged to oppose each other in a vertical direction of the door, so that one end portion 44A and the other end portion 44B can be connected to each other through the extension absorbing body. However, in this case, since a distance between the both end portions 44A and 44B is significantly short, an absorbable extension amount is made small.

On the contrary, in accordance with this embodiment, since the slider 168 is arranged to offset in the longitudinal direction of the door with respect to one end portion 44A of the first tape 44, a slide stroke of the slider 168 can be secured to be great, so that an absorbable extension amount is made great. As a result, in accordance with this embodiment, a slackness is securely prevented from being generated in the first tape 44, and a proper operation of the power window regulator 12 can be secured.

Further, in accordance with this embodiment, since the urging force of the compression coil spring 170 pressing and urging the slider 168 to a tape extending direction can be adjusted by controlling a position of the stopper mounted to the spring receiving portion 174 of the slider 168 by means of the screw 186, a magnitude of the urging force to be applied to the first tape 44 can be made optimum.

Figure 21:
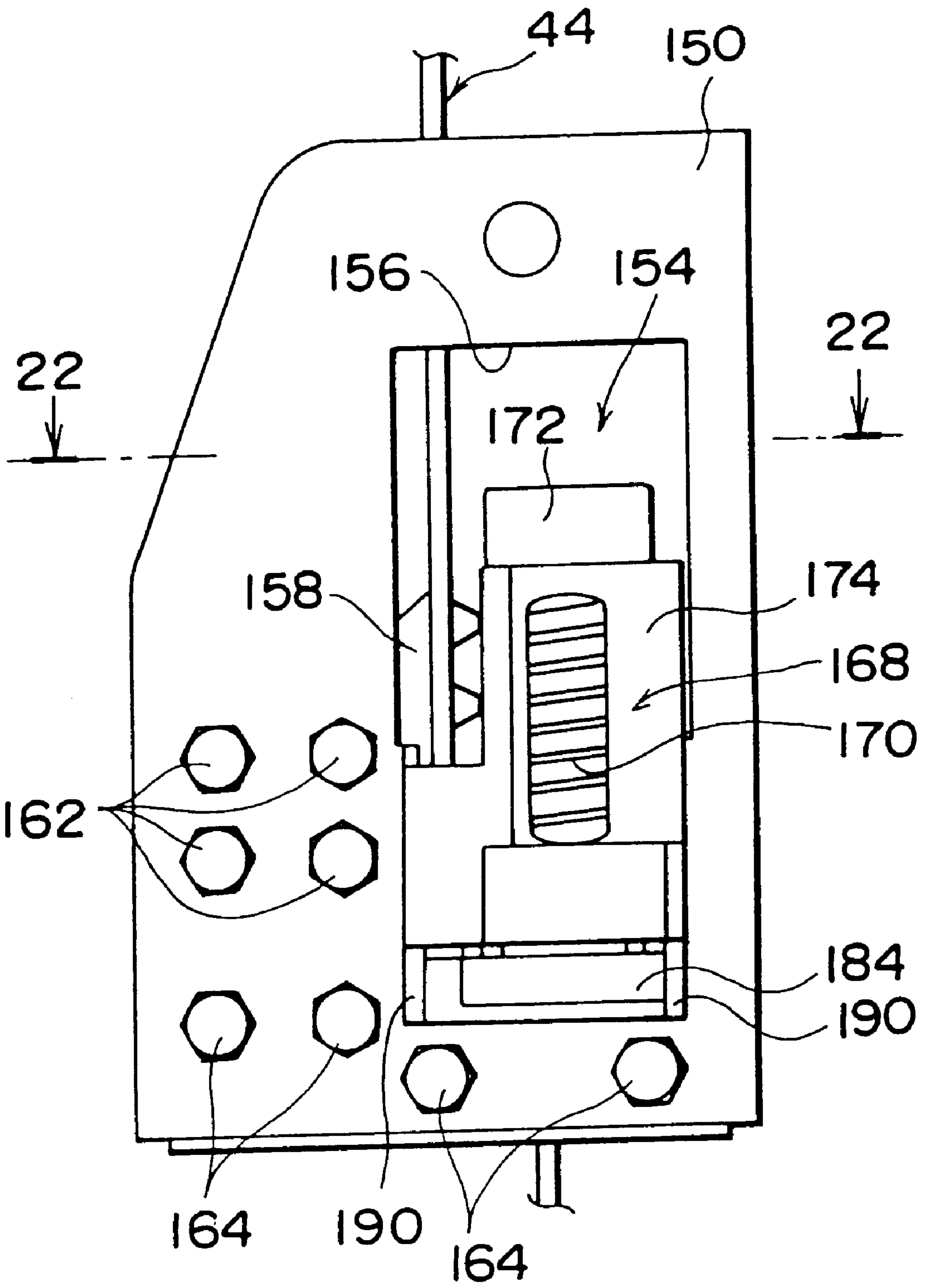
FIG. 21 is an enlarged front elevational view corresponding to FIG. 19A, showing an embodiment in which a structure of fitting the slider to the carrier plate is improved.

Next, a further modified embodiment of the embodiment shown in FIGS. 18 to 20 will be described below with reference to FIGS. 21 and 22.

Figure 22:
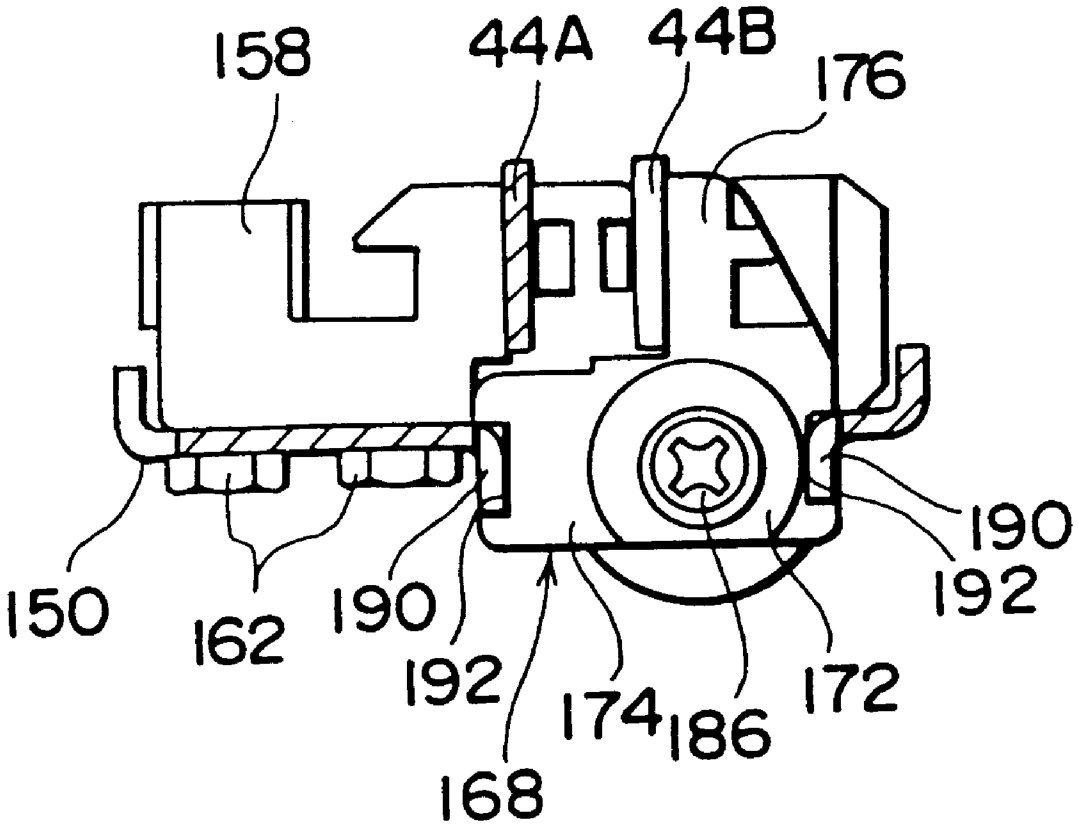
FIG. 22 is a horizontal cross sectional view corresponding to FIG. 20 along a line 22—22 in FIG. 21.

As shown in these drawings, particularly, in FIG. 22, in accordance with this embodiment, a pair of rail portions 190 corresponding to "a bent portion" set at both side edges of a lower portion of the opening portion 156 in the carrier plate 150 is formed by an upward-cutting. Accordingly, it is different from the rail portion 180 formed by a downward-cutting mentioned above in this view. In correspondence to this, a pair of slide grooves 192 corresponding to "a fitting groove" to which the rail portion 190 is fitted are formed at both side portions of the spring receiving portion 174 in the slider 168. Accordingly, a width of the slide groove 192 in accordance with this embodiment is wider than a width of the slide groove 178 mentioned above.

In accordance with the structure mentioned above, in the case that the extension is generated in the first tape 44, the slider 168 slides upward by the urging force of the compression coil spring 170 while maintaining a state that a pair of rail portions 190 are fitted into a pair of slide grooves 192.

Here, in accordance with this embodiment, since a pair of rail portions 190 are formed by an upward-cutting and a width of a pair of slide grooves 192 is set wide in correspondence thereto, a fitting length of the slider 168 to the carrier plate 150 can be secured to be great in comparison with a fitting (inserting) structure by a downward-cutting. As a result, in accordance with this embodiment, a movement of the slider 168 within the carrier plate 150 can be stably performed, and a reliability of a performance of absorbing an extension of the first tape 44 can be improved.

In this case, in accordance with the embodiment shown in FIGS. 1, 11 and 18 mentioned above, the present invention is applied to the side door 10 in which the viewing window 16 is necessarily provided, however, the structure is not limited to this, and the present invention may be applied to a side door for a vehicle in which the other parts is necessarily provided.

Further, in accordance with the embodiment shown in FIGS. 1, 11 and 18, the first tape 44 and the second tapes 68, 100 and 116 corresponding to a tape-shaped long body are used for ascending and descending the carrier plates 58 and 70, however, a belt-shaped long body may be employed. Further, with respect to the present invention as stated in claim A1 and the present invention as stated in claim A10, in addition to the structure in which the first tape 44 moving to form a loop is used, a structure in which a wire moving to form a loop is used is included. Still further, with respect to the present invention as stated in claim A10, in addition to the structure in which the second tapes 100 and 116 moving to form a loop is used, a structure in which a wire moving to form a loop is used is included.

Still further, in accordance with the embodiment shown in FIGS. 1, 11 and 18, the structure is made such that an end portion 68A of the second tape 68 or the second tapes 100 and 116 is fixed to the predetermined portion in the front end side line of the first tape 44 by the clip 72. However, the structure is not limited to this, when modifying a shape of the carrier plate 58 at the side of the first regulator main body 18 or the like, it is possible to fix an end portion 68A of the second tape 68 or the second tapes 100 and 116 to the carrier plate.

Figure 23:
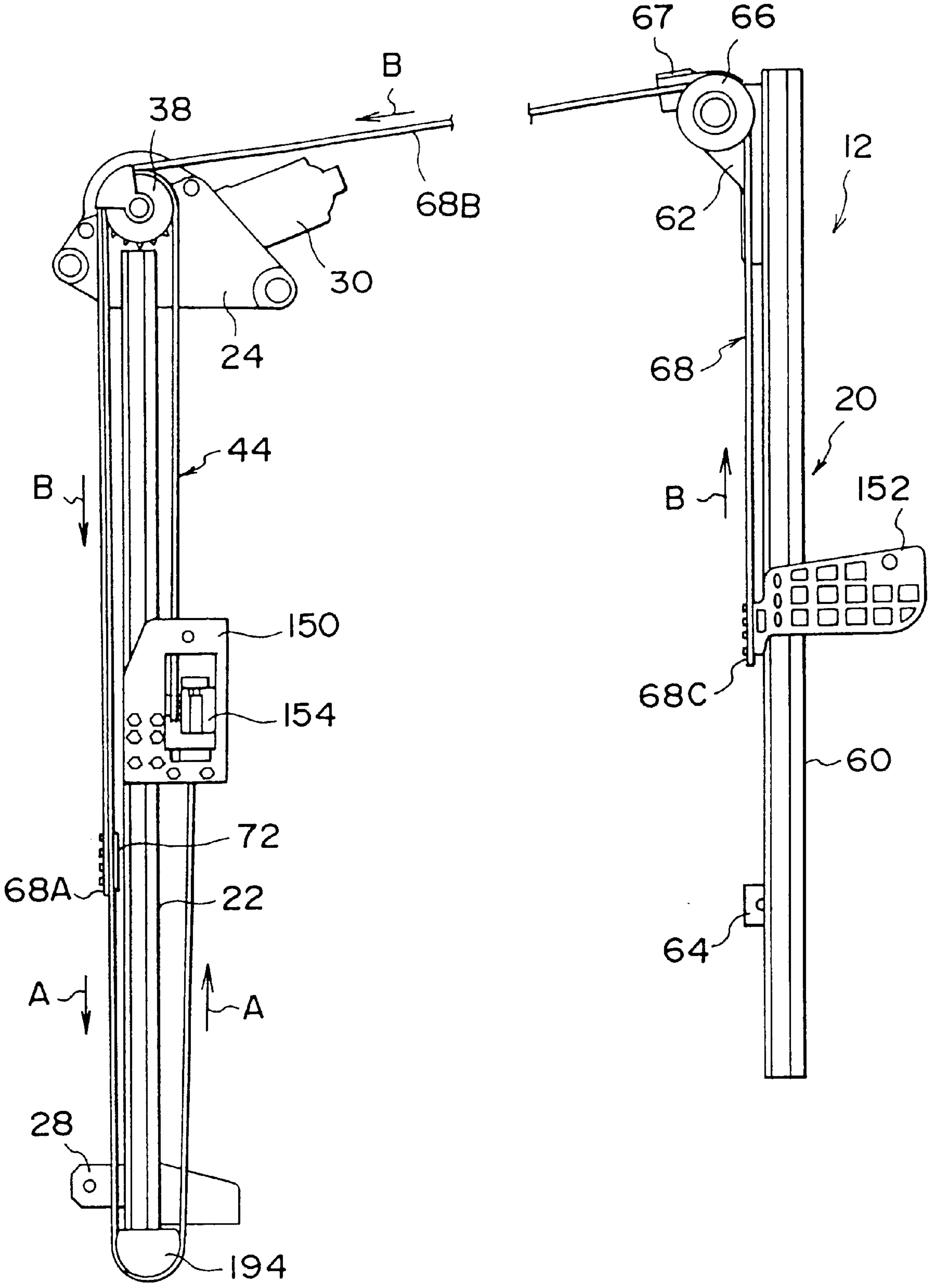
FIG. 23 is a front elevational view corresponding to FIG. 18 which shows a total structure of a power window regulator in accordance with an embodiment in which a motor and a sprocket are arranged in an upper end side of a first guide rail.

Still further, in accordance with the embodiment shown in FIGS. 1, 11 and 18, the motor 30 and the sprocket 38 are arranged in the lower end side of the first guide rail 22, however, the structure is not limited to this, and as shown in FIG. 23. The structure may be made such that the motor 30 and the sprocket 38 are arranged in the upper end side of the first guide rail 22. In this case, in accordance with this embodiment, the semicircular lower guide 194 for winding the lower end side of the first tape 44 around the lower end side of the first guide rail 22 is arranged; however, the structure can be made such that the pulley is arranged there.

In accordance with the structure mentioned above, since the motor 30 and the sprocket 38 are arranged in the upper end side of the first guide rail 22, there is an advantage that the motor 30 can be prevented from being damaged by a water.

On the contrary, in the case that the motor 30 and the sprocket 38 are arranged in the lower end side of the first guide rail 22 as in the embodiment shown in FIGS. 1, 11 and 18 mentioned above, an interference with the other provisional parts such as an ashtray and the other functional parts can be easily avoided. Accordingly, there is an advantage that when arranging the motor 30 in the lower end side of the first guide rail 22, the motor can be arranged in various directions and the other provisional parts and functional parts can be arranged in accordance with a free layout.

Further, when the motor 30 and the sprocket 38 are arranged in the upper end side or the lower end side of the first guide rail 22, an area in which the first tape 44 (the first tape 44 and the second tape 100 in the case of the embodiment shown in FIG. 11, and the first tape 44 and the second tape 116 in the case of the embodiment shown in FIG. 17) and the sprocket 38 are engaged with each other is increased, so that there is an effect that a security of transmitting a driving force can be kept.

An embodiment in accordance with the present invention will be described below with reference to FIGS. 24 to 26.

Figure 25:
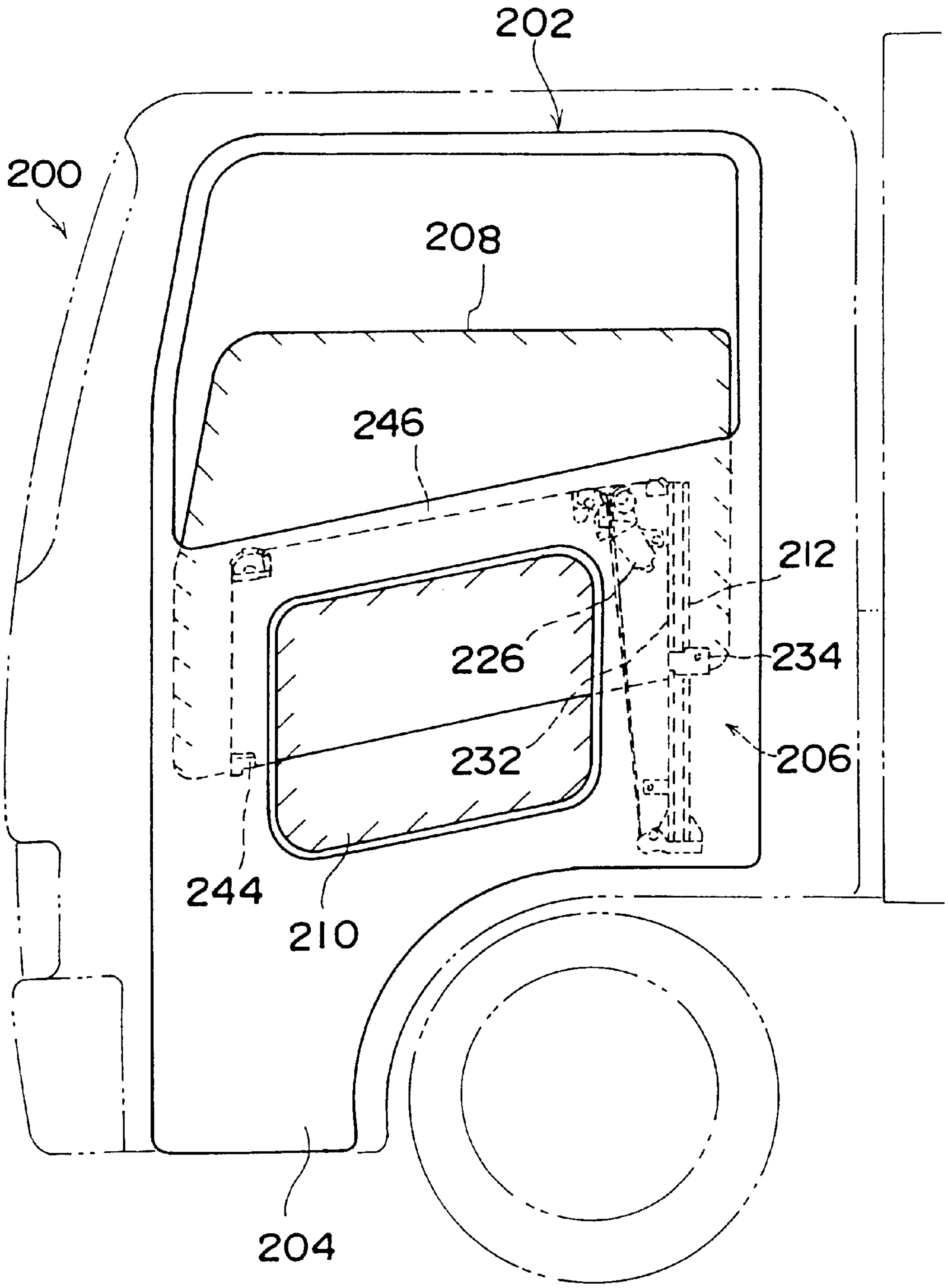
FIG. 25 is a schematically front elevational view which shows a portion near a side door in a side of an passenger seat of a large-sized truck having the power window regulator shown in FIG. 24.

A state near a side door 202 in a side of a passenger seat of a large-sized truck 200 is shown in FIG. 25 as a state of being seen from a side portion of a vehicle. As shown in this drawing, a door glass 208 ascended and descended by a power window regulator 206 is arranged in an upper side of a door main body 204 at the side door 202 at the side of the passenger seat corresponding to "a side door for a vehicle". Further, a viewing window 210 for securing a downward view is provided in a lower side of a center portion of the door main body 204. The power window regulator 206 for ascending and descending the door glass 208 is arranged so as to avoid the viewing window 210, and is in detail described below.

Figure 24:
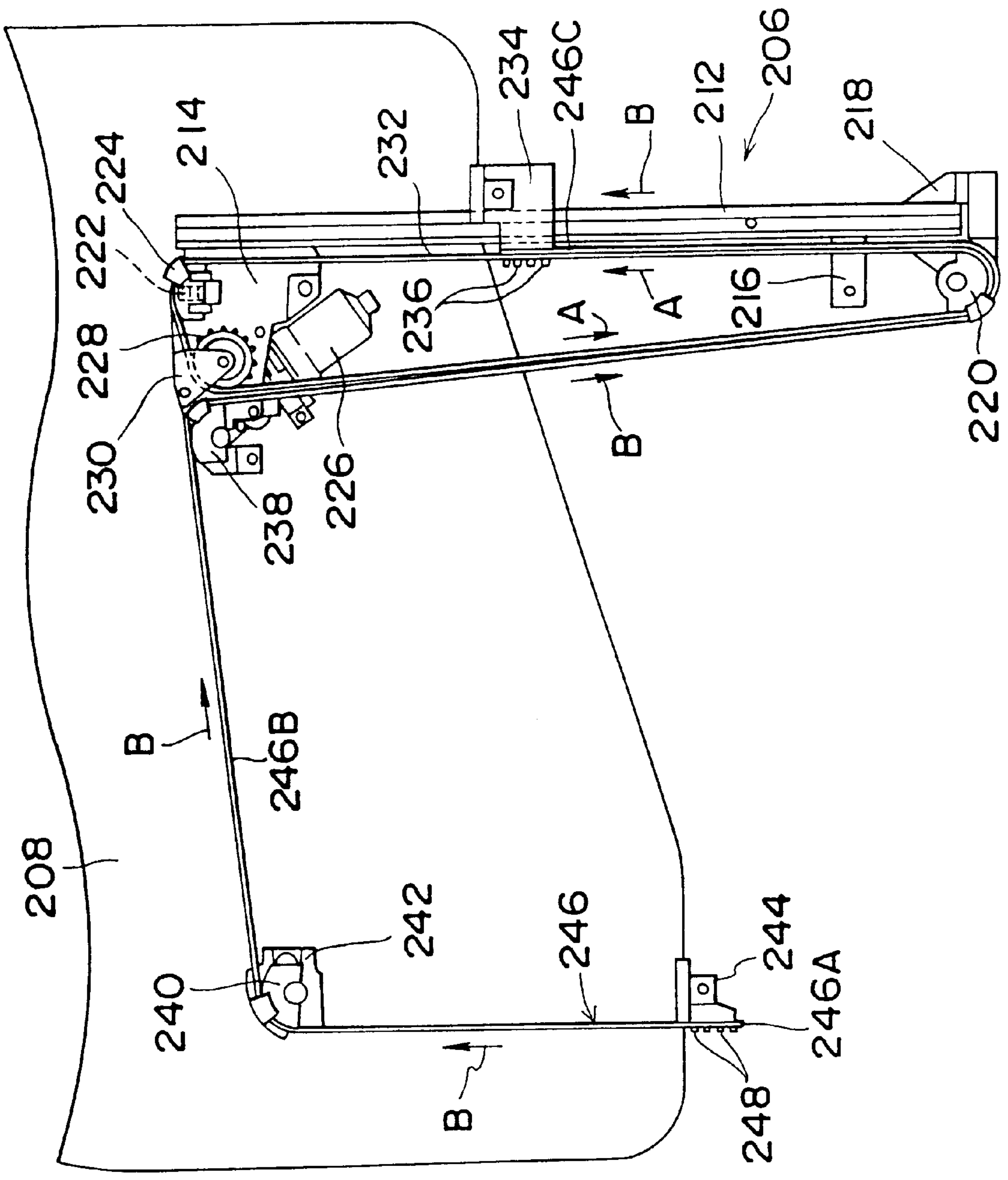
FIG. 24 is a front elevational view which shows a total structure of the power window regulator in accordance with the embodiment.

An enlarged front elevational view of the power window regulator 206 is shown in FIG. 24. As shown in the drawing, the power window regulator 206 is provided with an elongate guide rail 212 arranged in a longitudinal direction corresponding to a direction in which a door glass vertically moves. The guide rail 212 is arranged only in a rear end side of the door in the door main body 204.

The guide rail 212 is formed in a channel shape, and is mount ed to the side of the door main body 204 through an upper bracket 214 arranged at an upper end portion thereof, a middle bracket 216 arranged in a slightly upper side from the lower end portion and a lower bracket 218 arranged at a lower end portion.

A lower guide 220 corresponding to "a winding portion" for restricting a moving direction of a first tape 232 mentioned below is arranged in the lower bracket. Further, an upper guide 224 corresponding to "a winding portion" provided with a tension mechanism 222 for restricting the moving direction of the first tape 232 and for applying a predetermined tension to the first tape 232 is arranged in the upper bracket 214. In this case, the lower guide 220 and the upper guide 224 are arranged to oppose a vertical direction of the door. Still further, the tension mechanism 222 is mainly constituted by a pair of guide walls, a slider slidably inserted between the guide walls and a compression coil spring (an elastic body) for pressing and urging the slider to a direction of extending out.

Further, a motor 226 corresponding to "a driving source" and a sprocket 228 corresponding to "a winding portion" rotating by a driving force from the motor 226 are arranged in a front end side of the upper bracket 214. In this case, the sprocket 228 is supported to the upper bracket 214 through a sprocket bracket 230 commonly serving as a guide for restricting a moving direction of the first tape 232 mentioned below.

The first tape 232 corresponding to "a first glass carrier raising/lowering long member" as long body having a predetermined rigidity and a flexibility is wound around the lower guide 220, the upper guide 224 and the sprocket 228 mentioned above to form a loop. Accordingly, the first tape 232 forms a loop bent at three points of the lower guide 220, the upper guide 224 and the sprocket 228. In this case, a multiplicity of openings (not shown) formed in a rectangular shape or the like are formed in the first tape 232 at a predetermined interval, and the structure is made such that a rotational force of the sprocket 228 is transmitted to the first tape 232 in accordance that a part of the openings is engaged with a tooth of the sprocket 228.

A carrier plate 234 corresponding to "a first glass carrier" for supporting a lower edge side of a rear end of the door glass 208 is slidably fixed to the guide rail 212 mentioned above. A plurality of projections 236 are formed on a front end side surface of the carrier plate 234, and the first tape 232 is fitted (pressure inserted) and fixed to the projections 236. Accordingly, it is structured such that the carrier plate 234 ascends and descends along the guide rail 212 by a movement of the first tape 232.

On the contrary, a rear upper guide 238 for restricting a moving direction of a second tape 246 mentioned below is arranged in a front end portion of the upper bracket 214 mentioned above. In this case, the rear upper guide 238 is arranged adjacent to the front side of the sprocket bracket 230 mentioned above. Further, a front upper guide 240 for restricting a moving direction of the second tape 246 mentioned below is arranged in a middle portion in a vertical direction of the front end side of the door glass 208. In this case, the front upper guide 240 is fixed to the door main body 204 through the bracket 242. Still further, a carrier plate 244 corresponding to "a second glass carrier" is fixed to the lower edge side of the front end of the door glass 208. In this case, the front upper guide 240 is arranged to oppose the front upper guide 240 and the rear upper guide in a longitudinal direction of the door, and the carrier plate 244 is arranged to oppose the front upper guide 240 in a vertical direction of the door.

The second tape 246 corresponding to "a second glass carrier raising/lowering long member" as an long body having a predetermined rigidity and a flexibility is wound around the carrier plate 244, the front upper guide 240, the rear upper guide 233, the lower guide 220 mentioned above and the carrier plate 234.

In particular, a plurality of projections 248 are formed on the front end side surface of the carrier plate 244, and an end portion 246A of the second tape 246 is fitted (pressure inserted) and fixed to the projections 248. In this case, a predetermined rigidity means a rigidity necessary for ascending and descending the carrier plate 244 by a push-pull method. Further, the middle portion 246B of the second tape 246 is wound around the front upper guide 240, the rear upper guide 238 and the lower guide 220. In this case, the first tape 232 and the second tape 246 are wound around the lower guide 220 in a state of being overlapped. Further, the other end portion 246C of the second tape 246 is fitted (pressure inserted) and fixed to the projection 236 of the carrier plate 234 together with the first tape 232 after being folded back by the lower guide 220. Accordingly, the second tape 246 is totally arranged to form a substantially S shape directed to a horizontal direction in which the lower portion of the front portion is greatly opened.

Next, an operation and an effect of this embodiment will be described below.

An operation and an effect on the basis of a structural layout of this embodiment are as follows.

In accordance with the power window regulator 206 of this embodiment, since the guide rail 212 is arranged only at the side of the rear end of the door within the side door 202 at the side of the passenger seat of the large-sized truck 200, a wide space can be secured in comparison with the structure in which the guide rail is arranged in both of the front end side of the door and the rear end side of the door. Further, the first tape 232 connected to the carrier plate 234 is provided at the side of the guide rail 212 to form a loop. Accordingly, the space is not made narrow by the first tape 232. Further, the carrier plates 234 and 244 supporting the lower edge of the front and rear portions of the door glass 208 are totally connected to each other by the second tape 246 arranged to form a substantially S shape directed to a horizontal direction in which the lower portion of the front portion is greatly opened. Accordingly, the space is not made narrow by the second tape 246.

As a result, in accordance with this embodiment, the structure can reply to a request that the viewing window 210 (an auxiliary glass for securing a view) for securing a downward view should be provided near the lower side of the center portion of the side door 202 at the side of the passenger seat.

An operation and an effect on the basis of a motion of the power window regulator 206 in accordance with the present invention are as follows.

When a power window regulator switch (not shown) is operated to ascend the door glass 208, the motor 226 is normally driven. When the motor 226 is normally driven, the sprocket 228 rotates in a counterclockwise direction in FIG. 24 through the worm gear, the worm gear wheel, the output shaft 36 which are not illustrated, and the like to move the first tape 232 in a direction of an arrow A. When the first tape 232 moves in a direction of the arrow A, the carrier plate 234 connected to the rear end side line of the first tape 232 ascends along the guide rail 212 and the other end portion 246C of the second tape 246 connected to the carrier plate 234 is drawn upward together with the first tape 232. Accordingly, the second tape 246 moves in a direction of an arrow B in FIG. 24 and the carrier plate 244 is ascended (pulled) by the second tape 246. As a result, the door glass 208 ascends while being supported by a pair of carrier plates 234 and 244.

On the contrary, when the power window regulator switch (not shown) is operated to descend the door glass 208, the motor 226 is inversely driven. When the motor 226 is in versely driven, the sprocket 228 rotates in a clockwise direction in FIG. 24 to move the first tape 232 in a direction opposite to the direction of the arrow A. When the first tape 232 moves in a direction opposite to the direction of the arrow A, the carrier plate 234 descends and the other end portion 246C of the second tape 246 is drawn down to the lower side of the door. Accordingly, the second tape 246 moves in a direction opposite to the direction of the arrow B in FIG. 24 and the carrier plate 244 is descended (pushed) along the second guide rail 212 by the second tape 246. As a result, the door glass 208 descends while being supported by a pair of carrier plates 234 and 244. In this case, since the second tape 246 has a predetermined rigidity which can push down the carrier plate 244, there is not a problem such that the carrier plate 244 cannot be pushed down due to bending at a time of pushing down the carrier plate 70. Further, since the dead load of the door glass 208 is used when the carrier plate 244 is pushed by the second tape 246, the pushing force by the second tape 246 is reduced.

As mentioned above, in accordance with this embodiment, since the structure is made such that the carrier plate 234 in the rear end side of the door glass is ascended and descended by the first tape 232 moving to form a loop and the carrier plate 244 in the front end side of the door glass is ascended and descended by the push-pull type second tape 246, it is not necessary to complexly fold back a wire so as to ascend and descend a pair of carrier plates 234 and 244 in a conventional manner. As a result, in accordance with this embodiment, even when repeatedly used, a fatigue accumulated in the first tape 232 and the second tape 246 is a small, so that a durability of the first tape 232 and the second tape 246 and a durability of the power window regulator 206 can be improved.

In addition, in accordance with this embodiment, as mentioned above, since the guide rail 212 is arranged only in the rear end side of the door within the side door 202 at the side of the passenger seat, the structure of the power window regulator 206 can be simplified in comparison with the structure in which the guide rail is arranged in both of the front end side of the door and the rear end side of the door.

The above is a basic operation and effect of this embodiment, however, in accordance with this embodiment, the following operation and effect can be further obtained.

Firstly, in accordance with this embodiment, as mentioned above, since the structure is made such that the guide rail 212 is arranged only in the rear end side of the door within the side door 202 at the side of the passenger seat (that is, the guide rail in the front end side of the door is abolished) and the lower edge side of the front end of the door glass 208 is supported by the compact carrier plate 244, the downward view can be completely secured.

Figure 35:
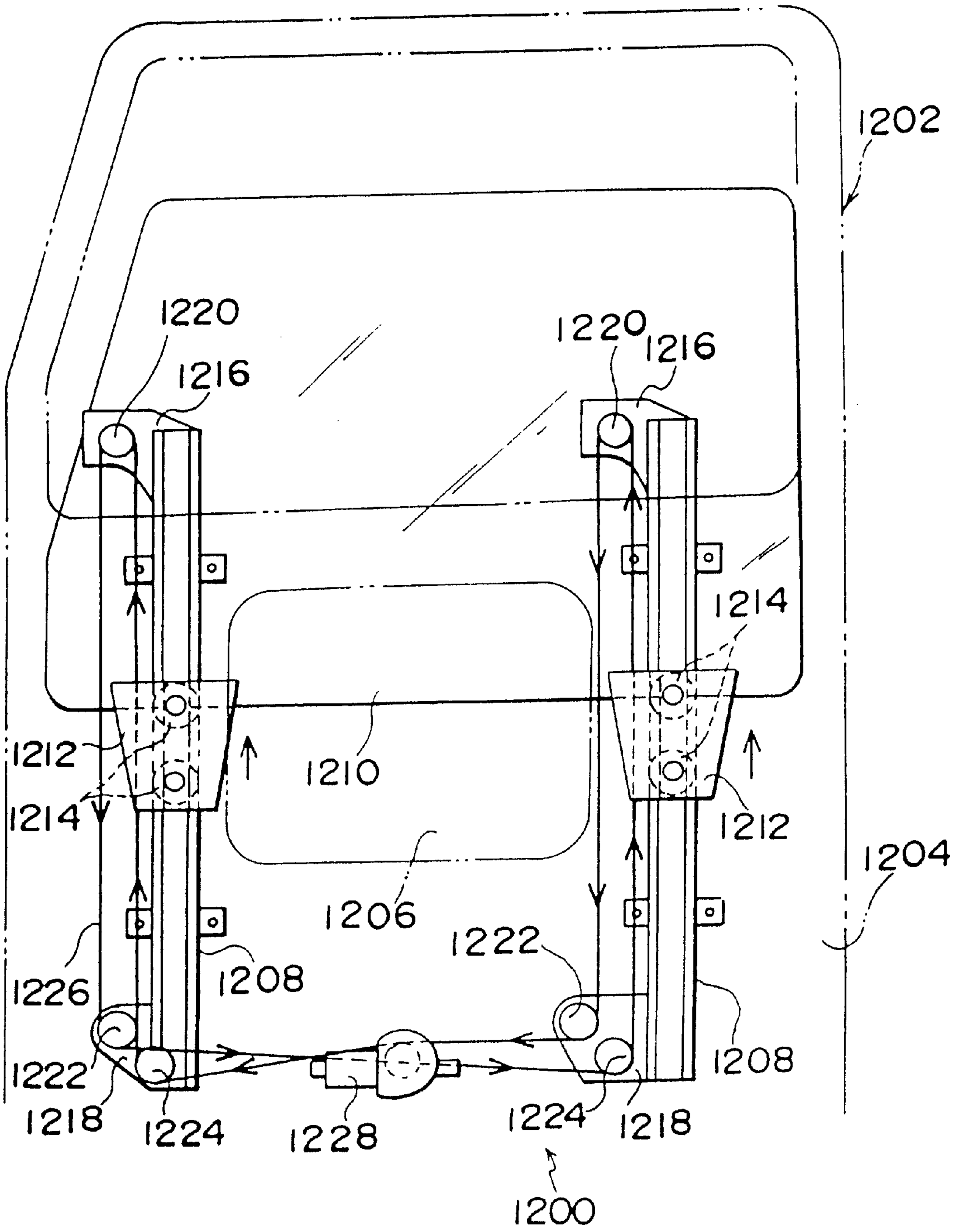
FIG. 35 is a schematically front elevational view which shows a side door in a side of an passenger seat of a large-sized truck having a power window regulator provided by taking an existence of a viewing window in accordance with a conventional embodiment into consideration.

Complementing this point, in general, in the large-sized truck 200, in view of securing a wider downward view to improve safety, the viewing window 210 mentioned above tends to be arranged near the front end portion of the side door 202 at the side of the passenger seat as much as possible. Accordingly, when arranging the guide rail in the front end side of the door and ascending and descending the carrier plate along the guide rail, a part of the carrier plate easily comes in view through the viewing window 210. This matter can be understood by the fact that a rightward upper corner portion of the glass supporting body 212 in the front end side of the door glass comes in view through the viewing window shown by a two dot chain line in FIG. 35 showing a prior art. However, when the structure is made in a manner of this embodiment, as shown in FIG. 25, a downward view through the viewing window 210 can be completely secured.

Secondly, in accordance with this embodiment, since the first tape 232 moving along the guide rail 212 to form a loop is supported by three winding portions (the lower guide 220, the upper guide 224 and the sprocket 228), a bending radius of the first tape 232 (in this embodiment, a bending radius in the upper end side of the first tape 232) can be increased in comparison with the case that the first tape 232 is supported by two upper and lower winding portions of the guide rail 212. Accordingly, a load acting on the first tape 232 can be reduced. As a result, in accordance with this embodiment, a durability of the first tape 232 and a durability of the power window regulator 206 can be improved.

Thirdly, in accordance with this embodiment, since the motor 226 is arranged in the upper end side of the guide rail 212 and near the guide rail 212, a lower space of the side door 202 at the side of the passenger seat can be easily secured, it is easy to respond to a request for securing a downward view, and the motor 226 can be easily integrated with the guide 212 through the upper bracket 214, so that the structure of the power window regulator 206 can be simplified.

Fourthly, in accordance with this embodiment, since the motor 226 and the sprocket 228 are arranged in the upper end side of the guide rail 212, in addition to the advantage that it is easy to respond to a request for securing a downward view as mentioned above, there is an advantage that the motor 226 can be prevented from being damaged by a water. Further, when the motor 226 and the sprocket 228 are arranged in the upper end side of the guide rail 212 as mentioned above, an area in which the first tape 232 and the sprocket 238 are engaged with each other is increased, so that there is an effect that a security of transmitting a driving force can be kept.

Fifthly, in accordance with this embodiment, since the first tape 232 is used as the first glass carrier raising/lowering long member and the second tape 246 is used as the second glass carrier raising/lowering long member, both are structured as the same member in a construction, and as a result, the first tape 232 and the second tape 246 are easily connected to each other. Further, a stress concentration is hard to be generated in the connection portion between the both at a time when the first tape 232 and the second tape 246 are moved.

Here, in the embodiment shown in FIG. 24, as mentioned above, the motor 226 is arranged in the upper end side of the guide rail 212 and near the guide rail 212. However, the motor 226 may be arranged in the upper end side of the guide rail 212 to be offset to the guide rail 212 in a longitudinal direction of the door as shown in FIG. 26.

Figure 26:
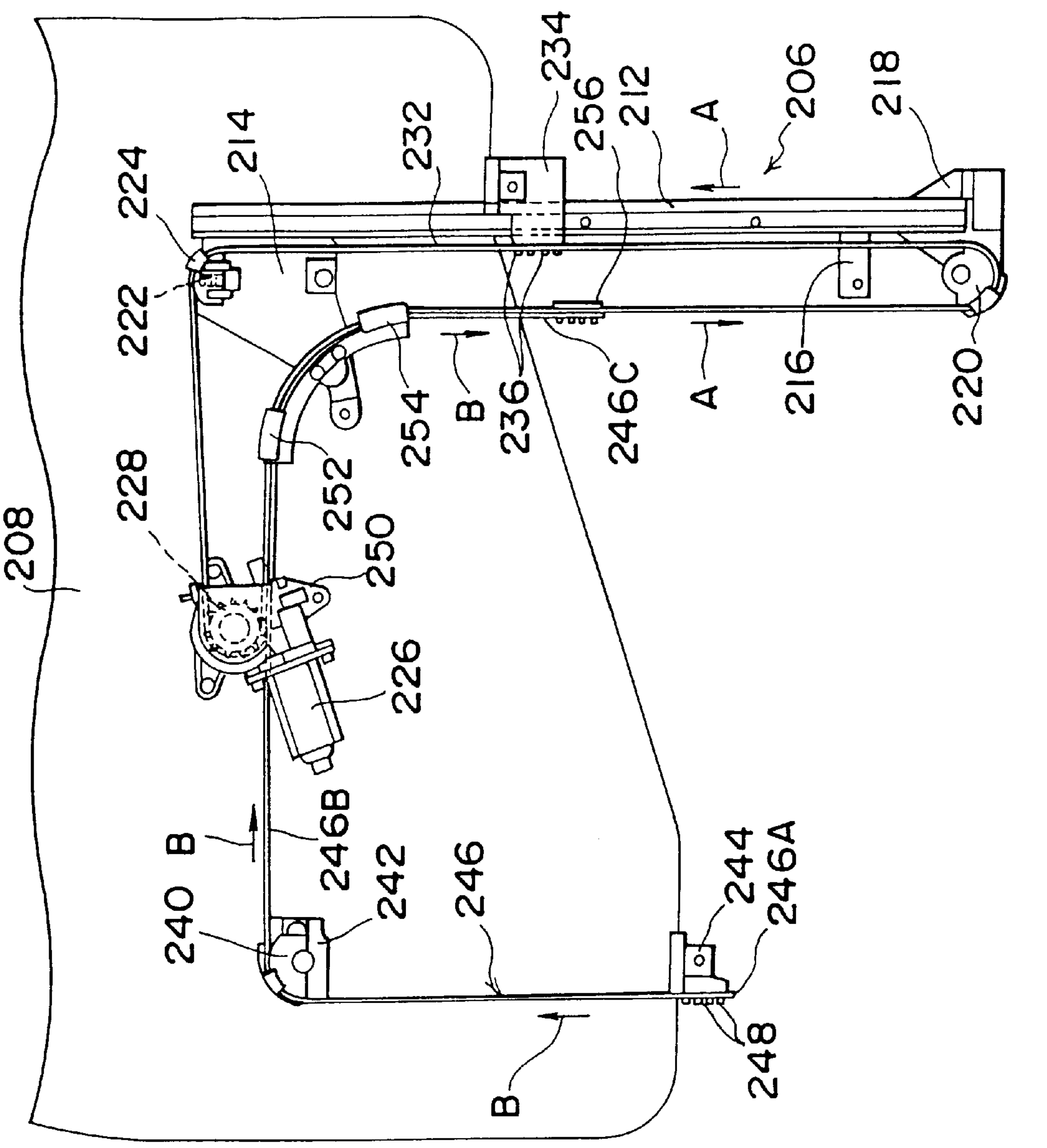
FIG. 26 is a front elevational view corresponding to FIG. 24, showing an embodiment of a power window regulator in which an arrangement of a motor is changed.

More particularly, in the structure shown in FIG. 26, the motor 226 and the sprocket 228 rotating in accordance with the driving force of the motor are separated from the upper bracket 214 and arranged near the middle portion in the longitudinal direction of the door glass 208, and mounted to the door main body 204 through a motor mounting bracket 250. Further, a pair of guides 252 and 254 having a predetermined radius of curvature are mounted to the front end side of the upper bracket 214 to enlarge a bending radius of the second tape 246 (so as to set a reduction curve). Still further, the other end portion 246C of the second tape 246 is fixed to the first tape 232 by a clip 256.

In accordance with the structure mentioned above, since the motor 226 is arranged in the upper end side of the guide rail 212 and to offset to the guide rail 212 in the longitudinal direction of the door, a lower space of the side door 202 at the side of the passenger seat can be easily secured as described in the third effect mentioned above, so that it is easy to respond to a request for securing a downward view and it is possible to enlarge a bending radius of a moving track of the second tape 246. Accordingly, it is possible to reduce the load acting on the second tape 246. As a result, in accordance with this embodiment, a durability of the second tape 246 and a durability of the power window regulator 206 can be improved.

In this case, in accordance with the embodiment shown in FIG. 24, the upper guide 224 and the lower guide 220 are used as the winding portion for winding the first tape 232. However, the structure is not limited to this embodiment, and a structure in which a pulley is used can be employed.

Further, in accordance with the embodiment shown in FIG. 24, the structure is made such that the first tape 232 is supported by three points comprising the upper guide 224, the lower guide 220 and the sprocket 228. However, the structure is not limited to this embodiment, and a structure in which the first tape 232 is supported by four or more points can be employed.

Next, another embodiment in accordance with the present invention will be described below with reference to FIGS. 27 to 29. In this case, the same reference numerals are attached to the same elements as those of the embodiment shown in FIG. 24 mentioned above, and an explanation thereof will be omitted.

Figure 27:
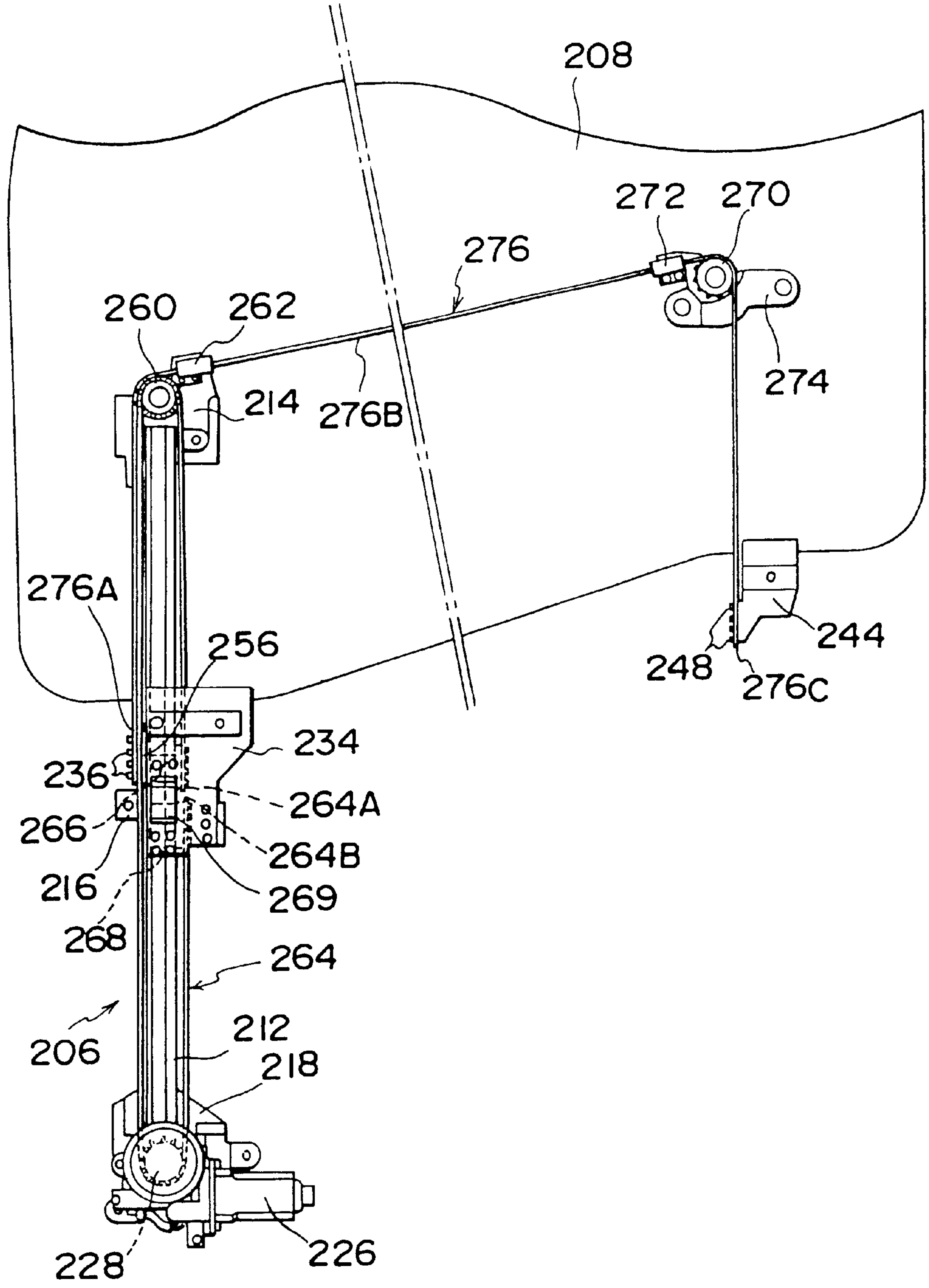
FIG. 27 is a front elevational view which shows a total structure of a power window regulator in accordance with the other embodiment of the present invention.

As shown in FIG. 27, in accordance with this embodiment, there is basically characterized in that the guide rail 212 is arranged only in the front end side of the door. In correspondence to this, since some elements different from the structure of the embodiment shown in FIG. 24 mentioned above are employed, a brief description will be given below.

In accordance with this embodiment, the motor 226 and the sprocket 228 are arranged in the lower bracket 218 arranged in the lower end portion of the guide rail 212. Further, an upper pulley 260 and a guide 262 are arranged in the upper bracket 214 arranged in the upper end portion of the guide rail 212. Then, the first tape 264 is wound around the sprocket 228 and the upper pulley 260 to form a loop. In this case, one end portion 264A of the first tape 264 is locked with an upper slider 266 arranged on a back surface of the carrier plate 234, and the other end portion 264B is locked with a lower slider 268 arranged to oppose to the upper slider 266 in a vertical direction. The upper slider 266 and the lower slider 268 are mutually connected to each other by a tension mechanism 269 arranged in the carrier plate 234.

Further, an upper bracket 274 in which an upper pulley 270 and a guide 272 are provided is arranged in the rear end side of the upper portion of the door glass 208. Still further, a small-sized carrier plate 244 is arranged in the lower edge side of the rear end of the door glass 208. An end portion 276A of a second tape 276 corresponding to "a second glass carrier raising/lowering long member" is fixed to the middle portion of the first tape 232 by a clip 256, and a middle portion 276B is wound around the upper pulley 260 in the front end side, the guide 260, the guide 272 in the rear end side and the upper pulley 270 in this order. Still further, the other end portion 276C of the second tape 276 is locked with the carrier plate 244.

In this case, in the structure mentioned above, the first tape 264, the upper slider 266, the lower slider 268 and the tension mechanism 222 correspond to "a first glass carrier raising/lowering long member" in accordance with the present invention.

In the structure mentioned above, since the guide rail 212 is arranged only in the front end side of the door and the guide rail in the rear end side of the door is abolished, in the same manner as that of the embodiment shown in FIG. 24 mentioned above, it is possible to respond to a request for securing a downward view and improving a durability, and a simplification of the structure can be realized.

Further, in accordance with this embodiment, since the motor 226 and the sprocket 228 are arranged in the lower end side of the guide rail 212, an interference with the other provisional parts such as an ashtray and the other functional parts can be easily avoided. Accordingly, there is an advantage that when arranging the motor 226 in the lower end side of the guide rail 212, the motor can be arranged in various directions and the other provisional parts and functional parts can be arranged in accordance with a free layout. Still further, when the motor 226 and the sprocket 228 are disposed in the lower end side of the guide rail 212, an area in which the first tape 264 and the sprocket 238 are engaged with each other is increased, so that an effect that a security of transmitting a driving force can be kept can be obtained.

Figure 28:
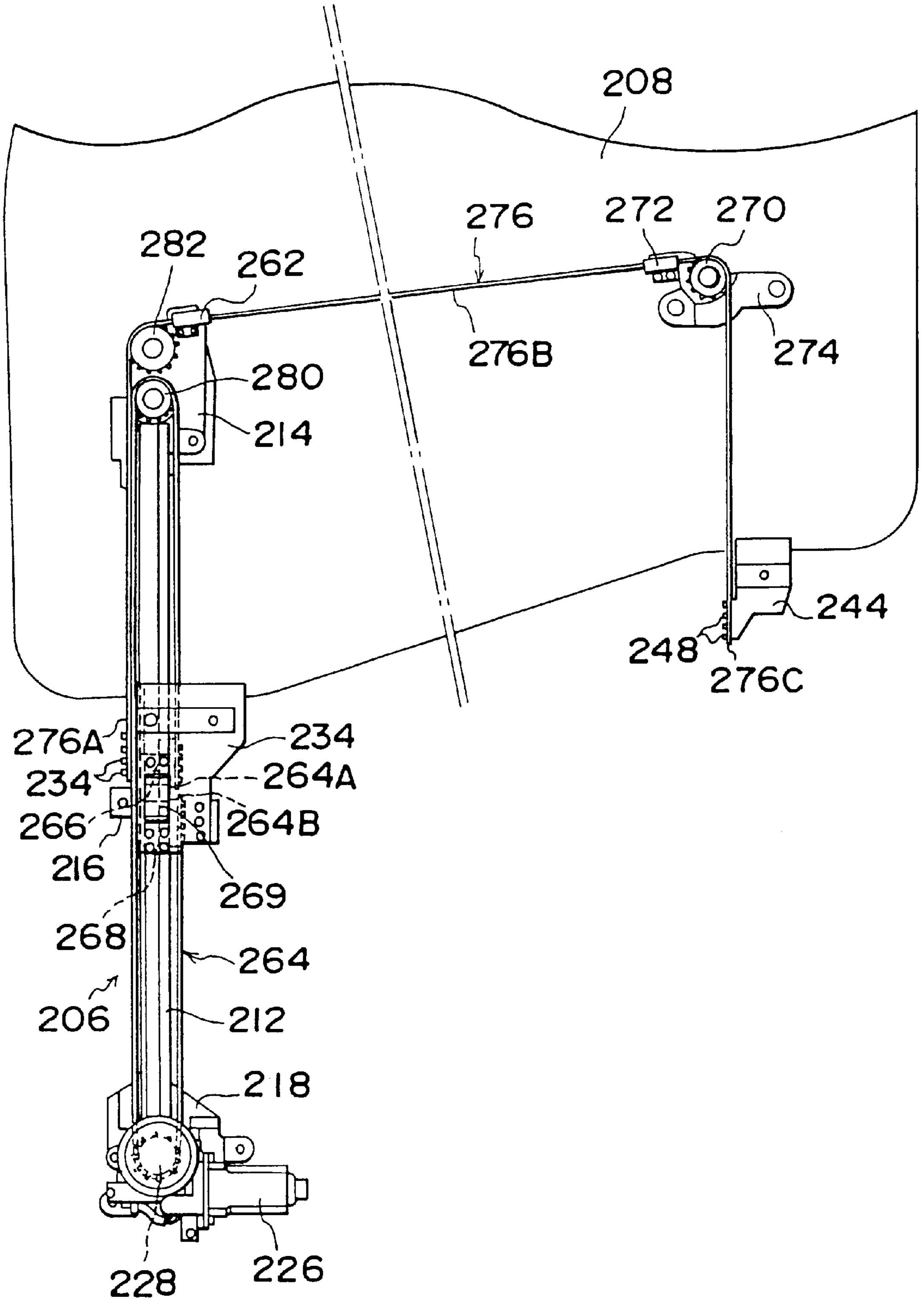
FIG. 28 is a front elevational view corresponding to FIG. 27, showing a power window regulator in accordance with an embodiment in which an upper pulley for a first tape and an upper pulley for a second tape are independently provided.
Figure 29:
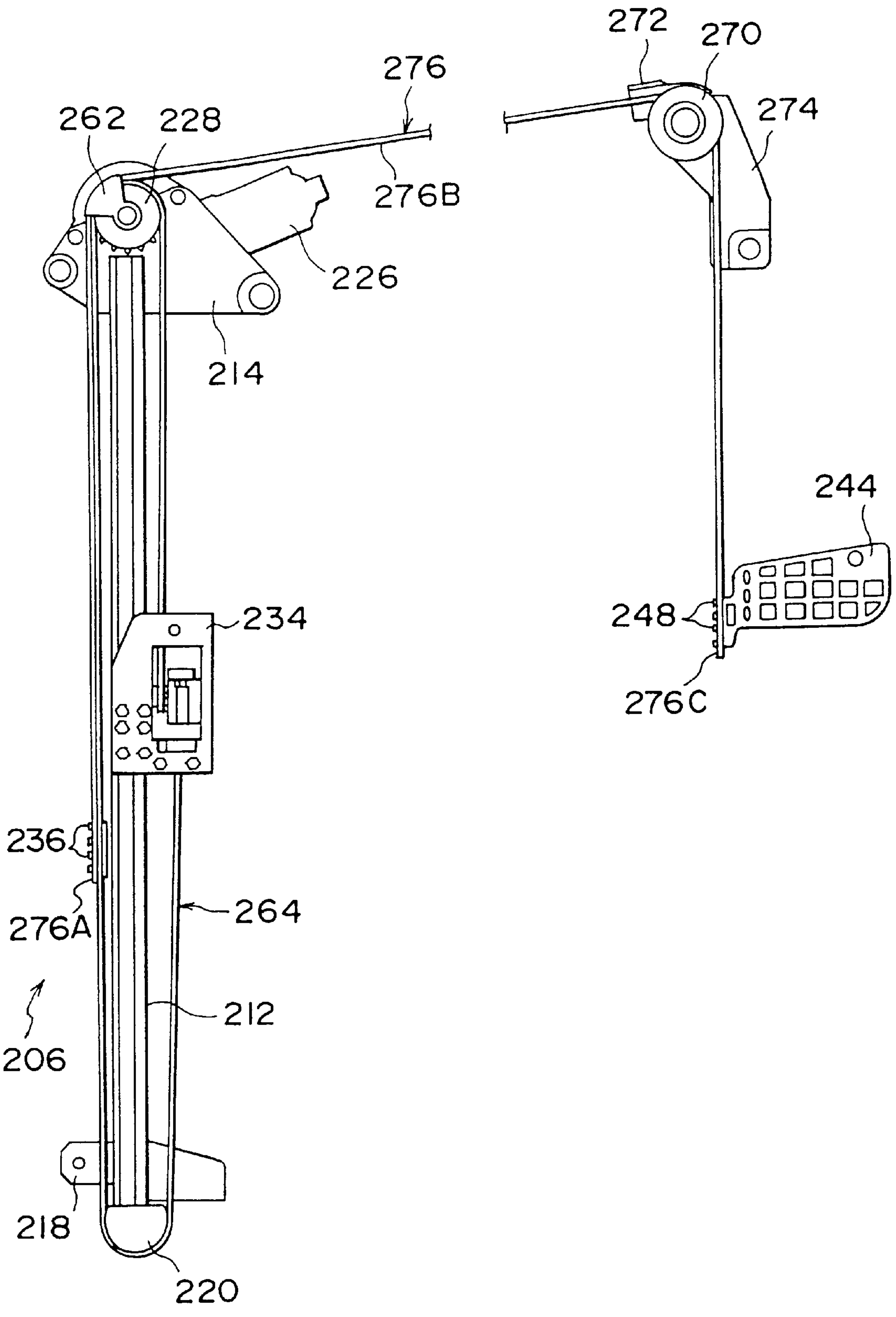
FIG. 29 is a front elevational view corresponding to FIG. 27, showing a power window regulator in accordance with an embodiment in which a motor and a sprocket are arranged in an upper end of a guide rail in the structure shown in FIG. 27.

Here, in the embodiment shown in FIG. 27, as mentioned above, the structure is made such that the first tape 264 and the second tape 276 are doubly wound around the upper pulley 260, however, the structure is not always made in the above manner, and as shown in FIG. 28, the structure may be made such that an upper first pulley 280 for winding the first tape 264 and an upper second pulley 282 for winding the second tape 276 are in dependently provided as shown in FIG. 28.

In this case, there is a disadvantage that a number of the parts is increased in comparison with the structure in which the first tape 264 and the second tape 276 are doubly wound around the upper pulley 260, however, there is an advantage that the upper end side of the first tape 264 and the middle portion 276B of the second tape 276 are prevented from being slidably in contact with each other at the bending portion as much as possible. As a result, a durability of the first tape 264 and the second tape 276 and a durability of the power window regulator 206 can be improved.

Further, in the embodiment shown in FIG. 27, the upper pulleys 260 and 270 are used as a member for winding the tape. However, the structure is not limited to this, and a structure in which the guide used in the embodiment shown in FIG. 24 is used may be employed.

Still further, in the embodiment shown in FIG. 27, the motor 226 and the sprocket 228 are arranged in the lower end side of the guide rail 212. However, the structure is not limited to this, and as shown in FIG. 29, the motor 226 and the sprocket 228 may be arranged in the upper end side of the guide rail 212.

In this case, in the embodiment shown in FIGS. 24 and 27 mentioned above, the present invention is applied to the side door 202 in which the viewing window 210 is necessarily provided; however, the structure is not limited to this, and the present invention may be applied to a side door for a vehicle in which the other parts is necessarily provided.

Further, in the embodiment shown in FIGS. 24 and 27 mentioned above, the first tape 232 and 264 and the second tape 246 and 276 which correspond to the tape-shaped long body are employed for ascending and descending the carrier plates 234 and 244; however, a belt-shaped long body may be employed.

Still further, in the embodiment shown in FIGS. 24 and 27 mentioned above, the push-pull type second tapes 246 and 276 are used, however, the structure may be made such that a lower guide and a pulley are additionally provided, thereby moving the second tape to form a loop.

An embodiment of a window regulator system in accordance with the present invention will be described below with reference to FIGS. 30 to 34.

Figure 30:
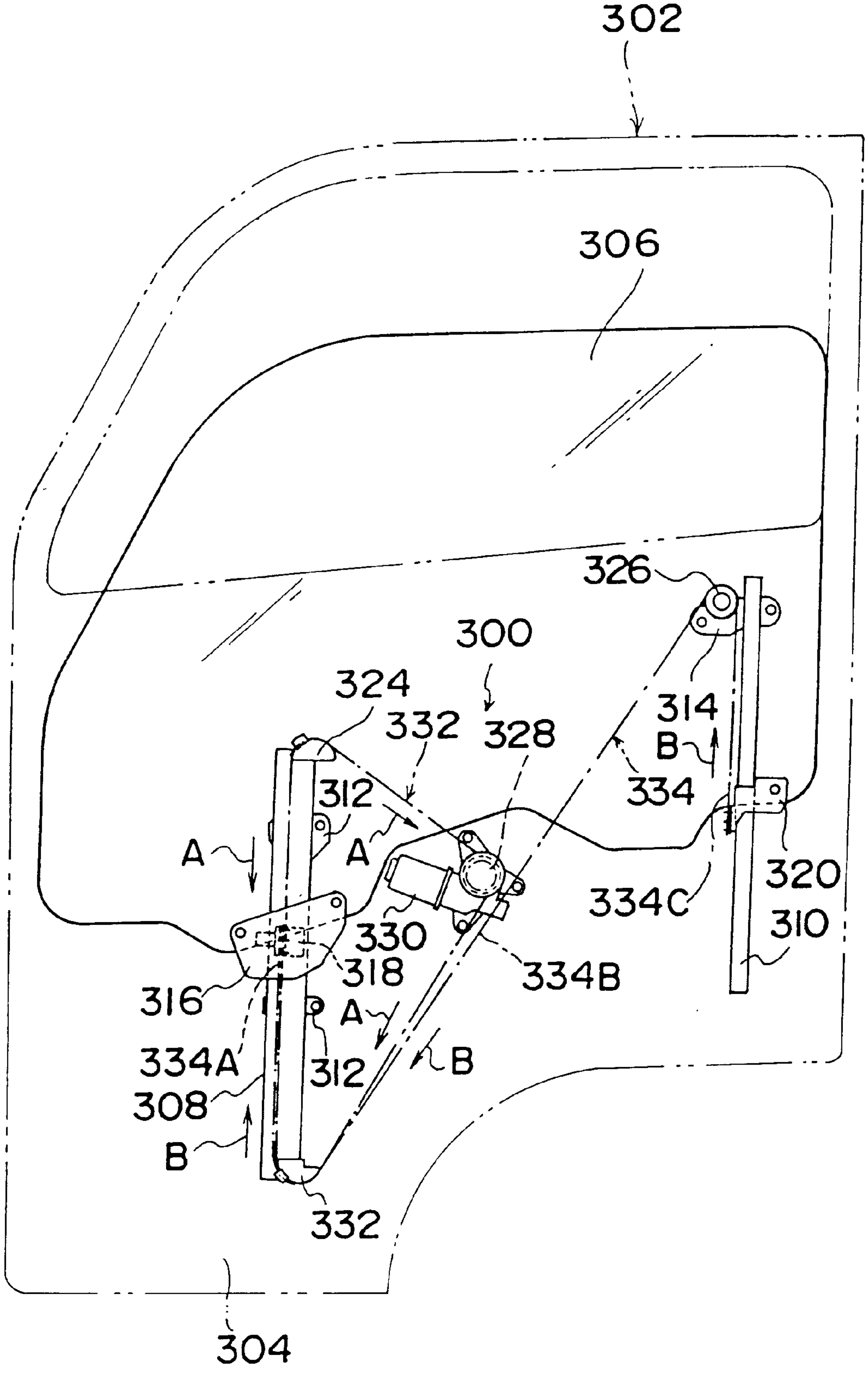
FIG. 30 is a totally schematic view showing a case in which the window regulator system in accordance with the present invention is used as a power window regulator.

A totally schematic view of a window regulator system in accordance with the present invention in the case of being used as a power window regulator 300 is shown in FIG. 30 in a state of being seen from an outer portion of a vehicle chamber. As shown in this drawing, a door glass 306 ascended and descended by the power window regulator 300 is arranged in an upper side of a door main body 304 in a side door 302.

The power window regulator 300 is provided with a of first guide rail 308 and second guide rail 310 arranged in parallel to each other in a direction of ascending and descending a door glass corresponding to a longitudinal direction. The first guide rail 308 and the second guide rail 310 are mounted to a side of the door main body 304 through mounting brackets 312 and 314 arranged at a suitable position in the longitudinal direction.

Both the first guide rail 308 and the second guide rail 310 are formed in a channel shape, and a carrier plate 316 corresponding to "a first glass carrier" is slidably fitted to the first guide rail 308 arranged in a front end side of the door through a slider 318. A lower edge side of a front end of the door glass is supported by the carrier plate 316. Further, a small-sized carrier plate 320 corresponding to "a second glass carrier" is slidably fitted to the second guide rail 310 arranged in the rear end side of the door. The lower edge side of the rear end of the door glass 306 is supported by the carrier plate 320.

Further, a lower guide 322 and an upper guide 324 which are used for restricting a moving direction of a first tape 332 mentioned below are arranged at the side of the lower end portion and at the side of the upper end portion of the first guide rail 308. An upper pulley 326 around which a second tape 334 mentioned below is wound is arranged at the side of the upper end portion of the second guide rail 310.

A sprocket 328 corresponding to "a rolling body" is arranged substantially in a center portion (near a crossing point between a diagonal line connecting the upper end portion of the first guide rail 308 to the lower end portion of the second guide rail 310 and a diagonal line connecting the lower end portion of the first guide rail 308 to the upper end portion of the second guide rail 310) within the door main body 304.

A motor 330 corresponding to "a driving source" is detachably attached near the sprocket 328, and the structure is made such that the sprocket 328 is rotated in accordance that the motor 330 is driven.

The first tape 332 corresponding to "a first glass carrier raising/lowering long member" as a long body having a predetermined rigidity and a flexibility is wound around the lower guide 322, the upper guide 324 and the sprocket 328 mentioned above to form a substantially triangular loop. A multiplicity of openings (not shown) formed in a rectangular shape or the like are formed in the first tape 332 at a predetermined interval, and it is structured such that a rotational force of the sprocket 328 is transmitted to the first tape 332 in accordance that a part of the openings is engaged with a tooth of the sprocket 328. Further, the first tape 332 is fixed to the slider 318 moving in the back surface side of the carrier plate 316 together with the carrier plate 316. Accordingly, the structure is made such that the carrier plate 316 ascends and descends along the first guide rail 316 in accordance with the movement of the first tape 332.

The second tape 334 corresponding to "a second glass carrier raising/lowering long member" having a predetermined rigidity and formed in a flexible long body is wound around the lower guide 322 and the upper pulley 326 mentioned above to form a substantially Z-shape directing to a horizontal direction. In this case, a predetermined rigidity in this case means a rigidity necessary for ascending and descending the carrier plate 244 by a push-pull method.

More particularly, an end portion 334A of the second tape 334 is fixed to the slider 318 at a back surface side of the carrier plate 316 in the front side together with the first tape 332. Further, a middle portion 334B of the second tape 334 is wound around the lower guide 322 and the upper pulley 326 along a track of the first tape 332 (a track from the lower guide 322 to the sprocket 328). Still further, the other end portion 334C of the second tape 334 is fitted (pressure inserted) and fixed to a plurality of projections formed on the front end side surface of the rear carrier plate 320.

Figure 31:
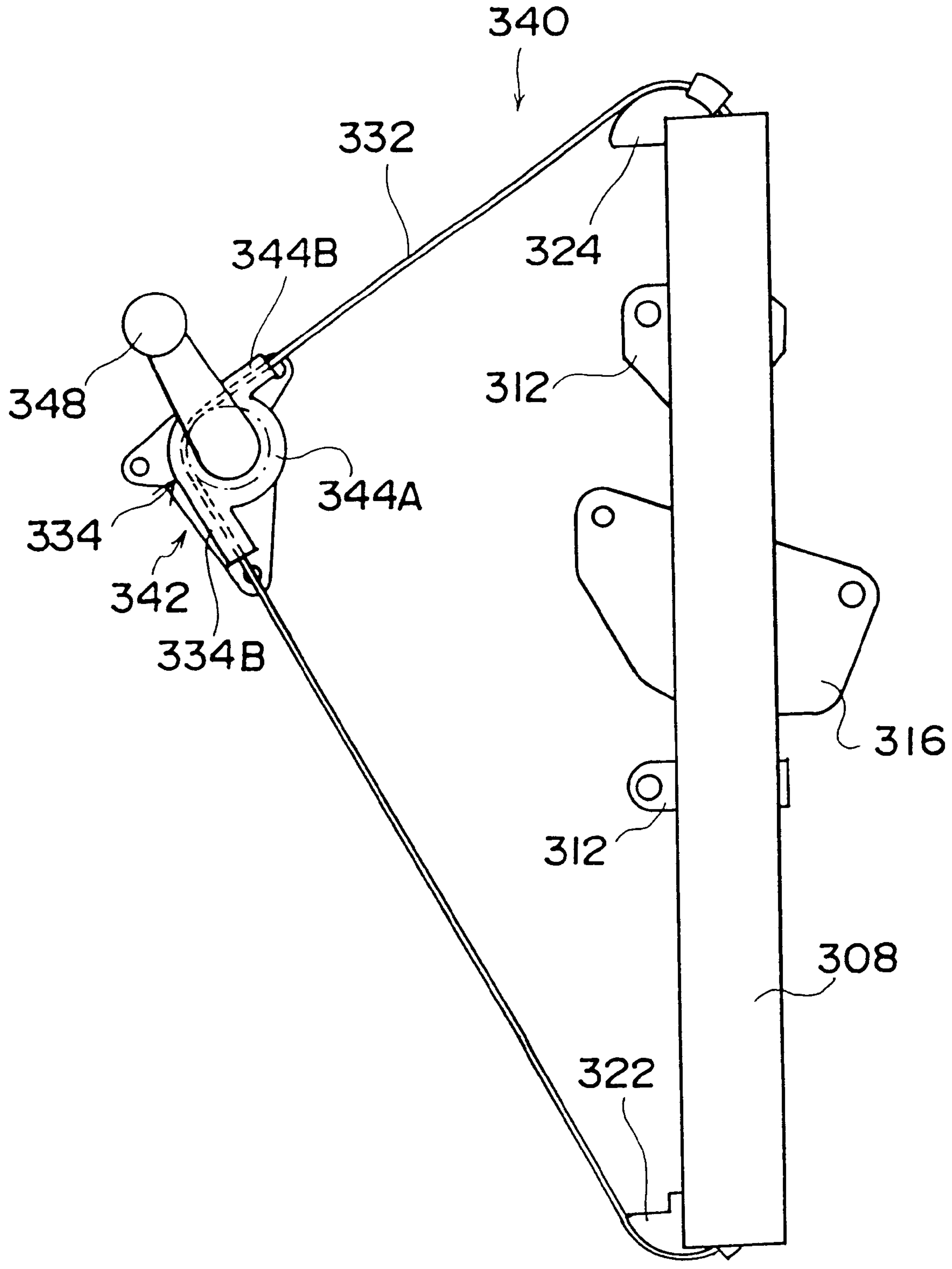
FIG. 31 is a totally schematic view showing a case in which the window regulator system in accordance with the present invention is used as a manual window regulator.

On the contrary, a totally schematic view in the case that the window regulator system in accordance with the present invention is used as a manual window regulator 340 is shown in FIG. 31 in a state of being seen from a vehicle chamber. As shown in this drawing, a manual operation handle portion 342 in the case of using as the manual window regulator 340 is arranged at the same position as that of the motor 330 in the case of using as the power window regulator 300. That is, in accordance with this embodiment, the motor 330 is arranged at a position for mounting the manual operation handle portion 342.

Since only a driving source for applying a rotational force to the sprocket 328 is different between the manual window regulator 340 and the power window regulator 300, only a structure of the manual operation handle portion 342 will be described below with reference to FIG. 32.

Figure 32:
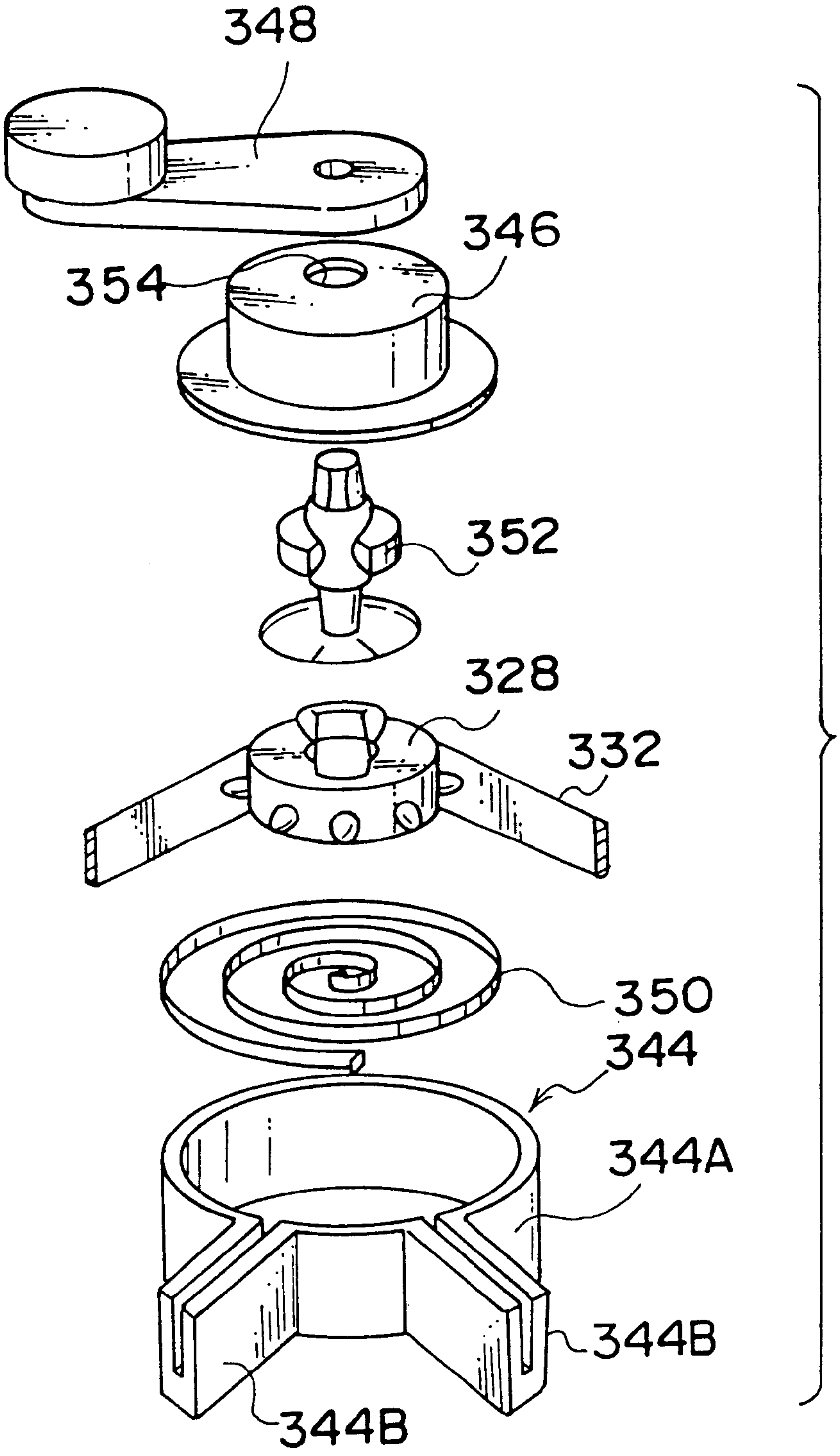
FIG. 32 is an exploded perspective view of a manual operation handle portion shown in FIG. 31.

As shown in FIG. 32, the manual operation handle portion 342 is provided with a case 344 comprising a cylindrical portion 344A with a bottom and a pair of tape guides 344B extended out in a radial direction from an outer peripheral portion of the cylindrical portion 344A, and a hat-shaped lid 346 fitted into the cylindrical portion 344A.

It is structured such that in addition to the sprocket 328 mentioned above, an assist spring for assisting an operation force by the manual operation handle 348 and a inverse rotation prevention mechanism 352 for preventing the manual operation handle 348 from accidentally rotating in a direction opposite to a rotational direction operated by an occupant are received between the cylindrical portion 344A and the lid 346. The first tape 332 wound around the sprocket 328 is structured such that a pair of tape guides 344B can be inserted. Further, it is structured such that an inner end portion of the assist spring 350 is locked with an axial core portion of the sprocket 328 and an outer end portion is locked with the cylindrical portion 344A. Still further, it is structured such that a lower end portion of the inverse rotation prevention mechanism 352 is engaged with the axial core portion of the sprocket 328 and connected to a base portion of the manual operation handle 348 through a circular hole 354 formed in an axial core portion of the lid 346.

Next, an operation and an effect of this embodiment will be described below.

In the case that the window regulator system in accordance with the present invention is used as the power window regulator 300, the sprocket 328 and the motor 330 are attached to a substantially center portion within the side door 302.

In this state, when a power window regulator switch (not shown) is operated to ascend the door glass 306, the motor 330 is normally driven. When the motor 330 is normally driven, the sprocket 328 rotates in a clockwise direction in FIG. 30 through a worm gear, a worm gear wheel (not shown) and the like to move the first tape 332 in a direction of an arrow A. When the first tape 332 moves in a direction of the arrow A, the carrier plate 316 connected to a front end side line of the first tape 332 ascends along the first guide rail 308 and an end portion 334A of the second tape 334 connected to the carrier plate 316 is drawn up to the upper side of the door together with the first tape 332. Accordingly, the second tape 334 moves in a direction of an arrow B in FIG. 30 and the carrier plate 320 is ascended (pulled) along the second guide rail 310 by the second tape 334. As a result, the door glass 306 ascends while being supported by a pair of carrier plates 316 and 320.

On the contrary, when the power window regulator switch (not shown) is operated to descend the door glass 306, the motor 330 is inversely driven. When the motor 330 is inversely driven, the sprocket 328 rotates in a counterclockwise direction in FIG. 30 to move the first tape 332 in a direction opposite to the direction of the arrow A. When the first tape 332 moves in a direction opposite to the direction of the arrow A, the carrier plate 316 descends and an end portion 334A of the second tape 334 is drawn down to the lower side of the door. Accordingly, the second tape 334 moves in a direction opposite to the direction of the arrow B in FIG. 30 and the carrier plate 320 is descended (pushed) along the second guide rail 310 by the other end 334C of the second tape 334. As a result, the door glass 306 descends while being supported by a pair of carrier plates 316 and 320. In this case, since the second tape 334 has a predetermined rigidity which can push down the carrier plate 320, there is not a problem such that the carrier plate 320 cannot be pushed down due to bending at a time of pushing down the carrier plate 320. Further, when the carrier plate 320 is pushed by the second tape 334, a dead load of the door glass 306 is used, so that a push force due to the second tape 334 is reduced.

On the other hand, in the case that the window regulator system in accordance with the present invention is used as the manual window regulator 340, the motor 330 is taken out from an inner portion of the side door 302 and the manual operation handle portion 342 is attached to the same position as the mounting position of the motor 330. Here, at this time, the sprocket 328 rotated by the motor 330 is assembled in the manual operation handle portion 342.

In this state, when the manual operation handle 348 is rotated, an operation force at that time is transmitted to the sprocket 328 through the inverse rotation prevention mechanism 352. Accordingly, the sprocket 328 is rotated around the axis thereof, and the door glass 306 is ascended and descended in accordance with the same operation as that mentioned above.

As mentioned above, in accordance with this embodiment, since the structure is made such that the sprocket 328 and the motor 330 are mounted to coincide with the mounting position of the manual operation handle portion 342, the structure can be used in each of the cases by attaching the motor 330 in the case of being used as the power window regulator 300 and by attaching the manual operation handle portion 342 in place of the motor 330 in the case of being used as the manual window regulator 340. That is, an interchangeability is provided between the power window regulator 300 and the manual window regulator 340.

In addition, in accordance with this embodiment, as mentioned above, since the second tape 334 has a track in a direction of connecting between the lower end portion of the first guide rail 308 and the sprocket 328, the structure can be made such that the carrier plate 320 is pulled by the second tape 334 in the case of ascending the door glass 306 and the carrier plate 320 is pushed by the second tape 334 in the case of descending the door glass 306. That is, the second tape 334 is structured to be a push-pull type. Accordingly, a tape length of the second tape 334 can be shortened in comparison with the case that the second tape 334 is structured to be a pull-pull type.

Figure 33:
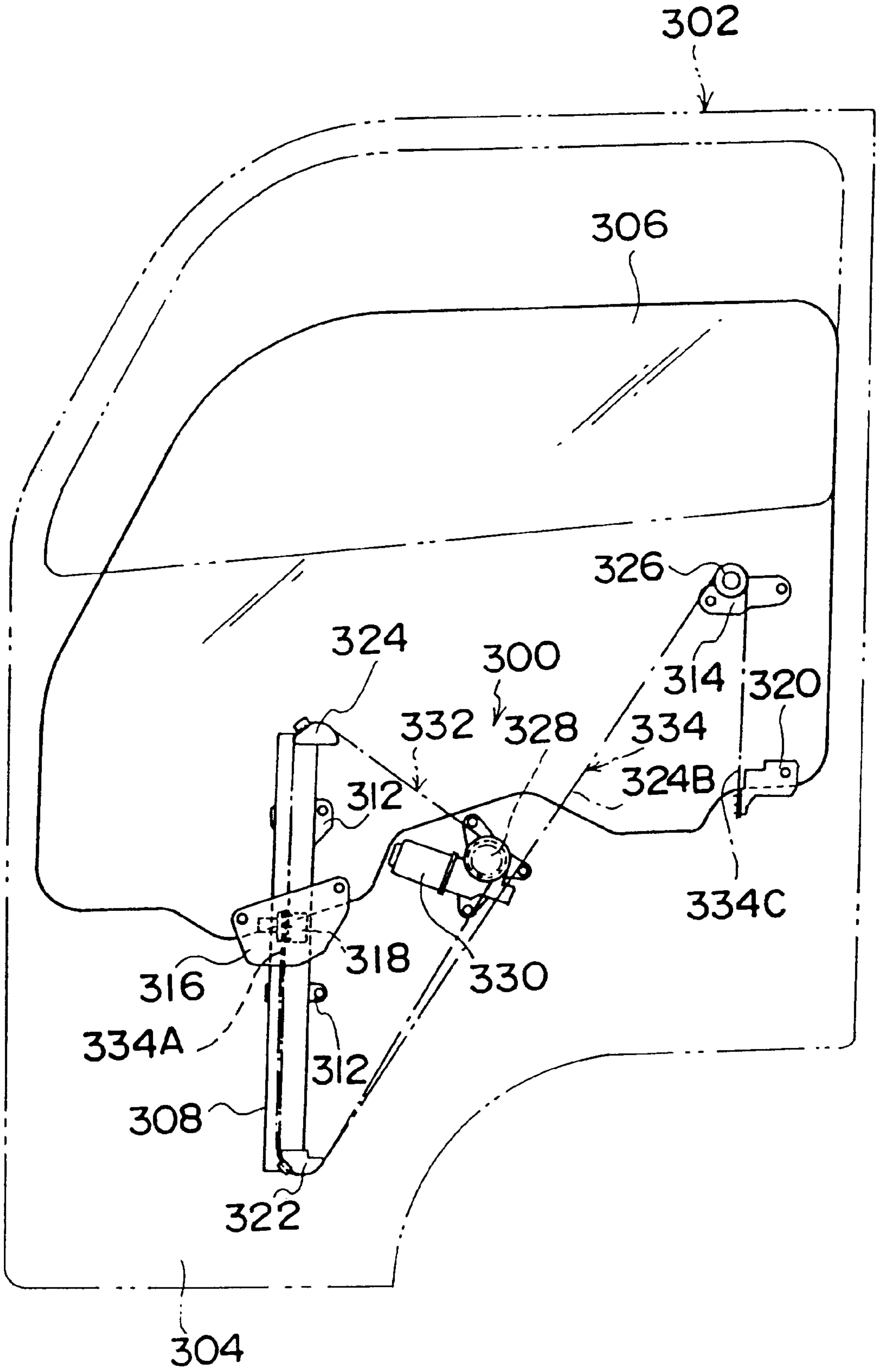
FIG. 33 is a front elevational view which shows a total structure of a power window regulator in accordance with the other embodiment of the present invention.

In this case, in accordance with the embodiment shown in FIG. 30, the second guide rail 310 is arranged in parallel to the first guide rail 308, however, the structure is not limited to this, and as shown in FIG. 33, the second guide rail 310 may be abolished. When the structure is made in the above manner, a simplification of the structure can be realized.

Figure 34:
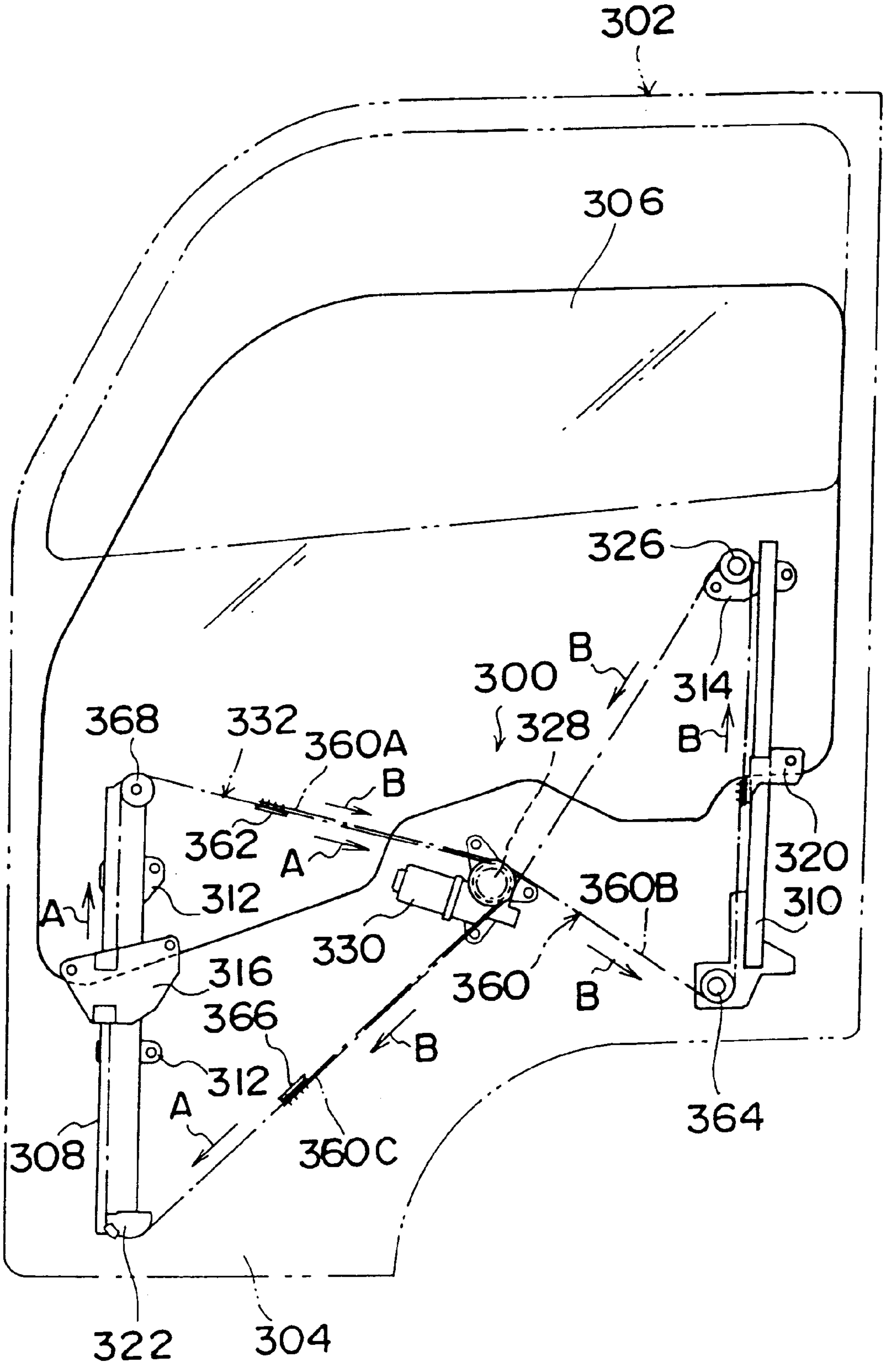
FIG. 34 is a totally schematic view corresponding to FIG. 30, showing a power window regulator in accordance with an embodiment in which a second tape is wound around a sprocket in a crossing state.

Further, in accordance with the embodiment shown in FIG. 30, the structure is made such that the second tape 334 formed in a substantially Z shape is overlapped with the first tape 332 formed in a substantially triangular loop, however, the structure is not limited to this, and as shown in FIG. 34, the structure may be made such that the second tape 360 is wound around the sprocket 328 in a cross state.

In particular, an end portion 360A of the second tape 360 is fixed to an oblique line portion in the upper side of the first tape 332 formed in a substantially triangular loop by a clip 362 and wound around the sprocket 328 as it is, and a middle portion 360B of the second tape 360 is wound around the lower pulley newly provided in the lower end portion of the second guide rail 310 and the upper pulley 326 originally provided there. Then, the other end portion 360C is fixed to an oblique line portion in the lower side of the first tape 332 by a clip 366 after again winding the second tape 360 wound around the upper pulley 326 around the sprocket 328. Here, in accordance with this embodiment, an upper pulley 368 is arranged in the upper end portion of the first guide rail 308 in place of the upper guide 324 mentioned above.

In accordance with the structure mentioned above, since the second tape 360 is wound around the sprocket 328 in a crossing state, a rotational force of the sprocket 328 is directly transmitted not only to the first tape 332 but also to the second tape 360. Accordingly, the structure can be made such that the carrier plate 320 can be pulled by the second tape 360 in both of the case of ascending the door glass 306 and the case of descending the door glass 306. That is, the second tape 360 is structured such as to be a pull-pull type. Accordingly, the ascending and descending operation of the carrier plate 320 can be stably performed since there is no push operation, in comparison with the case of the push-pull type.

Here, in the case of employing the structure mentioned above, since the second tape 360 crosses at the position in which the sprocket 328 is arranged, a structure in which teeth of the sprocket 328 are arranged in two rows may be added.

Further, in each of the embodiments mentioned above, the structure is made such that the second tapes 334 and 360 are arranged in a direction of the track of the first tape 332 or a direction of crossing to the track direction; however, a method of arranging the second tape is not limited to this. That is, in view of securing an interchangeability between the power window regulator 300 and the manual window regulator 340, the structure is sufficient when the sprocket 328 rotated by the motor 330 is arranged at the mounting position of the manual operation handle 348. Accordingly, for example, in FIG. 30, the structure can be made such that the second tape 334 suspended down from the carrier plate 316 is arranged from the lower guide 322 toward the lower end portion of the second guide rail 310, wound around the lower pulley additionally provided in the lower end portion and thereafter directed to the upper pulley 326, and the second tape 334 wound around the upper pulley 326 is again suspended down to be fixed to the carrier plate 320.

Still further, the motor 330 and the manual operation handle portion 348 can be replaced in accordance with the following two methods, and each of the methods can be employed. In one method, the motor 330 is taken out in a state of leaving the sprocket 328 and the left sprocket 328 is assembled within the manual operation handle portion 348. In the other method, the sprocket 328 is provided in each of the motor 330 and the manual operation handle portion 348, and the whole of the sprocket 328 is replaced.

What is claimed is:

1. A power window regulator in combination with a side door for a vehicle, said regulator for automatically raising and lowering a window glass, said regulator comprising:

a first guide rail and a second guide rail respectively located in parallel to one another at a front end side and a rear end side within a side door for a vehicle to set a direction of raising and lowering the window glass in a longitudinal direction of the guide rails;

a first glass carrier and a second glass carrier located on the first guide rail and the second guide rail, respectively, and which support the window glass;

a first belt-shaped member provided at a side of the first guide rail, said belt-shaped member forming a loop for raising/lowering said first glass carrier and being connected at ends thereof to the first glass carrier at a predetermined length;

a driving source for imparting a driving force to the first belt-shaped member for raising/lowering said first glass carrier and for moving said first belt-shaped member; and a second belt-shaped member having one end connected to one of the first belt-shaped member and the first glass carrier and the other end connected to the second glass carrier, and having flexibility with a degree of rigidity capable of at least moving the second glass carrier in a direction of raising and lowering the window glass along the second guide rail.

2. A power window regulator according to claim 1, wherein said second belt-shaped member is arranged so that an intermediate portion thereof is movable between upper end portions of the first guide rail and the second guide rail.

3. A power window regulator according to claim 2, wherein said first belt-shaped member and said second belt-shaped member are wound around a plurality of rolling bodies, and the rotating direction of the plurality of rolling bodies at a time of raising the window glass is the same rotating direction.

4. A power window regulator according to claim 3, wherein an upper end of the first belt-shaped member is movable to form a loop and an intermediate portion of the second belt-shaped member are both wound around the same rolling body disposed at an upper end side of said first guide rail.

5. A power window regulator according to claim 3, wherein an upper end of the first belt-shaped member forming a loop is wound around the rolling body disposed at an upper end of said first guide rail and an intermediate portion of the second belt-shaped member forming a straight line is wound around another rotating member disposed near an outer side of said rolling body.

6. A power window regulator according to claim 1, wherein said second belt-shaped member is disposed such that an intermediate portion thereof is movable between upper end portions of the first guide rail and the second guide rail.

7. A power window regulator according to claim 1, wherein said means for imparting driving force is disposed at one of an upper end side and a lower end side of the first guide rail.

8. A power regulator according to claim 1, wherein one end of said first belt-shaped member is fixed to said first glass carrier, an extension absorbing body for absorbing an extension of first belt-shaped member is provided at the side of the other end not fixed to said first glass carrier member, and said extension absorbing body is offset with respect to said one end of said first belt-shaped member toward a front/rear direction of the door.

9. A power window regulator according to claim 8, wherein said extension absorbing body comprises:

a slider to which said other end of said first belt-shaped member is fixed and which is disposed to slide within said first glass carrier;

an elastic body that urges the slider in a direction in which said first belt-shaped member extends; and an adjusting body for adjusting an urging force of the elastic body.

10. A power window regulator according to claim 9, wherein a fitting groove is provided in said slider and a bent portion inserted into said fitting groove is provided in said first glass carrier.

11. A power window regulator in combination with a side door for a vehicles said regulator for automatically raising and lowering a window glass, said regulator comprising:

a first guide rail and a second guide rail respectively located in parallel to one another at a front end side and a rear end side within a side door for a vehicle to set a direction of raising and lowering the window glass in a longitudinal direction;

a first glass carrier and a second glass carrier located on the first guide rail and the second guide rail, respectively, and which support the window glass;

a first belt-shaped member provided at a side of the first guide rails said belt-shaped member forming a loop for raising/lower said first glass carrier and being connected to the first glass carrier at a predetermined length;

a driving source for imparting a driving force to the first belt-shaped member for raising/lower said first glass carrier and for moving said first belt-shaped member; and a second belt-shaped member provided between the first guide rail and the second guide rail forming a loop and connected to the second glass carrier and one of the first belt-shaped member and the first glass carrier.

12. A power window regulator according to claim 11, wherein said second belt-shaped member is disposed to move between upper end portions and lower end portions of the first guide rail and the second guide rail.

13. A power window regulator according to claim 12, wherein said first belt-shaped member and said second belt-shaped member -are wound around a plurality of rolling bodies, and the rotating direction of the plurality of rolling bodies at a time of raising the door glass and a rotating direction of the plurality of rolling bodies at a time of lower the door glass is the same rotating direction.

14. A power window regulator according to claim 13, wherein said first belt-shaped member forming a loop and said second belt-shaped member are both wound around the same upper rolling body disposed at an upper end side of said first guide rail and around the same lower rolling body disposed at a lower end side of said first guide rail.

15. A power window regulator according to claim 13, wherein an upper end side of the first belt-shaped member forming a loop is wound around the rolling body disposed at the upper end side of said first guide rail and an upper end side of the second belt-shaped member forming a loop is wound around another rotating member disposed near an outer side of said rolling body.

16. A power window regulator according to claim 11, wherein said second belt-shaped member is disposed to move between upper end portions and lower end portions of the first guide rail and the second guide rail.

17. A power window regulator according to claim 11, wherein said means for imparting a driving force is disposed at one of an upper end side and a lower end side of the first guide rail.

18. A power window regulator according to claim 11, wherein one end of said first belt-shaped member is fixed to said first glass carrier, an extension absorbing body for absorbing an extension of said first belt-shaped member is provided at the side of the other end of said first glass belt-shaped member, and said extension absorbing body is offset with respect to said one end toward a front/rear direction of the door.

19. A power window regulator according to claim 18, wherein said extension absorbing body comprises:

a slider to which said other end of said first belt-shaped member is fixed and which is disposed to slide within said first glass carrier;

an elastic body that urges the slider in a direction in which said first belt-shaped member is extended; and an adjusting body for adjusting an urging force of the elastic body.

20. A power window regulator according to claim 19, wherein a fitting groove is provided in said slider and a bent portion inserted into said fitting groove is provided in said first glass carrier.

21. A power regulator in combination with a side door for a vehicle, said regulator for automatically raising and lowering a window glass, said regulator comprising:

a guide rail disposed at one of a front end side of a door and a rear end side within a side door for a vehicle that fixes a direction for raising and lower the window glass in a longitudinal direction;

a first glass carrier slidable along the guide rail and which supports a guide rail disposed at one side of the window glass;

a first belt-shaped member provided at a side of the first guide rail to form a loop and connected to the first glass carrier at a predetermined length;

a driving source for imparting a driving force to the first belt-shaped member and for moving said first belt-shaped member forming a loops a second glass carrier for supporting a side opposite to the guide rail disposal side of the door glass; and a second belt-shaped member connecting the second glass carrier with one of the first belt-shaped member and the first glass carrier and moving in accordance with movement of the first belt-shaped member to raise and lower the second glass carrier in the same direction as that of the first glass carrier.

22. A power window regulator according to claim 21, wherein said guide rail is disposed at a rear end side of the door and said second glass carrier is disposed at the front end side of the window glass.

23. A power window regulator according to claim 22, wherein said first belt-shaped member is supported by winding portions set at three or more locations on said belt-shaped member.

24. A power window regulator according to claim 23, wherein said driving source is disposed at a position that is at an upper end side of the guide rail and is near said guide rail.

25. A power window regulator according to claim 23, wherein said driving source is disposed at an upper end side of the guide rail, in an offset position with respect to said guide rail toward a front/rear direction of the door.

26. A power window regulator according to claim 21, wherein said driving source is disposed at an upper end side or a lower end side of the guide rail.

27. A window regulator system in combination with a vehicle door, comprising:

a guide rail disposed parallel to a direction of raising and lower a window glass;

a first glass carrier provided to be slidable along the guide rail and which supports a front/rear end of the window glass;

a rolling body disposed in a substantially intermediate portion within a side door for a vehicle to be rotatable around an axis, said rolling body rotatable by a driving force of a driving source or by an operating force of a manual operating handle;

a first belt-shaped member having a flat-rectangular cross-section, said member forming a loop of substantially triangular shape by being wound around a rolling body and for moving along a track in accordance with rotations of the rolling body to raise and lower the first glass carrier along the guide rail;

a second glass carrier for supporting another end portion in the front/rear direction of the glass in the door glass; and a second belt-shaped member having a flat-rectangular cross-section, said second belt-shaped member connecting the second glass carrier with one of the first glass carrier and the first belt-shaped member and for moving along a track in accordance with movements of the first belt-shaped member to raise and lower the second glass carrier in the same direction as that of the first glass carrier.

28. A window regulator system according to claim 27, wherein said second belt-shaped member has a track in a direction for connecting a lower end portion of the guide rail to the rolling body.

29. A window regulator system according to claim 27, wherein said second belt-shaped member is wound around the rolling body in a crossed state.

30. A power window regulator in combination with a door for a vehicle, said regulator comprising:

a first guide rail located at an end of a door;

a second guide rail located at an opposite end of said door from said first guide rail and being parallel to both said first guide rail and a direction of travel for raising and lowering a window glass;

first and second glass carriers for supporting said window glass located on said first and second guide rails, respectively;

a first belt-shaped member having a flat rectangular cross-section located at a side of said first guide rail, and connected at ends thereof to said first glass carrier at a predetermined length and forming a loop for raising/lowering said first glass carrier;

a second belt-shaped member having a flat rectangular cross-section connected at one end to one of the first glass carrier and the first belt-shaped member and a second end connected to said second glass carrier, said second belt-shaped member having a degree of rigidity capable of at least moving the second glass carrier in a direction of travel of raising/lower said window glass along the second guide rail; and means for imparting a driving force to one of said first and second belt-shaped members.

* * * * *